US012209775B2

(12) United States Patent
Toews et al.

(10) Patent No.: US 12,209,775 B2
(45) Date of Patent: Jan. 28, 2025

(54) FORMING HIGH EFFICIENCY GEOTHERMAL WELLBORES

(71) Applicant: EAVOR TECHNOLOGIES INC., Calgary (CA)

(72) Inventors: Matthew Toews, Calgary (CA); Michael Holmes, Calgary (CA); Jonathan Hale, Calgary (CA); Andrew Curtis-Smith, Calgary (CA); Peter Andrews, Calgary (CA); Paul Cairns, Calgary (CA); Ariel Torre, Calgary (CA)

(73) Assignee: Eavor Technologies Inc.

( * ) Notice: Subject to any disclaimer, the term of this patent is extended or adjusted under 35 U.S.C. 154(b) by 0 days.

(21) Appl. No.: 17/126,153

(22) Filed: Dec. 18, 2020

(65) Prior Publication Data
US 2021/0325089 A1 Oct. 21, 2021

Related U.S. Application Data

(60) Provisional application No. 63/012,952, filed on Apr. 21, 2020.

(30) Foreign Application Priority Data

Nov. 19, 2020 (CA) ..................................... 3100013

(51) Int. Cl.
*F24T 10/10* (2018.01)
*E21B 21/00* (2006.01)
(Continued)

(52) U.S. Cl.
CPC ............ *F24T 10/10* (2018.05); *E21B 21/003* (2013.01); *E21B 33/10* (2013.01); *E21B 33/138* (2013.01);
(Continued)

(58) Field of Classification Search
CPC ........... F24T 10/10; F24T 10/15; E21B 33/10; E21B 36/001; E21B 36/003; E21B 47/07;
(Continued)

(56) References Cited

U.S. PATENT DOCUMENTS 3,424,254 A  1/1969 Huff
3,786,858 A  1/1974 Potter et al.
(Continued)

FOREIGN PATENT DOCUMENTS

CA  2123075  11/1994
CA  2210866  1/1998
(Continued)

OTHER PUBLICATIONS

Bauer et al., "High-temperature plug formation with silicates." SPE international Symposium on Oilfield chemistry. Society of Petroleum Engineers, Jan. 2005, 8 pages.
(Continued)

Primary Examiner — Nicole Coy
(74) Attorney, Agent, or Firm — Fish & Richardson P.C.

(57) ABSTRACT

Wellbore synthesis techniques are disclosed suitable for use in geothermal applications. Embodiments are provided where open hole drilled wellbores are sealed while drilling in sequenced operations with utilization of phase change materials to form an impervious layer at the wellbore/formation interface in high temperature applications. The techniques may be chemical, thermal, mechanical, biological and are fully intended to irreversibly damage the formation in terms of the permeability thereof. With the permeability negated, the wellbore may be used to create a closed loop surface to surface geothermal well operable in the absence of well casing for heat transfer surfaces for maximizing thermal transfer to a circulating working fluid. Formulations for the working and drilling fluids are disclosed.

72 Claims, 23 Drawing Sheets

(51) Int. Cl.
*E21B 33/10* (2006.01)
*E21B 33/138* (2006.01)
*E21B 36/00* (2006.01)
*F24T 10/15* (2018.01)

(52) U.S. Cl.
CPC .......... *E21B 36/001* (2013.01); *E21B 36/003* (2013.01); *F24T 10/15* (2018.05)

(58) Field of Classification Search
CPC ...... E21B 41/00; E21B 21/003; E21B 33/138; Y02E 10/10
See application file for complete search history.

(56) References Cited

U.S. PATENT DOCUMENTS

| | | | |
|---|---|---|---|
| 3,817,038 A | 6/1974 | Paull et al. | |
| 4,060,988 A | 12/1977 | Arnold | |
| 4,137,720 A | 2/1979 | Rex | |
| 4,665,985 A | 5/1987 | Berrod et al. | |
| 4,741,405 A | 5/1988 | Moeny et al. | |
| 5,515,679 A | 5/1996 | Shulman | |
| 5,685,362 A | 11/1997 | Brown | |
| 5,687,999 A | 11/1997 | Lancry et al. | |
| 5,715,895 A | 2/1998 | Champness et al. | |
| 5,803,185 A | 9/1998 | Barr et al. | |
| 5,911,282 A * | 6/1999 | Onan | C09K 8/50 166/276 |
| 5,992,507 A | 11/1999 | Peterson | |
| 6,000,471 A | 12/1999 | Langset | |
| 6,028,534 A | 2/2000 | Ciglenec et al. | |
| 6,059,036 A | 5/2000 | Chatterji et al. | |
| 6,073,448 A | 6/2000 | Lozada | |
| 6,102,120 A | 8/2000 | Chen et al. | |
| 6,247,313 B1 | 6/2001 | Moe | |
| 6,301,894 B1 | 10/2001 | Halff | |
| 6,626,243 B1 | 9/2003 | Go Boncan | |
| 6,668,554 B1 | 12/2003 | Brown | |
| 6,679,326 B2 | 1/2004 | Zakiewicz | |
| 6,702,044 B2 | 3/2004 | Reddy et al. | |
| 6,708,494 B1 | 3/2004 | Hamann | |
| 6,938,707 B2 * | 9/2005 | Schmidt | C09K 8/16 166/302 |
| 7,000,711 B2 | 2/2006 | Miller et al. | |
| 7,146,823 B1 | 12/2006 | Wiggs | |
| 7,198,107 B2 | 4/2007 | Maguire | |
| 7,207,603 B2 | 4/2007 | Segreto | |
| 7,251,938 B1 | 8/2007 | Bond | |
| 7,740,068 B2 * | 6/2010 | Ballard | C09K 8/035 106/633 |
| 7,753,122 B2 | 7/2010 | Curlett | |
| 8,020,382 B1 | 9/2011 | Zakiewicz | |
| 8,307,896 B2 | 11/2012 | Sarria | |
| 8,381,523 B2 | 2/2013 | Eli et al. | |
| 8,616,000 B2 | 12/2013 | Parella | |
| 8,672,058 B2 | 3/2014 | Tommie et al. | |
| 8,708,046 B2 | 4/2014 | Montgomery | |
| 8,727,035 B2 * | 5/2014 | Tollefsen | E21B 21/00 175/61 |
| 8,822,386 B2 | 9/2014 | Quintero et al. | |
| 8,991,488 B2 | 3/2015 | Loveday | |
| 9,016,374 B2 * | 4/2015 | Quintero | C09K 8/604 166/302 |
| 9,027,669 B2 * | 5/2015 | Dirksen | E21B 36/001 175/17 |
| 9,121,393 B2 | 9/2015 | Schwarck | |
| 9,212,304 B2 | 12/2015 | McDonald | |
| 9,243,485 B2 * | 1/2016 | Kosakewich | E21B 43/2405 |
| 9,279,322 B2 | 3/2016 | Dirksen | |
| 9,458,023 B2 | 10/2016 | McDonald et al. | |
| 9,512,705 B2 | 12/2016 | Benson et al. | |
| 9,556,856 B2 | 1/2017 | Stewart et al. | |
| 9,758,711 B2 | 9/2017 | Quintero et al. | |
| 9,803,626 B1 | 10/2017 | Eastman et al. | |
| 9,845,423 B2 | 12/2017 | Franzt et al. | |
| 9,850,767 B2 | 12/2017 | Guo | |
| 9,869,167 B2 | 1/2018 | Randolph | |
| 10,060,195 B2 | 8/2018 | Moeny | |
| 10,260,778 B2 | 4/2019 | Sonju et al. | |
| 10,527,026 B2 | 1/2020 | Muir et al. | |
| 10,774,617 B2 * | 9/2020 | Zhan | E21B 47/07 |
| 11,242,726 B2 | 2/2022 | Toews et al. | |
| 2004/0123985 A1 | 7/2004 | Whitfill et al. | |
| 2006/0108150 A1 | 5/2006 | Luke et al. | |
| 2006/0250274 A1 | 11/2006 | Mombourquette et al. | |
| 2007/0223999 A1 | 9/2007 | Curlett | |
| 2007/0245729 A1 | 10/2007 | Mickelson | |
| 2008/0190614 A1 | 8/2008 | Ballard | |
| 2009/0014180 A1 | 1/2009 | Stegemeier et al. | |
| 2010/0071366 A1 | 3/2010 | Klemencic | |
| 2010/0243242 A1 | 9/2010 | Boney et al. | |
| 2010/0272515 A1 | 10/2010 | Curlett | |
| 2010/0276115 A1 | 11/2010 | Parella | |
| 2011/0011557 A1 | 1/2011 | Shelton, Jr. | |
| 2011/0048005 A1 | 3/2011 | McHargue | |
| 2011/0061382 A1 | 3/2011 | Stern | |
| 2011/0067869 A1 | 3/2011 | Bour et al. | |
| 2011/0100002 A1 | 5/2011 | Muir et al. | |
| 2011/0224942 A1 | 9/2011 | Kidwell | |
| 2011/0247816 A1 | 10/2011 | Carter, Jr. | |
| 2011/0306524 A1 | 12/2011 | Smith | |
| 2012/0080163 A1 | 4/2012 | Hoffman | |
| 2012/0174581 A1 | 7/2012 | Vaughan et al. | |
| 2013/0255258 A1 | 10/2013 | Loveday | |
| 2013/0299036 A1 | 11/2013 | Loveday | |
| 2013/0338835 A1 | 12/2013 | Pepe | |
| 2014/0130498 A1 | 5/2014 | Randolph | |
| 2014/0133519 A1 | 5/2014 | Freitag et al. | |
| 2014/0326668 A1 | 11/2014 | Loveday | |
| 2014/0367172 A1 | 12/2014 | Evans | |
| 2015/0198019 A1 | 7/2015 | Affholter et al. | |
| 2015/0285049 A1 | 10/2015 | Tejada | |
| 2016/0040518 A1 | 2/2016 | Potapenko et al. | |
| 2016/0211664 A1 | 7/2016 | Subbotin et al. | |
| 2016/0245550 A1 | 8/2016 | Sonju et al. | |
| 2016/0273345 A1 | 9/2016 | Donderici et al. | |
| 2017/0058181 A1 | 3/2017 | Frantz et al. | |
| 2017/0130116 A1 | 5/2017 | McDonald et al. | |
| 2017/0137694 A1 | 5/2017 | Van Oort et al. | |
| 2017/0211849 A1 | 7/2017 | Muir et al. | |
| 2017/0299226 A1 | 10/2017 | Buscheck | |
| 2018/0274524 A1 | 9/2018 | Moncarz et al. | |
| 2019/0055930 A1 | 2/2019 | Muir et al. | |
| 2019/0154010 A1 | 5/2019 | Toews | |
| 2019/0346181 A1 | 11/2019 | Toews et al. | |
| 2020/0011151 A1 | 1/2020 | Toews et al. | |
| 2020/0049380 A1 | 2/2020 | Cairns et al. | |
| 2020/0299562 A1 | 9/2020 | Van Slyke et al. | |
| 2021/0396079 A1 | 12/2021 | Staack et al. | |
| 2022/0372838 A1 | 11/2022 | Toews et al. | |
| 2023/0228155 A1 | 7/2023 | Toews et al. | |

FOREIGN PATENT DOCUMENTS

| | | |
|---|---|---|
| CA | 2449302 | 12/2002 |
| CA | 2790616 | 8/2011 |
| CA | 2998782 | 10/2018 |
| CA | 3013374 | 4/2019 |
| CA | 3041002 | 5/2019 |
| CA | 3038294 | 6/2019 |
| CA | 3044153 | 1/2020 |
| CN | 101027480 | 8/2007 |
| CN | 201593889 | 9/2010 |
| CN | 102755595 | 10/2012 |
| CN | 203978273 | 12/2014 |
| CN | 106246101 | 12/2016 |
| CN | 106246142 | 12/2016 |
| CN | 106368608 | 2/2017 |
| CN | 108291437 | 7/2018 |
| CN | 109652028 | 4/2019 |
| EP | 0875657 | 11/1998 |
| EP | 1435428 | 7/2004 |
| GB | 2097448 | 11/1982 |
| GB | 2518442 | 3/2015 |

(56) References Cited

FOREIGN PATENT DOCUMENTS

| | | |
|---|---|---|
| JP | H 3-50874 | 3/1991 |
| JP | H04-203195 | 7/1992 |
| JP | H06-37827 | 5/1994 |
| JP | 3091479 | 9/2000 |
| JP | 2007-198723 | 8/2007 |
| JP | 201451856 | 3/2014 |
| JP | 2016118078 | 6/2016 |
| JP | 2017-025730 | 2/2017 |
| JP | 6735839 | 8/2020 |
| JP | 6848006 | 3/2021 |
| JP | H 7-260054 | 4/2023 |
| RU | 2670292 | 10/2018 |
| WO | WO 2002/103152 | 12/2002 |
| WO | WO 03/106585 | 12/2003 |
| WO | WO 2008003092 | 1/2008 |
| WO | WO 2010027866 | 3/2010 |
| WO | WO2010/072407 | 7/2010 |
| WO | WO 2011053884 | 5/2011 |
| WO | WO 2012068279 | 5/2012 |
| WO | WO 2012082962 | 6/2012 |
| WO | WO 2013013174 | 1/2013 |
| WO | WO2013109890 | 7/2013 |
| WO | WO2013152138 | 10/2013 |
| WO | WO 2014008483 | 1/2014 |
| WO | WO 2014081911 | 5/2014 |
| WO | WO 2014182732 | 11/2014 |
| WO | WO 2015030601 | 3/2015 |
| WO | WO 2015134974 | 9/2015 |
| WO | WO 2015192011 | 12/2015 |
| WO | WO 2016091969 | 6/2016 |
| WO | WO 2017053884 | 3/2017 |
| WO | WO2017/146712 | 8/2017 |
| WO | WO 2018112610 | 6/2018 |
| WO | WO 2018136033 | 7/2018 |
| WO | WO 2019095032 | 5/2019 |
| WO | WO 2019157341 | 8/2019 |
| WO | WO 2019164691 | 8/2019 |
| WO | WO 2020236189 | 11/2020 |
| WO | WO 2022155743 | 7/2022 |

OTHER PUBLICATIONS

Freeman et al., "Single PDC cutter studies of fluid heat transfer and cutter thermal mortality in drilling fluid." AADE paper, Apr. 2012, 6 pages.
Hung et al., "Penetration rate prediction for percussive drilling with rotary in very hard rock" Journal of Science and Technology, Vietnam Academy of Science and Technology, 2016, 54 (1), 133-149, 18 pages.
Kahraman et al. "Dominant rock properties affecting the penetration rate of percussive drills" International Journal of Rock Mechanics & Mining Sciences 40, 2003, 711-723, 13 pages.
Monteiro et al., "Temperature Control of Drilling Fluid with Phase Change Materials" Apr. 2012, 9 pages.
Mortensen, "Hot Dry Rock: A New Geothermal Energy Source", Energy vol. 3, Issue 5, Oct. 1978, 639-644, 6 pages.
PCT International Search Report and Written Opinion in International Appln. No. PCT/CA2020/000136, dated Mar. 22, 2021, 14 pages.
Shen et al., "Experimental Study on Temperature Change and Crack Expansion of High Temperature Granite under Different Cooling Shock Treatments." Energies 12.11, 2097, 2019, 17 pages.
Slb.com [online], "PowerDrive ICE" Jan. 2020 [retrieved on Jan. 12, 2021], retreived from: URL <https://www.slb.com/drilling/bottomhole-assemblies/directional-drilling/powerdrive-ice-ht-rotary-steerable-system>, 7 pages.
CN Office Action issued in Chinese Appln. No. 201910593698.5, dated Mar. 30, 2021, 19 pages (With English Translation).
CN Office Action issued in Chinese Appln. No. 201910593698.5, dated Nov. 17, 2021, 22 pages (With English Translation).
Cui et al., "Geothermal Exploitation from hot dry rocks via recycling heat transmission in a horizontal well" Energy, vol. 128, 366-377, 12 pages.

EP Communication Pursuant to Article 94 (3) EPC issued in European Appln. No. 19830007.1, dated Oct. 1, 2021, 8 pages.
EP Supplemental European Search Report issued in European Appln. No. 19830007.1, dated Dec. 18, 2020, 5 pages.
Examination Report issued in African Regional Appln. No. AP/P/2020/012564, dated Jun. 23, 2022, 6 pages.
Final Office Action issued in U.S. Appl. No. 16/423,020 dated Jul. 26, 2021, 14 pages.
GCC Examination Report issued in Gulf Cooperation Council Appln. No. GC 2019-37842, dated Nov. 16, 2021, 5 pages.
GCC Examination Report issued in Gulf Cooperation Council Appln. No. GC 2019-37842, dated Jun. 26, 2020, 7 pages.
IN Examination Report issued in Indian Appln. No. 201924020812, dated Jan. 3, 2022, 7 pages (With English Translation).
International Preliminary Report on Patentability in International Appln. No. PCT/IB2021/057883, dated Mar. 9, 2023, 7 pages.
International Search Report and Written Opinion in International Appln. No. PCT/CA2019/000076, dated Jul. 25, 2019, 12 pages.
International Search Report and Written Opinion in International Appln. No. PCT/IB2021/057883, dated Dec. 2, 2021, 9 pages.
IS Search Report issued in Iceland Appln. No. 202000873, dated Aug. 5, 2020, 2 pages.
Jellison et al., "Lightweight, ultra-high-strength drill pipe may meet demands of ERD, critical deep drilling." Drilling contractor 3.4, 2009, 53-56.
JP Office Action issued in Japanese Appln. No. 2019-102547, dated Jun. 29, 2020, 11 pages (With English Translation).
JP Office Action issued in Japanese Appln. No. 2019-102547, dated Nov. 2, 2020, 9 pages (With English Translation).
Non-Final Office Action issued in U.S. Appl. No. 16/423,020 dated Jan. 11, 2021, 18 pages.
Non-Final Office Action issued in U.S. Appl. No. 17/665,002 dated Nov. 9, 2022, 22 pages.
Noorollahi et al., "Three dimensional modeling of heat extraction from abandoned oil well for application in sugarcane industry in Ahvaz-Souther Iran." Proceedings of the World Geothermal Congress, Apr. 2015, 11 pages.
Notice of Allowance issued in U.S. Appl. No. 16/423,020 dated Sep. 23, 2021, 7 pages.
NZ Examination Report issued in New Zealand Appln. No. 764529, dated Apr. 8, 2021, 2 pages.
NZ Examination Report issued in New Zealand Appln. No. 764529, dated Sep. 9, 2020, 5 pages.
Office Action in Colombia Appln. No. 20-15501, dated Jan. 31, 2023, 6 pages.
Office Action in Indian Appln. No. 202225043232, dated Oct. 11, 2022, 6 pages (with English translation).
Office Action in Indonesia Appln. No. P00201904638, dated Nov. 18, 2022, 4 pages (with English translation).
Schifflechner et al., "Combined Heat and Power Generation by Enhanced Geothermal Systems: Comparison of Direct and Indirect Concepts for Water and Supercritical CO2 as Heat Carriers," 5th International Seminar on ORC Power Systems, Sep. 9-11, 2019, 8 pages.
SG Office Action issued in Singapore Appln. No. 11202005041V, dated Oct. 11, 2020, 8 pages.
SG Office Action issued in Singapore Appln. No. 11202005041V, dated Nov. 15, 2021, 8 pages.
Templeton et al., "Abandoned Oil/Gas Wells as Sustainable Sources of Renewable Energy." Proc. 23rd World Mining Congress, 2013, 10 pages.
Titanium Engineers, "Titanium 6A1-4V Ti 6-4 Grade 5 (UNS R56400)" Nov. 2012, 2 pages.
Office Action in Japanese Appln. No. 2023-513819, mailed on Apr. 8, 2024, 10 pages.
Office Action in Singapore Appln. No. 11202301050V, mailed on Aug. 16, 2024, 11 pages.
Extended European Search Report in European Appln. No. 21860714.1, mailed on Jul. 22, 2024, 7 pages.

* cited by examiner

FORMING HIGH EFFICIENCY GEOTHERMAL WELLBORES

CROSS-REFERENCE TO RELATED APPLICATIONS

This application claims the benefit of Provisional Application No. 63/012,952, filed on Apr. 21, 2020, and claims the benefit of priority to Canadian Application No. 3,100,013, filed on Nov. 19, 2020.

FIELD OF THE INVENTION

The present invention relates to geothermal wellbore creation with drilling techniques and sequencing and more particularly, the present invention relates to methods for modifying the permeability of a given formation for creating high efficiency geothermal wellbores with improved thermal and mechanical characteristics additionally with working fluid formulations including phase change materials which facilitate drilling in high temperature formations.

BACKGROUND OF THE INVENTION

Geothermal energy recovery is an attractive method of capturing energy and has obvious environmental appeal considering the renewability aspect.

The prior art has focused on numerous issues in respect of permeability, well geometries, working fluids, multilateral well configuration, power production and temperature issues. Examples of attempts to ameliorate these issues will be discussed in turn.

Initially, in respect of formation damage, Badalyan et al., in *Laboratory Study on Formation Damage in Geothermal Reservoirs Due to Fines Migration*, Proceedings World Geothermal Congress 2015 Melbourne, Australia, 19-25 Apr. 2015, teach:

"Here we present a new method to assess formation damage in geothermal reservoirs. It is long known that formation damage is caused by mobilisation, migration and straining of natural reservoir fines . . . . Velocity-induced fines migration is responsible for a non-significant reduction of rock permeability leading to initial formation damage. Following low-ionic strength water injection increases electrostatic repulsion force between clay particles and sand surface, further mobilizes particle resulting in formation damage. Mobilised fines with mixed-layer illite/chlorite mineralogy are responsible for rock permeability reduction due to pore-throats clogging."

Fines migration is one of the most widely spread physics mechanisms of formation damage in oil and gas wells. Numerous recent publications report well impairment by fines migration in geothermal fields. [Emphasis mine]

In Mechanisms of Formation Damage in Matrix Permeability Geothermal Wells Conference: International Geothermal Drilling and Completions Technology Conference, Albuquerque, NM, USA, 21 Jan. 1981, Bergosh et al. indicate in an abstract of their presentation:

"Matrix permeability geothermal formations are subject to damage during well drilling and completion. Near well bore permeability impairment that may occur as a result of particulate invasion, and chemical interaction between formation clays, drilling mud filtrates and formation brines is investigated. Testing of various filtration chemistries on the permeability of East Mesa sandstone indicates that permeability is significantly impaired by the flow of low salinity formation brines. This damage is attributed to cation exchange and removal processes which alter the stability of clay structures. Fluid shearing dislodges particles, which clog pore throats, irreversibly reducing permeability. The test program investigating the effects of mud-transported particles on geothermal formations is still in progress. The rationale, apparatus and test procedures are described. Final results of this testing will be presented at the conference." [Emphasis mine]

Clearly, the loss of permeability in these geothermal environments has significant impact on the production of the wellbore and concomitant energy recovery.

Tchistiakov, in Physico-Chemical Aspects of Clay Migration and Injectivity Decrease of Geothermal Clastic Reservoirs, Proceedings World Geothermal Congress 2000, Kyushu—Tohoku, Japan, May 28-Jun. 10, 2000, states in his summary:

"The permeability damage potential can be evaluated only via broad-minded and interdisciplinary thinking, rather than through automatic application of mathematical equations and laboratory test results. We are convinced that better understanding of the fundamental physico-chemical principles of clay particle stability and transport in porous media will help the reservoir specialists to develop better techniques and apply more effective existing ones for preventing in-situ clay induced formation damage of geothermal reservoirs."

The paper establishes the clay damage to permeability of the drilled well.

Barrios et al., at the Short Course on Geothermal Development and Geothermal Wells, organized by UNU-GTP and LaGeo, in Santa Tecla, El Salvador, Mar. 11-17, 2012, *Acid Stimulation of Geothermal Reservoirs*. In the presentation, the authors indicate:

"Both injection and production wells can be clogged, reducing their production capacity and injectivity below their existing potential. The main reasons for these obstructions may be: Invasion of drilling fluids (mainly bentonite mud) inside the micro fractures of the reservoir; Entry of rock fragments or cuttings, during the drilling process while encountering a total loss circulation; Entry of great amounts of Total Dissolved Solids; Reinjection water with high silica scaling potential; Formation of fine-grained solids displaced by clay migration; Entry of amorphous silica fragments from the reinjection pipelines due to the cooling and heating processes s after maintenance; Calcite scaling in the perforated liner and/or production casing. The key to ensure a continuous flow for power generation is to control all the possible causes of obstruction. It is a well-known fact that the geothermal industry has been using similar technology and practices of the oil industry for the last 50 years. Since oil and gas wells show analogies with regards to scaling problems and mud damage, similar techniques may be applied to prevent permeability problems in order to improve injectivity and productivity capacity in geothermal wells. A cost-effective and widely used solution is the application of acids to dissolve scales and obstruction produced by solids."

You et al., in New Laboratory Method to Assess Formation Damage in Geothermal Wells, SPE European Formation Damage Conference and Exhibition, 3-5 June, Budapest, Hungary 2015 presented a paper, the abstract of which states:

"The new method to assess permeability damage in geothermal reservoirs and predict well productivity decline is presented. The laboratory methodology developed aims to determine permeability decline from mobilisation, migration and straining of natural reservoir fines. Laboratory coreflood testing with constant and stepwise decreasing ionic strength has been performed with measurements of the pressure drop along the core and accumulated effluent particle concentration. Stabilisation of rock permeability occurs after injection of numerous pore volumes, suggesting slow drift of mobilised particles if compared with the carrier water velocity. Low ionic strength water increases electrostatic repulsion forces between clay particles and sand grain surfaces, further mobilising particles and resulting in formation damage. Kaolinite and illite/chlorite mixed layer clay minerals are identified by SEM-EDAX analysis and are the minerals primarily responsible for the permeability damage. The competitive effects of decreasing water viscosity and weakening electrostatic attraction on the attached particle concentration during temperature increase have been observed. The micro-modeling of the fine particle mechanical equilibrium shows that the water viscosity effect on the fine particle attachment dominates. It results in decreased fines detachment and permeability decline at high temperatures."

Turning to drilling fluids, numerous advances have been made in the formulations to mitigate wellbore consolidation issues, permeation, sealing inter alia. These are also related to the discussion above regarding formation damage.

In U.S. Pat. No. 6,059,036, issued May 9, 2000, Chatterji et. al. provide methods and compositions for sealing subterranean zones. Generally, the text indicates:

"The present invention provides improved methods and compositions for sealing subterranean zones and terminating the loss of drilling fluid, crossflows and/or underground blow-outs. The methods of the present invention for sealing a subterranean zone basically comprise the steps of preparing a viscous set delayed sealing composition of this invention, placing the sealing composition in a subterranean zone to be sealed and allowing the sealing composition to set into a rigid sealing mass therein.

The sealing compositions of this invention are basically comprised of an aqueous alkali metal silicate solution, a gelling agent for increasing the viscosity of the solution and a delayed activator for polymerizing or cross-linking the alkali metal silicate and causing the sealing composition to set into a rigid sealing mass.

As mentioned above, in applications involving a need for a low density sealing composition or where a large cavernous subterranean zone is encountered which must be sealed, the sealing composition can be foamed to form an energized and expanding sealing composition. The non-foamed and foamed compositions can also include extending and/or bridging agents to facilitate filling and sealing a zone."

The document is useful to demonstrate the effectiveness of alkali metal silicate compositions for fluid loss prevention and general wellbore sealing.

Ballard, in U.S. Pat. No. 7,740,068, issued Jun. 22, 2010, discloses silicate-based wellbore fluid and methods for stabilizing unconsolidated formations. It is stated in the text that:

"Advantageously, embodiments of the present disclosure may provide for treatment fluids or pills that may be used to stabilize unconsolidated or weakly consolidated regions of a formation. Using solid or particulate silicate precipitating agents may allow for a slower reaction or gelation time between the silicate and the silicate precipitating agents. A slower reaction time may allow the gel components, the silicate and the silicate precipitating agent, to more fully permeate the unconsolidated formation prior to gelation. Additionally, by providing silicate precipitating agent as a solid particulate matter on a micron or sub-micron scale, the silicate precipitating agent may experience less hindrance in permeating the formation."

This document is useful to substantiate that silicate compounds have utility in stabilizing a formation.

U.S. Pat. No. 8,822,386, issued to Quintero et al., Sep. 2, 2014, provides nanofluids and methods of use for drilling and completion fluids. This document further adds to the body of work relating to drilling fluids and teaches the usefulness of such fluids during drilling. The text provides further detail in this regard.

"In one non-limiting example a drilling fluid containing nanoparticles is expected to be useful to stabilize the wellbore during drilling, particularly the shale regions encountered during drilling which may contain areas that tend to slough into the borehole or have clays which undesirably swell when contacted with water introduced as part of the drilling fluid. Such a drilling fluid may be an aqueous-based fluid such as a WBM, a non-aqueous based fluid such as an OBM or SBM, or a combination thereof, namely an emulsion. A surfactant may be present in an amount effective to suspend the nanoparticles in the fluid. Nanoparticles expected to be useful in such shale stabilizing fluids are those which contain functionalities that associate with the shale and help keep it in its original condition or as close to its original condition as possible, that is strengthen the borehole wall. Nanoparticles having a surface charge may assist with this shale stabilization, such as carbon nanotubes. Further, the small size of the nanoparticles permits them excellent access to the shale matrix to inhibit both the external and internal surfaces of clays to minimize damage to the structure of the shale."

Use of high ratio aqueous alkali silicates in drilling fluids is disclosed in U.S. Pat. No. 9,212,304, issued to McDonald, Dec. 15, 2015. The teachings provide further evidence as to the utility of such compositions as used in the oil and gas industry. The document indicates:

"The present invention provides a method for wellbore stabilization in the drilling of wells for conventional and unconventional energy sources, these include but are not limited to conventional oil and gas wells, shale gas and "tar sands". The method provides for a drilling fluid that can among other things; reacts with shale to prevent hydration and dispersion, seal microfractures, prevent shale delamination, prevent bitumen accretion, allow the drilling of depleted zones.

This invention uses larger, more complex polysilicate anions found in aqueous, high ratio alkali silicates. These high ratio aqueous silicates are beyond the ratio of traditional, commercially available silicates. These polysilicate anions facilitates quicker precipitation and polymerization reactions compared to standard ratio aqueous silicates. The higher ratio results in a silicate with lower salinity making for a more environmentally friendly drilling fluid. High ratio, aqueous alkali silicate can be added to the drilling fluid at a wide range of concentrations to achieve the necessary wellbore stabilization. Soluble silica level in the drilling fluid can range from 0.25% to about 6% by weight of the drilling fluid. The pH of the drilling fluid is preferably maintained above pH 10."

Stephen Bauer et al., in *High Temperature Plug Formation with Silicates,* presented at the Thirtieth Workshop on Geothermal Reservoir Engineering, Stanford University, Stanford, California, Jan. 31-Feb. 2, 2005, disclose a method for temporary plugging of specific lost circulation zones, which are commonly encountered during drilling operations in oil, gas, and geothermal industries. "This work describes a chemical solution of exploiting silicates' unique gelling properties in an environmentally friendly and cost-effective way to form plugs for use in water shutoff strategy, steam flooding, and high-temperature grouting/plugging for lost circulation." The paper does not contemplate formulation and application of a silicate-based drilling fluid to seal wellbores and multilateral junctions to form a closed-loop geothermal system.

Halliburton Energy Services, in PCT filing WO 03/106585, describes a method for forming chemical casing "A well bore is drilled with a drilling fluid having a pH in the range of from about 6 to about 10 and comprised of water, a polymeric cationic catalyst capable of accepting and donating protons which is adsorbed on the unconsolidated clays, shales, sandstone and the like, a water soluble or dispersible polymer which is cross-linkable by a thermoset resin and caused the resin to be hard and tough when cured and a water soluble or dispersible thermoset resin which cross-links the polymer, is catalysed and cured by the catalyst and consolidates the weak zones or formations so that sloughing is prevented."

The document does not contemplate formulation and application of the drilling fluid to seal wellbores and multilateral junctions to form a closed-loop geothermal system, nor consider the maintenance of the seal over a typical lifecycle of a geothermal system of 50 years or more.

Another example in the multilateral art is seen in Halliburton Energy Services, U.S. Pat. No. 9,512,705, which teaches a mechanical multilateral wellbore junction to isolate several horizontal wells from the surrounding rock. Complex and expensive mechanical or cemented junctions requiring multiple installation steps are typical in the volumes of prior art. These multiple installation steps necessitate interruptions in forward drilling operations such as bringing the drill bit and bottom hole assembly to surface or waiting on cement.

Another drawback of prior art multilateral junctions is the reduction of the inner diameter of the wellbore, which vastly complicates the drilling of subsequent multilaterals, and can require larger vertical well and mother bore diameters.

Regarding the general well geometries and power/electricity generation aspects of the prior art, Halff, in U.S. Pat. No. 6,301,894, issued Oct. 16, 2001, teaches a geothermal plant based on a closed-loop subsurface heat exchanger. The patent is focused on benefits related to generator location, water conservation and purity and efficiency with multiple loops. The disclosure is silent on techniques to efficiently create the closed-loop wellbore without using casing.

United States Patent Publication, 20110048005, McHargue, published Mar. 3, 2001, teaches a closed loop geothermal system. "The novel approach is to circulate fluid or gas, here referred to as production fluid, through subterranean hot rock formations via a continuous subterranean pipeline formed by cementing continuous pipe along the path made by the intersection of two or more separate bore holes."

The disclosure is silent on techniques to efficiently create the closed-loop wellbore without using casing.

Greenfire Energy Inc., in PCT/US2016/019612, provide, Geothermal Heat Recovery from High-Temperature, Low-Permeability Geologic Formations for Power Generation Using Closed Loop Systems. The text of the case states:

"A method or apparatus that uses a fluid in a closed loop well system to extract heat from geothermal resources that are located in or near high-temperature, low-permeable geologic formations to produce power. In some embodiments, the closed loop system may include one or more heat exchange zones, where at least a portion of the one or more heat exchange zones may be disposed within a subterranean region having a temperature of at least 350° C. The subterranean region may be within a plastic zone or within 1000 meters of the plastic zone, the plastic zone having a temperature gradient of at least 80° C. per kilometre depth.

According to some embodiments, methods for producing geothermal energy described herein may include portions of wells that are not cased with metal pipe but, instead, the walls of such portions may be formation rock that has been sealed with hardened sealant and the well wall in such portions being defined by the boundary of such hardened sealant which, in some embodiments, will cause the diameter of the well in such portions to be larger, and in some cases much larger, than in the metal cased portion of such wells.

Following emplacement of the closed loop heat exchange system, a fluid may be circulated through the closed loop geothermal heat exchange system to heat the fluid and to produce energy with the heated fluid. For example, the energy extracted from the subterranean formation may be converted to heat, electricity, or other usable forms of energy as known to those skilled in the art.

In addition to determining a temperature profile and the heat replenishment profile, methods according to embodiments herein may further estimate a long term viability of a formation for producing geothermal energy based upon the temperature profile and the heat replenishment profile. Such an analysis may be performed by simulating performance of a well as a function of time, taking into account such variables as temperature, heat flux, plastic deformation of the formation proximate the well over time, and other factors, to estimate the changes in energy extraction and energy conversion efficiencies of the system over time. Such an analysis may also be performed to compare various portions of a given formation to determine one or more suitable locations for disposal of the heat exchange loop.

As described above, embodiments disclosed herein relate to apparatus and methods for extracting heat from high temperature impermeable geological formations, lacking in fractures or porosity either naturally occurring or through stimulation. Contrary to prior teachings and the consensus indicating some degree of permeability, and hence convection, is required for effective heat transfer and power production, the present inventors have found that hot impermeable rock may provide an efficient and sustainable resource for extracting geothermal energy to produce electricity, for example.

A closed loop geothermal heat exchange system may then be disposed within the subterranean formation based on the determined temperature profile and the determined heat replenishment profile of the subterranean formation. Emplacement of the closed loop geothermal heat exchange system may include drilling, casing, perforating, cementing, expanding uncased well walls with fractures, sealing uncased well walls and other steps associated with a drilling process and emplacement of a well loop therein as known to one skilled in the art. The emplacing may include, in some embodiments, disposing a heat exchange zone of the closed loop well system within a plastic zone or a brittle-ductile transition zone of the formation. In some embodiments, the emplacing may include or additionally include disposing a heat exchange zone of the closed loop well system within a brittle zone of the formation, as well as stimulating the brittle zone proximate the heat exchange zone."

It is stated, supra, "Emplacement of the closed loop geothermal heat exchange system may include drilling, casing, perforating, cementing, expanding uncased well walls with fractures, sealing uncased well walls and other steps associated with a drilling process."

No teachings regarding the methods, sequence, chemistry or technology are disclosed regarding sealing lengths of open hole wellbore without casing, maintaining the seal over time, and maintaining wellbore integrity.

Mortensen, in Hot Dry Rock: A New Geothermal Energy Source, Energy, Volume 3, Issue 5, October 1978, Pages 639-644, teaches in an abstract of her article, the following:

"A project being conducted by the Los Alamos Scientific Laboratory is attempting to demonstrate the technical and economic feasibility of extracting energy from the hot, dry rock geothermal resource. The system being tested is composed of two deep boreholes drilled into hot, impermeable rock and connected by a hydraulically produced fracture. In September 1977, the circulation loop was closed for the first time and water was circulated through the downhole reservoir and through a pair of 10-MW (thermal) heat exchangers. A series of long-term experiments is planned for 1978 in order to evaluate the thermal, chemical and mechanical properties of the energy extraction system."

Building on the exploitation of geothermal energy harvesting, Sonju et al., in U.S. Pat. No. 10,260,778, issued Apr. 16, 2019, claim:

"A method for establishing a geothermal energy plant for extracting thermal energy from a hot dry rock formation with low porosity wherein a combined supply and return hole (22) is drilled to a first predetermined depth, then a hole is drilled to a second predetermined depth forming a lower part (22') of the combined supply and return hole, wherein a first manifold zone (8) is defined at said second predetermined depth, the lower part (22') of the combined supply and return hole is extended by drilling with the same or a smaller diameter hole (1') to a maximum depth wherein a second manifold zone (9) is defined, whereby one or more production hole(s) (P) is/are drilled to form a closed loop between the first manifold zone (8) and the second manifold zone (9) in which a working fluid can be circulated, wherein a pipe (5) is positioned in the combined supply and return hole (22, 22') and a seal (66) being installed between said first and second manifold zones (8, 9) sealing the annulus space (20) between the lower part of the combined supply and return hole (22') and the pipe (5) to separate the supply and return flow."

In light of the discussed prior art, there remains a need for a method of extracting heat from a geological formation which can be rendered suitable in terms of wellbore sealing and maintenance, closed circuit/loop geometries and multilateral efficiencies for geothermal applications which is not limited by rock type temperature, permeability, inter alia.

Having discussed the sealing aspects, reference will now be made to the temperature issues. Drilling fluid has several functions, which include as some of the key functions:

a) Transport cuttings to the surface;
b) Prevent well-control issues;
c) Preserve wellbore stability;
d) Minimize formation damage;
e) Cool the Bottom Hole Assembly and lubricate the drillstring;
f) Provide information about the wellbore; and
g) Minimize risk to personnel, the environment, and drilling equipment.

Cooling the bottom hole assembly (BHA) is a primary consideration for geothermal wells and deep oil and gas wells which penetrate hot rock. Modern directional drilling equipment contains complex sensors, electronics, and mechanical equipment near the drill bit. All of these components have temperature limitations, usually driven by electronics and mechanical stresses.

Standard directional drilling uses a downhole mud motor (widely recognized as a positive displacement pump) in conjunction with a bent sub. In 2019, standard mud motors and directional electronics are limited to 150° C. The highest temperature rated and more expensive mud motors are limited to 180° C. Above 180° C., one must revert to a SLB Rotary Steerable System (RSS) rated to 200° C., an example of which is (https://www.slb.com/drilling/bottomhole-assemblies/directional-drilling/powerdrive-ice-ht-rotary-steerable-system). Due to the unique electronics and ruggedized equipment, such systems cost several times more than standard equipment.

Another important consideration for cooling is longevity and performance of the drill bit. This is discussed in (https://pdfs.semanticscholar.org/9f0e/a2af4b60d04e18e1ce7a8c828e96fe6d8d67.pdf). As temperature increases, the rock cutting component, typically polycrystalline diamond compact, fails more readily due to differential thermal expansion of material within the cutter and bit. Therefore, if the drilling fluid cannot cool the bit effectively, a reduced rate of penetration and premature failure occur.

Current state of the art drilling fluids cannot cool the bit effectively in a closed system (i.e.—where the fluid loss into permeable geological layers is not material). In a closed system or nearly-closed system, the drilling fluid exits the drill string through the bit, and returns up the annulus of the well. Counter-current heat exchange across the drill string (typically steel pipe) causes the hotter returning fluid in the annulus to transfer heat to the downward flowing fluid within the tubing as it flows towards the bit. This counter current heat transfer essentially limits the cooling effect of the drilling mud at the BHA, even at very high flow rates. The cooling effect or prior art drilling fluid is limited to a practical maximum of 40° C. cooler than the rock temperature being drilled.

Existing geothermal wells can reach above 200° C. or even above 350° C. rock temperature. Therefore, these wells are limited to vertical orientation and are unable to use modern sensors, measurement, and directional drilling equipment. In certain cases, the bit is cooled effectively due to lost circulation—a situation where the pumped drilling fluid goes down the drill string, exits the drill bit, cools the bottom hole assembly and flows out into highly permeable geological formations without returning to surface (hence, circulation is "lost"). In this lost circulation scenario, counter-current flow of hot fluid up the annulus is eliminated and the standard drilling mud effectively cools the BHA.

These lost circulation formations are rare in oil, gas, and geothermal projects and it is much more common to find tight impermeable formations than highly permeably zones. Furthermore, having good mud circulation (majority of pumped fluid returns up the annulus) is necessary for other critical functions of a drilling fluid outlined above.

In addition to cooling, a second challenge in drilling hard rock geothermal wells is the high rock strength and resulting low rate of penetration with existing drilling technology. Rate of penetration is primarily a function of rock strength, which can be measured and quantified in several ways, such as Unconfined Compressive Strength (UCS) or Brazilian Tensile Strength. Kahraman et al. discuss salient points in, *Dominant rock properties affecting the penetration rate of percussive drills*, International Journal of Rock Mechanics & Mining Sciences 40 (2003) 711-723 and Nguyen van Hung et al., *Penetration rate prediction for percussive drilling with rotary in very hard rock*. Journal of Science and Technology, Vietnam Academy of Science and Technology, 2016, 54 (1), pp. 133-149.

A third challenge when drilling a closed-loop geothermal system is intersecting the wellbores at high temperature. Magnetic ranging technology involves placing an emitter tool in one well, and a receiving tool in the other well, to sense relative distance, inclination, and azimuth between the wellbores. The emitter is typically a rare-earth magnet which can be designed to have a high temperature limit—there are no moving parts or electronics. However, the receiver is necessarily a sensitive magnetometer with electronics and circuit boards. These components are difficult to build to withstand high temperatures and are typically the weakest link of all downhole equipment required to closed loop geothermal wells.

With the goal of addressing the temperature issues, the prior art has focussed on the use of phase change materials (PCM) to mitigate the counter-current heat exchange complications inherent with standard drilling fluid. As is known, PCMs undergo fusion (melting and solidifying) at a constant temperature—hence, they absorb and release thermal energy without changing temperature materially. This has been explored in the prior art, an example of which is U.S. Pat. No. 9,758,711, issued Sep. 12, 2017, to Quintero et al.

In the document, a PCM drilling mud composition was used, however, it was noted that only marginally better cooling could be achieved (approximately 5° C.) compared to water. In order to achieve a material impact on ROP, cooling of greater than 50° C. is required.

When the methods described here are applied the rock can be cooled by greater than 100° C. The example used in this document shows cooling of 190° C.

Academic literature shows the weakening effect is related to the magnitude of cooling. To achieve a material impact on ROP, cooling of greater than 50° C. is required. Substantial weakening and tensile failure can occur with 150° C. of cooling, which cannot be achieved with water alone.

The present invention addresses sealing and temperature issues in drilling within high temperature formations to provide effective drilling for wellbores and geothermal closed loop heat recovery systems. A variety of cooling protocols are also disclosed to facilitate deeper and hotter drilling scenarios to maximize thermal recovery in the most efficient manner.

The technology of the present invention addresses the imperfections in a variety of technology areas and uniquely consolidates methodologies for establishing a new direction in the drilling and geothermal industries.

SUMMARY OF THE INVENTION

One object of the present invention is to provide significant improvements to drilling technology generally and in the realm of geothermal energy recovery.

Another object of one embodiment, is to provide a method for maintaining a temperature differential between a drilling fluid and a rock face being drilled in a drilling operation, comprising selecting between at least one of: a chemical operation for controlling thermal transfer from drilling fluid introduced to the rock face and fluid returning from the drilling operation; and a mechanical operation for controlling thermal transfer from drilling fluid introduced to the rock face and fluid returning from the drilling operation, the differential being 90° C. or greater.

In certain embodiments the method utilizes both operations which may be conducted in a predetermined sequence or simultaneously.

The drilling method is very suitable for high temperature applications and may be conducted in a high temperature geologic formation having a temperature of at least 400° C.

In practicing the method, any pre-existing fissures, cracks and voids in the formation or those created during drilling will be sealed.

In respect of the sequencing, the same may be an alternating sequence of i) drilling while sealing pore space in a formation with ii) drilling with a phase change material with subsequent sealing of the pore space or individually repeating sequences in a predetermined configuration, i.e. a sequence of i), i) and ii), ii); i), ii), i) and i), ii), i) or any other suitable combination. The sequencing will be selected by those skilled in the art.

With the sealing of the pore space, an interface is formed between the drilled formation and the periphery of a drilled borehole. In the cooling operation, further cooling is achieved by using the PCM material(s). Suitable examples of PCM materials are well known in the art, such as those delineated in U.S. Pat. No. 9,758,711, issued Sep. 12, 2017, to Quintero et al., supra. Mixtures of different PCM compositions are contemplated for use in variable temperature formations The phase change material is particularly effective for controlling counter-current thermal transfer between the introduced fluid and the returning fluid.

In further embodiments, the method may include controlling a pressure differential between tubing and the annulus of the drilling apparatus where maximum fusion temperature of the phase change material in the annulus is lower or equal to the minimum fusion temperature of the phase change material in the tubing.

The flow rate of the phase change material is maintained to retain at least partial solid state adjacent the bottom of the tubing whereby the drilling fluid is at a lower temperature than that of a formation face being drilled.

Suitable reagents may be included within the drilling fluid that react endothermically and the reaction may be pressure activated.

In alternate embodiments, the chemical operation may further include positioning an insulating blanket proximate the thermal transmitting surfaces associated with drilling fluid introduced to the rock face and fluid returning. For composition of the blanket, at least one of a liquid, gas, solid, foam, gel, phase change material, oil, composite materials and combinations thereof may be selected. Other acceptable compounds and compositional variations will be appreciated by those skilled in the art.

In respect of the mechanical operations, an example includes treating the drilling apparatus with an insulating material to reduce thermal transfer into the introduced fluid.

Further, components in the drilling apparatus may be selected to have a low thermal conductivity to reduce thermal transfer into the introduced fluid. Any combination of materials may be used to this effect and will result in a normalized and preselected thermal conductivity.

To complement these unit operations, the rate of penetration of the drilling apparatus into the formation may be significantly increased through maintenance of the temperature differential relative to the rate of penetration absent maintenance of said differential.

Another object of one embodiment of the present invention is to provide a drilling method for drilling in a geologic formation, comprising: sequencing i) sealing pore space in a formation while drilling; with ii) drilling with a cooling operation with subsequent sealing of the pore space; and cooling a rock face being drilled in the formation with coolant to increase the rate of penetration during drilling of the formation relative to the rate of penetration absent the use of the coolant.

In this embodiment, the method may include the step of controlling thermal transfer from drilling fluid introduced to the rock face and fluid returning; and controlling thermal transfer between drilling apparatus and introduced fluid to provide a temperature differential of 90° C. or greater between the rock face and the introduced drilling fluid.

As an option, there may be alternation between drilling with the coolant and circulating a sealant to seal said pore space in the formation.

The sequencing of sealing pore space while drilling utilizes an alkali silicate composition in the drilling fluid.

The sequencing may be conducted in an alternating sequence.

Conveniently, the sealed pore space forms an interface between the drilled formation and the periphery of a drilled borehole. To augment the operation, the step of circulating a chemical composition within the borehole which is capable of inducing precipitate formation with the interface fortifies the sealing capacity and mechanical integrity of the interface.

Further still, the method may include the step of circulating a working fluid within the sealed borehole containing an interface maintenance additive for maintaining impermeability during circulation of the working fluid within the borehole.

In one example, drilling into the formation comprises drilling an inlet well and an outlet well to form a closed loop with an auxiliary device, at least a portion of the closed loop being disposed within a thermally productive area of the formation.

Any suitable closed loop arrangement is contemplated including, for example, an L shaped well with a closed terminal end, tube in tube well arrangement, grouped closed loop U shaped wells in spaced relation with an output well member in the group connected to an input well of another group member, a closed loop U shaped well having a plurality of lateral wells commonly connected to a respective inlet well and outlet well, a plurality a closed loop U shaped wells having a plurality of lateral wells commonly connected to a respective inlet well and outlet well arranged with lateral wells of the plurality arranged with the laterals at least partially interdigitated for thermal contact and combinations thereof.

In one example, the thermally productive area is a geothermal zone which may be a high permeability formation, low permeability formation and variable permeability formation and combinations of these.

As a further object of one embodiment of the present invention, there is provided a method for drilling a wellbore into a formation for thermal recovery, comprising: forming, during a drilling operation, a thermally conductive interface between the wellbore and the formation substantially impermeable to fluids, the interface formed by inducing irreversible permeability damage to the wellbore using at least one of a thermal mechanism, mechanical mechanism, chemical mechanism and biological mechanism absent the presence of auxiliary material between a formed interface and the wellbore, the drilling operation being selected from i) simultaneous drilling while sealing, ii) drilling with subsequent sealing and iii) combinations thereof.

Drilling with subsequent sealing comprises drilling with dynamic cooling to cool the rock face being drilled during drilling and the drilling components operable in the drilling operation, followed by sealing with an added sealant material introduced into an unsealed section of the drilled wellbore.

Another object of one embodiment of the present invention is to provide a drilling method utilizing a drill string with tubing and a surrounding annulus, comprising: providing a drilling fluid containing a phase change material; sequencing sealing pore space while drilling in a formation with drilling with the phase change material with subsequent sealing of the pore space; controlling a pressure differential between the tubing and the annulus where maximum fusion temperature of the phase change material in the annulus is lower or equal to the minimum fusion temperature of the phase change material in the tubing; maintaining flow rate of the phase change material to retain at least partial solid state adjacent to a bottom of the tubing whereby the drilling fluid is at a lower temperature than that of a formation face being drilled; and cooling a rock face being drilled in the formation with the phase change material to increase the rate of penetration during drilling of the formation relative to the rate of penetration absent the phase change material.

The drilling fluid temperature is maintained through active phase change of the phase change material during circulation of the drilling fluid.

Flow rate will be selected based on formation temperature.

The technology variations disclosed herein are widely applicable to different scenarios, one of which is remediation. Accordingly, a further object of one embodiment of the present invention is to provide a method for remediating a well including at least one of fractured sections created by drilling or fracturing techniques, unconsolidated rock and sand within an earth formation, comprising: sequencing i) sealing pore space while drilling in at least one of the fractured sections created by drilling or fracturing techniques, unconsolidated rock and sand in the formation with ii) drilling with a phase change material with subsequent sealing of the pore space; and cooling a rock face being drilled in the formation with the phase change material to increase the rate of penetration during drilling of the formation relative to the rate of penetration absent the phase change material.

The well and pore space of at least one of said fractured sections, unconsolidated rock and sand are treated by the addition of a preliminary chemical composition capable of forming a precipitated impervious interface at said sections; and the interface is treated with a second chemical composition for precipitating any unreacted preliminary chemical composition to further seal the interface.

A preliminary chemical composition may comprise an alkali silicate fluid including at least one of potassium, sodium and sodium aluminosilicate.

As a further area of applicability of the technologies herein, another object of one embodiment of the present invention is to provide a method for converting a geothermal well having at least one of fractured sections created by drilling or fracturing techniques, unconsolidated rock and sand, an inlet well and an outlet well in fluid communication, to a sealed closed loop geothermal well, comprising: sequencing i) sealing pore space while drilling in at least one of the fractured sections created by drilling or fracturing techniques, unconsolidated rock and sand in the formation with ii) drilling with a phase change material with subsequent sealing of the pore space; and cooling a rock face being drilled in the formation with the phase change material to increase the rate of penetration during drilling of the formation relative to the rate of penetration absent the phase change material; and circulating a preliminary chemical composition capable of forming a precipitated impervious and thermally conductive interface between the inlet well and the outlet well and in at least one of the fractured sections created by drilling or fracturing techniques, unconsolidated rock and sand whereby a closed sealed well loop is formed with the inlet well, the outlet well, and the area there between.

The working fluid may be circulated within the closed loop continuously, in a variable manner or it may include periods of quiescence.

As yet another object of the present invention, there is provided a drilling method for drilling into a formation, comprising: dynamically cooling a rock face being drilled and sealing pore space in a resultant wellbore in the formation utilizing a composition capable of cooling and sealing in a single operation, wherein the cooling and sealing occur together.

The use of formation permeability damaging techniques is counter-intuitive in the wellbore formation art and particularly in the geothermal art reliant on fluid migration through porosity, fissures cracks, etc.

The methodology employs destructive techniques to reduce permeability of the well walls to the point that only conductive heat transfer from the surrounding rock in the formation transfers the heat into the working fluid designed to recover the transferred heat.

Immediate benefit evolves from this technique, namely reduced or complete lack of use of casings and junctions. This one feature results in enormous savings in the drilling process, the latter comprising the majority of the cost associated with geothermal exploitation.

Through the innovative selection of chemical compounds and treatment sequencing, an impermeable interface between the wellbore and the surrounding formation is synthesized. The result is a faced, coated or interfaced self healing wellbore which, when integrated into a true surface to surface closed loop circuit, provides an exceptional alternative to fracking based geothermal operations and those relying on casing throughout the circuit.

The drilling while sealing operation may be continuous and will include periods of intermittency, where drilling is performed only with subsequent sealing of a drilled segment of the wellbore. In this manner, drilling while sealing may be discontinuous.

Conveniently, the drilling fluid temperature is maintained through active phase change of the phase change material during circulation of the drilling fluid. The flow rate may be selected based on formation temperature.

Operational parameters of the bottom hole assembly (BHA) may be selected to induce a desired hydraulic pressure drop across the BHA at the selected flow rate.

Other operational parameters include, for example, PCM composition chemistry, PCM volume %, flow rate and pressure drop between the tubing and the annulus.

It will be appreciated by those skilled in the art that a plethora of chemical compositions may be used to effect the synthesis of the interface. To this end, those compounds in the drilling fluid which precipitate with the rock surrounding the wellbore may be used. For the second treatment, any suitable compound may be used which reacts with any unprecipitated composition remaining after the first treatment may be used.

The working fluid may be selected to optimize the thermodynamic performance of the geothermal system and to augment the mechanical integrity of the wellbore. Additional treatment operations of the wellbore can be employed to achieve this subsequent to drilling.

Since there is effectively a reserve of unreacted reactive composition, the wellbore can self heal in the event of any sealing issue at the interface. Accordingly, the working fluid not only extracts thermal energy from the formation for maximum operating efficiency, but further ensures seal integrity combined with low maintenance.

Having thus generally described the invention, reference will now be made to the accompanying drawings, illustrating preferred embodiments.

BRIEF DESCRIPTION OF THE DRAWINGS

Similar numerals used in the Figures denote similar elements.

DETAILED DESCRIPTION OF THE PREFERRED EMBODIMENTS

Figure 1:
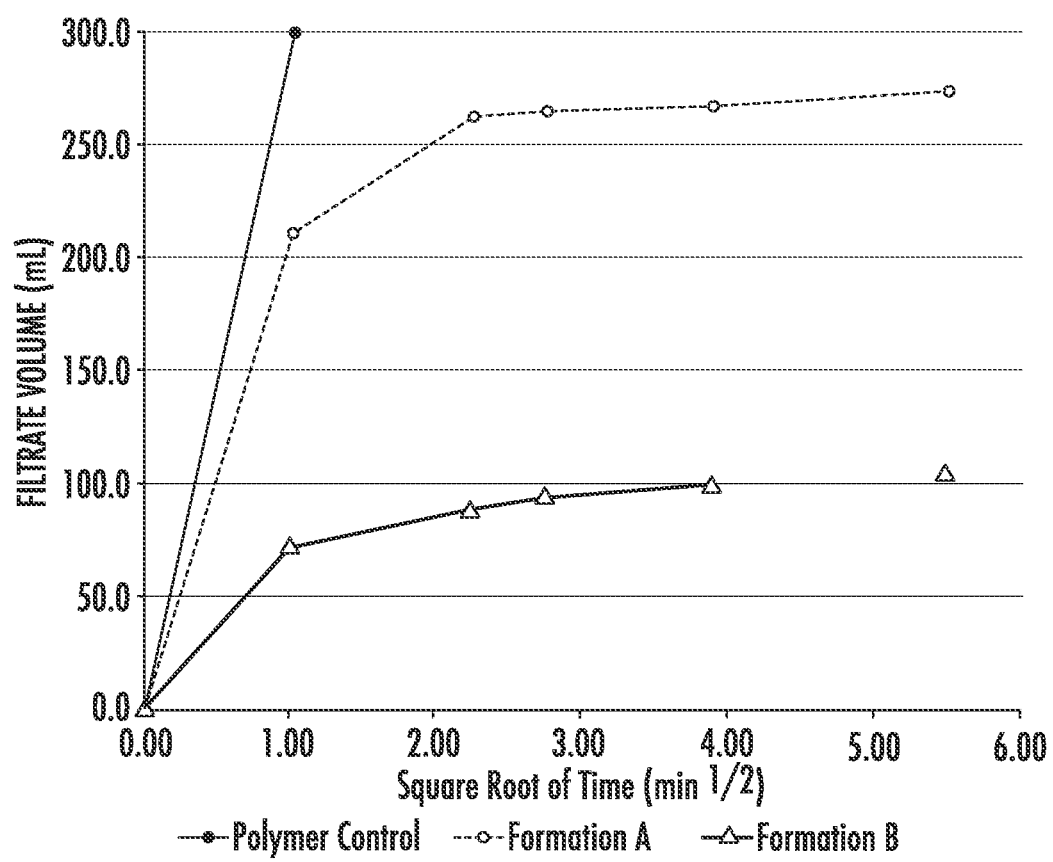
FIG. 1 is a graphical representation filtrate volume as a function of the square root of time for various fluid formulations.

In overview, the technology herein relates to wellbore formation and design with examples for closed-loop geothermal wellbores. The design aspect includes:

i). sealing the wellbore while drilling, drilling with a phase change material with subsequent sealing in a sequence;

ii). augmenting the seal with a chemical treatment subsequent to drilling; and iii). displacing the drilling fluid, post drilling with a circulating working fluid which augments and maintains the seal with self-healing any remaining or generated permeability and maintains wellbore integrity.

The flexibility of the approach allows each of these aspects to be used separately, depending upon the specific geology of the formation, however, they are most effective when integrated and working in concert to create and maintain a closed-loop geothermal system.

The wellbores can be any number of configurations, such as a single U-tube with an inlet/outlet, a U-tube wherein the inlet and outlet well are located on the same surface lease, a "tube-in-tube" configuration which could be vertical, deviated, or horizontal, and include "daisy-chaining" several of these wellbores together, L shaped, etc. These are examples and are not intended to be limiting. Other suitable arrangements will be appreciated by those skilled in the art.

The aspects noted above are particularly effective when used to form multilateral wellbores wherein a plurality of laterals are connected to a vertical well, typically in a U-tube configuration with multiple horizontal laterals connecting a vertical cased inlet well and a vertical cased outlet well. When used in a multilateral configuration several advantages are realized not recognized in the art. These include:

i) The laterals can be initiated, drilled, and completed open hole avoiding the expense and time associated with installing casing:

ii) The "open hole" junctions can be created and sealed while drilling in a single step. This avoids complicated mechanical junctions, cement placement, drilling out plugs or metal sections, multiple trips to surface, and in general the complications and expense associated with intricate downhole processes and resulting delay in forward drilling;

iii) There is no material reduction in inner diameter which enables unlimited number of laterals to be drilled;

iv) There is no reduction in thermal conductivity created by an insulating cement layer or stagnant annulus between steel liner and rock; and v) Enablement to re-enter multilaterals with magnetic ranging equipment to intersect other lateral wellbores and create a closed U-tube wellbore configuration.

In respect of the sealing while drilling aspect, this may be accomplished by including additives within the drilling fluid itself that cause irreversible formation damage and reduce the permeability to zero or negligible levels.

The additives may be biological growth accelerants such as the techniques used in Microbial Enhanced Oil Recovery, physical particulates that create an impermeable filter cake, or chemical sealants that react upon contacting and penetrating into the geological formation such as time-set or thermally-set resins and epoxies, gels, and polymers.

Another method for sealing wellbores while drilling is to thermally seal the face of the rock with extremely high temperatures that melt the wellbore wall, for example by using a high temperature plasma or laser-based drilling bit.

The preferred method is to use a chemical sealant, for example an alkali-silicate based drilling fluid with a pH greater than 10.5, that remains liquid within the wellbore, but precipitates into a solid upon contacting and penetrating into the rock. The technical function of the drilling fluid is different in permeable rocks (for example sandstone or fractured basement) relative to impermeable rocks such as hard shales or siltstones. In permeable formations the liquid alkali-silicate drilling fluid penetrates any available flow paths prior to reacting and setting into a solid. The resulting solid precipitate is impregnated and fused into the pore space and natural fractures within the rock itself and creates a fluid impervious barrier between the wellbore and the geological formation.

In contrast, in rocks with near zero permeability such as shale, the function of the drilling fluid is not to seal off permeability—the rock already has none. Instead, the function of the drilling fluid is to provide a mechanical and chemical barrier between the rock and wellbore and to fill in any natural fractures, fissures, or cleave planes. The end result is the same, to create a fluid impervious barrier between the wellbore and the geological formation.

The sealant may also be used to consolidate unconsolidated sands, increase the compressive strength of the rock, and prevent sand production and sloughing.

As is known, soluble silicates contain three components, namely silica, alkali, and water. Silica (silicon dioxide, $SiO_2$), is the principal constituent of soluble silicates and is stabilized by an alkali. The alkali may be selected from sodium, potassium, or lithium oxide ($Na_2O$, $K_2O$, or $Li_2O$) and is responsible for maintaining the solubility of the silica.

Suitable silicates include potassium, sodium and sodium aluminosilicate. These products are available in both liquid and powdered forms. Silicates are desirable for use in this technology since they can undergo distinct types of chemical reactions, namely gelation (drop in pH), which is the self-polymerization or condensation of soluble silicate structures to form a hydrous, amorphous gel structure of silicate. Gelation is brought on by a drop in pH with polymerization beginning to rapidly occur at pH below 10.5.

Another type of reaction the silicates can undergo is precipitation with cations such as calcium. Precipitation of silicate is the cross-linking of silicate molecules by multivalent cations (i.e. $Ca^{+2}$, $Mg^{+2}$, $Al^{+3}$, $Fe^{+3}$, etc). These cations are present in the formation water—a drilling fluid to formation fluid interaction therefore results in solid precipitation within the pore space.

A further type of reaction the silicates undergo is dehydration. As water is removed from liquid silicate, the silicate progressively becomes tackier and more viscous and eventually becomes a glassy film. These are the reactions that occur in the near wellbore as filtrate from the drilling fluid mixes with fluids within the rock matrix.

Silicates are especially attractive to this geothermal application since they are a stable sealant at ambient conditions and at extremely high temperatures. For example, alkali-silicate and sand is used at temperatures of 650° C. and above in the foundry and liquid metal casting industry, and this basic chemical reaction is also employed to seal concrete structures at ambient temperature.

The alkali-silicate drilling fluid is formulated to be solids free and low viscosity to maximize wellbore fluid invasion and spurt loss to chemically seal the wellbore. For multi-lateral horizontal well segments friction is a significant challenge, so a lubricant is added that is compatible with silicate brine and does not materially interfere with the sealant properties.

The concentration of active alkali-silicate can be from 0.3%-10% but more likely from 3%-6% by mass in water. The optimum concentration depends somewhat on the geological properties such as in-situ brine composition and temperature. Higher rock temperatures can cause a delay in the precipitation reaction. Likewise, formations where the in-situ brine has a low concentration of multivalent cations, for example, below 1000 mg/L, cause a slower reaction. Therefore, as rock temperature increases and multivalent cation concentration decreases, the concentration of alkali-silicate should be increased.

Ancillary benefits of a silicate brine include an enhanced rate of penetration, (ROP), and increased bit life.

The physical properties of the combined rock/sealant material are largely derived from the rock but can be modified by carefully selecting the properties of the sealant. A thermally conductive additive may be included with the drilling fluid, such as graphene nano particles, so that the resulting sealant has a high thermal conductivity.

The energy output of a closed-loop geothermal system can be determined using a thermodynamic wellbore model consisting of a discretized wellbore with multiple thermal resistances between the fluid temperature and the far-field rock temperature. Each discretized segment has an energy and mass balance performed, where fluid properties and calculations are handled with an equation of state thermodynamics package. The heat transfer resistances include the rock, cement, steel casing, and convective heat transfer resistance within the wellbore itself.

As a quantitative example, using a 7" cased and cemented well in contact with a geological formation with a thermal conductivity of 3 W/m K, the thermal resistances after 5 years of operation for the rock, cement, casing, and pipe flow convection are, respectively, 2.2E-02, 2.1E-03, 2.9E-05, and 5.0E-5. The heat transfer is dominated by radial conduction through the rock, and all other thermal resistances are negligible in comparison. Using the chemical sealant described herein, there are no resistances to heat transfer from casing or cement, so the thermal efficiency is approximately 9% higher than prior art methodology. By enhancing the thermal conductivity of the bulk rock/sealant material, heat transfer can be increased further.

The alkali-silicate sealant can be further enhanced by incorporating a solid particulate that is formulated to become chemically embedded/bonded within the alkali-silicate precipitate, to improve seal performance and mechanical integrity. Reinforcing materials such as exfoliated fly ash, surface-activated graphene and graphene oxide, carbon fibres, and others may be incorporated into the drilling fluid. These may be in a nano-dispersed or micro-dispersed state and chemically bond with the precipitated silica.

After the initial seal is made while drilling, the integrity of the seal is tested. Typically, this is done by pressurizing the wellbore system and monitoring the rate of depressurization, if any, as is common in the industry. Another method is through long-term measurement of the leak-off rate during circulating operations. In this case, the drilling fluid is removed and replaced with the working fluid whose primary purpose is to transfer energy to surface, and the leak-off rate is measured during regular operations.

While the seal will be substantially complete after drilling, there may be some small areas with minor permeability remaining, such as fractured zones or highly permeable channels that were not sufficiently sealed while drilling. Therefore, the seal can be augmented using a chemical flush or treatment prior to commencing or returning to normal operations.

When employing alkali-silicate drilling fluid as described previously, the drilling fluid reacts with the in-situ formation fluid to gel and eventually solidify into a hard, high strength solid. These reactions happen at the mixing interface between the silicate drilling fluid and the formation fluid. In a high permeability channel or fracture, the drilling fluid may be migrating through the formation so quickly that the formation fluid is displaced away from the wellbore and the mixing interface is pushed substantially into the rock or the formation brine may be extremely fresh causing the silicate to gel but not completely precipitate.

In these scenarios, a partial or substantial seal is achieved deep within the rock, but the near-wellbore region contains "unspent" or unreacted liquid alkali-silicate drilling fluid and no further formation brine with which to react. Therefore, the purpose of the chemical flush is pump a chemical treatment through the wellbore system with sufficient pressure to cause leak-off from the wellbore into the near-wellbore formation, contact the unspent liquid alkali-silicate remaining from the drilling process, and initiate the precipitation reaction. Suitable chemicals are calcium chloride brine, acids, $CO_2$, surfactants, esters, among others known in the industry.

In another embodiment to augmenting the seal, a chemical treatment may be pumped through the wellbore system with sufficient pressure to cause leak-off from the wellbore into the near-wellbore formation, where the chemical treatment consists of "plugs" or volumes of alkali-silicate followed by a reacting chemical consisting of calcium chloride brine, acids, $CO_2$, surfactants, esters, or others known in the industry. The two chemicals can be alternatively pumped several times resulting in substantial mixing in the near-wellbore region. The volumes of alkali-silicate and reactant may be separated with a spacer to prevent mixing within the wellbore or be in direct contact.

Turning to maintaining the seal and wellbore integrity during operation, the drilling process, as is commonly employed in the oil, gas, and geothermal industry, requires maintenance of wellbore integrity and a partial wellbore seal (i.e. a filtercake), for a temporary duration until casing is cemented in the hole or a liner is installed. The open hole (prior to installing casing or liner) wellbore integrity and partial seal is created by proper engineering and application of the drilling fluid.

In contrast, the invention disclosed herein requires maintaining an open hole seal and wellbore integrity for the operational life of the geothermal asset which is typically 50 years or more.

In addition to creating the seal while drilling and optionally augmenting the seal with a separate chemical treatment, the operational working fluid itself has a key role in maintaining the seal and maintaining wellbore integrity. The primary function of the working fluid is to transport energy from the subsurface rock to surface where it is directly used or converted into electricity or cooling. Therefore, the working fluid must have key physical properties for energy transfer and to maximize thermodynamic efficiency of the system. For example, the fluid may have at least one property selected from the group comprising:
a) a substantially nonlinear temperature enthalpy relationship within the lateral interconnection section between the inlet well and the outlet well at pressures greater than 10 MPa and temperatures less than 180° C. to maximize the temperature differential and heat transfer between the fluid and the surrounding downhole heat source;
b) capable of undergoing a pressure-sensitive reversible reaction which is endothermic at elevated pressure and exothermic at pressure lower than the elevated pressure;
c) a fluid mixture containing a chemical absorption reaction which is endothermic within the lateral interconnection;
d) an aqueous electrolyte solution with temperature and pressure dependent solubility, resulting in an endothermic effect within the lateral interconnection;
e) water-based fluid containing a turbulent drag reducing composition;
f) supercritical fluid such as $CO_2$;
g) ammonia-ethane mixture; and
h) functional combinations of a) through g)

In addition to maximizing thermodynamic efficiency, the working fluid also has many properties of a drilling fluid, namely to:
i) transport solid particulates that may collect in the wellbore to surface where they are removed, typically with a settling tank, filter, or hydrocyclone;
ii) maintain a seal of the wellbore so that it is substantially impermeable to fluids; and
iii) maintain wellbore stability and integrity.

In one embodiment, the seal may be maintained by providing solid particulates within the working fluid that form a filter cake along the borehole wall or bridge and plug natural fractures. These particulates may be carbon fibres, mineral fibres, cellulose fibres, silica, fly ash, graphite, graphene, graphene oxide, calcium carbonate, bentonite, or other particulates known in the industry. These solids are typically added at between 0.5 and 2.0 weight % of the working fluid if its water based, and equivalent volume concentration for other working fluids.

When employing alkali-silicate drilling fluid as described previously, the drilling fluid reacts with the in-situ formation fluid to gel and eventually solidify into a hard, high strength solid. These reactions happen at the mixing interface between the silicate drilling fluid and the formation fluid. In a high permeability channel or fracture, the drilling fluid may be migrating through the formation so quickly that the formation fluid is displaced away from the wellbore and the mixing interface is pushed substantially into the rock or the formation brine may be extremely fresh causing the silicate to gel but not completely precipitate. In these scenarios, a partial or substantial seal is achieved deep within the rock, but the near-wellbore region contains "unspent" or unreacted liquid alkali-silicate drilling fluid and no further formation brine with which to react. Therefore, another method to maintain a seal is to include a reactant additive that upon leaking-off from the wellbore into the near-wellbore formation, contacts the unspent liquid alkali-silicate remaining from the drilling process and initiates the precipitation reaction.

By definition, any areas of the wellbore where permeability remains after drilling will have had considerable influx of alkali-silicate and contain unspent liquid alkali-silicate in the near-wellbore formation. Therefore, including a reactant within the working fluid will naturally seal off the remaining permeable sections. Suitable chemicals are calcium chloride brine, acids, $CO_2$, surfactants, esters, and others known in the industry.

To maintain wellbore stability and integrity, in addition to sealing the rock, the working fluid must exert enough pressure on the formation to provide sufficient compressive strength to prevent breakouts, sloughing, and partial collapse of rock into the wellbore. The pressure that an operational working fluid provides can be calculated using an integrated thermodynamic wellbore model that includes an equation of state to account for phase changes, fluid property changes with pressure and temperature, and hydraulic frictional losses. When designed appropriately, the working fluid must supply the minimum compressive strength across the entire wellbore, either by applying a sufficiently high pressure at the top of the inlet well (pressurized fluid), or by modifying the density of the working fluid. Fluid density can be increased through addition of weighting agents such as barite or through soluble salts, among other techniques known in the industry.

Another method to maintain wellbore stability is to include a shale inhibitor chemical within the working fluid. This chemical has the function of arresting the hydration, swelling and disintegration of clays and shales, and is a common additive in drilling fluids. Suitable additives are amine-based chemicals, latexes, or an aqueous solution of potassium salts, among others known in the industry.

The combination of the above additives and functions results in a working fluid that not only transports energy to surface efficiently, but also reinforces and maintains the wellbore seal, "self-heals" any generated permeability, and maintains wellbore stability and integrity, to preserve a closed-loop geothermal wellbore system that is substantially impermeable to fluids.

Of critical importance is the requirement that the sealant additives do not interfere with the thermodynamic properties of the working fluid. In one embodiment, the working fluid consists of water, a commercially available corrosion inhibitor at between 1 and 10 L/m3, potassium bromide at between 0.05 and 0.3 mol/L, cetyltrimethylammonium surfactant at between 3 and 7 mM, sodium salicylate at between 8 and 16 mM, and calcium carbonate solid particulates at 0.5 weight %.

The solution described above maintains greater than 60% turbulent drag reduction over a temperature range suitable for direct-use geothermal heat supply, which is critical for thermodynamically efficient operation. It also has over 40% recovery when tested according to API RP 13i Procedures for Shale Dispersion by Hot Rolling, reacts with unspent alkali-silicate to form a strong solid material, and the calcium carbonate particles bridge and plug natural fractures and matrix permeability.

In another embodiment, the working fluid itself is simply a modified alkali-silicate brine.

In another embodiment, the working fluid is supercritical $CO_2$ which is of particular value since in many geothermal scenarios supercritical $CO_2$ has thermodynamic efficiency superior to water, and it is also an excellent reactant to cause alkali-silicate liquid to solidify into a strong solid material.

The various sealing mechanisms will now be delineated in the following examples.

Example 1—Chemical Sealing

Initial testing of the sealing capabilities of the silicate system was performed in a permeability plugging apparatus.

Permeability Plugging Apparatus Tests:

20 μm, 3000 mD discs (provided by OFITE) were soaked in a 30% calcium chloride solution overnight (approximately 16 hours) in order to fully saturate the pores with the brine and create a 'severe case' in situ fluid for the silicate drilling fluid with which to react.

Permeability plugging tests (PPT) were run in accordance with OFITE Instruction manual and API RP 13i— Recommended Practice for Laboratory Testing of Drilling Fluids—

250 mL of the test fluids described below was transferred to the PPT cell and a pre-soaked disc was placed in the apparatus. The drilling fluid was allowed to contact the disc for 45 minutes prior to pressurizing the apparatus and beginning the test.

The tests were performed for 30 minutes at room temperature and 500 psi.

Filtrate volume was recorded after 1, 5, 7.5, 15, and 30 minutes.

Figure 2:
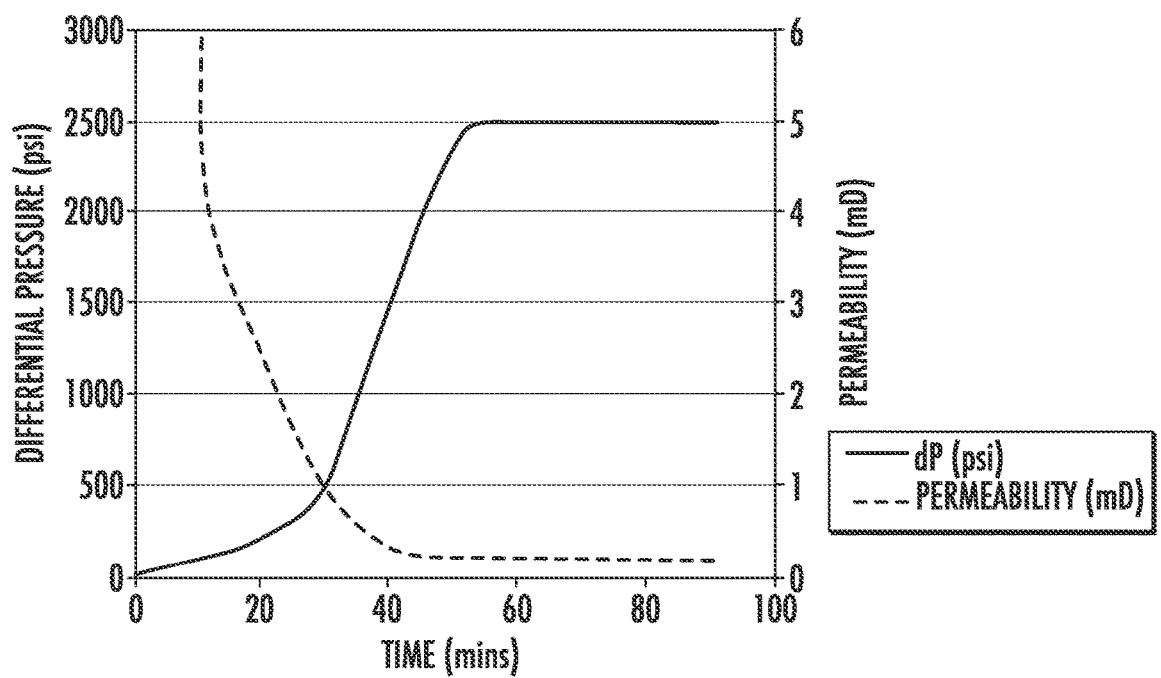
FIG. 2 is graphical representation of differential pressure and permeability data as a function of time for the chemical sealing core flood test delineated in Example 1.

FIG. 2 is a plot of some data that is typical of the test on a ¼" thick filtration disc. A polymer control fluid was flowed through and there is no material reduction of the filtrate volume. When different types of silicates were added, the filtration rates were slowed drastically as precipitation occurred. Note that the permeability has been nearly eliminated even in a ¼" thick disk with 3000 mD of permeability.

Fluid Preparation:

1000 mL of 5 kg/m3 polymer fluid was prepared by mixing xanthan gum (Kelzan XCD™) into fresh water for approximately 30 minutes using a Silverson Mixer at moderate shear rate.

The control fluid was the polymer fluid above.

Formulation A, 30 mL of Ecodrill™ 317, a commercially available product from PQ Corporation, was combined with 270 mL of the polymer fluid above to produce a 300 mL portion of 3% active soluble potassium silicate.

Formulation B, 30 mL of Ecodrill™ K45, a commercially available product from PQ Corporation, was combined with 270 mL of the polymer fluid above to produce 300 mL portion of 3% (V/V) active soluble silicate.

The total PPT Volume was 273.8 mL for the Formulation A, a spurt loss of 257 mL was calculated, and a Static Filtration Rate of 3.1 mL/min was calculated. The total PPT Volume was 103.8 mL for the Formulation B, a spurt loss of 103.8 mL was calculated, and a Static Filtration Rate of 3.7 mL/min was calculated. Values calculated using formulas expressed in API 13i.

Core flood/regain permeability/core damage studies were also conducted. These types of tests are often used to study the effects of a drilling fluid or drilling fluid additive on the permeability of a core obtained from a target production zone of interest. Usually the object of the study is to minimize the damage or maximize the regain permeability. An initial permeability is established and measured by saturating the core with native brine, oil, or some brine/oil mixture, and flowing the formation fluid(s) through the core at pressure at reservoir pressure and temperature conditions. A test fluid is then injected across the face of the core for a certain period of time the volume of filtrate, invasion of fluid, and thickness of filter cake may be measured. Formation fluids are then injected in the reverse direction of flow to determine the extent to which the permeability may have decreased or even increased after exposure to the test fluid. In this study, the aim was to damage the cores by means of gelation and precipitation reactions of the silicate test fluids with the synthetic brine-saturated cores.

Core flood/regain permeability/core damage studies were carried out as follows:

Berea Sandstone cores with permeability approximately 30 mD were saturated with synthetic brine under vacuum and tested with a 3% solution of potassium silicate and containing 2% of a specialty lubricant. Test procedures, parameters and results are set forth below.

Procedure:
1) Plugs were weighed and pre-saturated with brine for 1 week under 15 inHg vacuum.
2) Placed in core flow and permeability to brine was measured.
3) Potassium silicate mud was mixed and heated to 95° C.
4) Mud is injected into core at continuous rate of 3 mL/min.
5) Pressure is monitored over time.
6) Differential pressure builds exponentially over time until ~2500 psi. Breakthrough of fluid is observed.
7) The core does not completely plug off, however ~99% of permeability is lost.
8) Effluent is collected to determine fluid displacement (depth of invasion).

Parameters:
Instrument: Chandler Formation Response Tester
Core Plug: 1.5"×3.0" Sandstone
Temperature: 95° C.
Test Fluid: Potassium silicate at 3% with 2% lubricant
Pore Volume: 16.78
Initial Permeability: 28.32 mD to brine Permeability after mud treatment: 0.197 mD
Permeability Reduction: >99%
Flow rate: 3 mL/min
Brine composition:
NaCl—230.303 g
$CaCl_2$—79.054 g
KCl—8.346 g
$MgCl_2$—13.79 g Shale dispersion testing was then executed to determine the ability of alkali-silicate solutions with lubricant to seal and provide mechanical integrity to shale samples. The methodology is according to API RP 13i Procedures for Shale Dispersion by Hot Rolling as follows:

- an approximately 2 kg piece of Pierre Shale was crushed to yield approximately 900 g of −5/+10 Mesh (2-4 mm) pieces. Pierre Shale is much more reactive and susceptible to water than the mature, hard shale formations typically present at the depths suitable for geothermal. It was chosen as a conservative baseline, actual performance with mature shales will be better.
- The −5/+10 mesh pieces were sieved using ASTM sieves and a Ro-Tap sieve shaker for 2 minutes
- Approximately 10 g of shale was placed in 250 mL of test fluid
- The samples were rolled for 24 hours at 120° C.
- The samples were then poured into a 20 mesh screen after rolling
- Aging cells were rinsed with inhibited fluid (7% KCl) to dislodge any material adhering to the inside walls
- The total amount of material recovered on a 20 mesh was dried to a constant mass at 100 C in an oven
- Each sample was then re-sieved and the mass of the −5/+10 fraction was recorded Results for several different fluid formulations are presented below.

| No | Sample | Initial Mass (g, −5/+10 mesh) | Total Recovered Mass (g) | Recovered Mass (g, −5/+10 mesh) | % Recovery |
|---|---|---|---|---|---|
| 1 | Water | 10.025 | 2.027 | 0.113 | 1.1 |
| 2 | 3% (v/v) Potassium Silicate | 10.041 | 9.895 | 9.799 | 97.6 |
| 3 | 3% (v/v) Potassium Silicate + 2% Lubricant | 10.007 | 10.164 | 9.657 | 96.5 |
| 4 | Mineral Oil | 10.011 | 9.251 | 8.501 | 84.9 |
| 5 | 7% KCl | 10.054 | 9.015 | 7.307 | 72.7 |
| 6 | 10 L/m³ Amine | 10.002 | 6.961 | 5.759 | 57.6 |
| 7 | Working Fluid Composition | 10.175 | 7.102 | 4.514 | 44.4 |

Recovery of over 97% is achieved, indicating excellent sealing and strengthening of the shale. Mineral oil has no reactivity with shale, yet only recovered ~85% of the mass. The loss of mass is due to mechanical degradation during rolling. Therefore, the high 97% recovery indicates that not only is a chemical seal form, but a mechanical hardness improvement is also realized. The working fluid with shale inhibitor added also has a 44% recovery which is substantially improved from fresh water which has only a 1% recovery.

Example 2

A working fluid was tested consisting of water, a commercially available corrosion inhibitor, potassium bromide, cetyltrimethylammonium surfactant, sodium salicylate, and calcium carbonate solid particulates at 0.5 weight %.

Measurement of pressure drop (i.e., drag) and characterization of the turbulent flow was tested using a 2" 200 L capacity heated flow. The loop is equipped with a centrifugal (GIW, LCC-M 50-230) and a progressive cavity (Moyno™, 2F090) pump with high and low shear, respectively. The maximum Re number reaches 500,000 and the loop can operate with 15% volumetric concentration of solid. Pressure drop was calibrated with fresh water and compared to frictional pressure drop at the same flow rate using the working fluid. A turbulent drag reduction of 63% was achieved over a temperature range suitable for direct use heat applications.

To test reactivity with unspent alkali-silicate in the near-wellbore, Ecodrill™ 317, a 29.1% active solution of 2.5 ratio $SiO_2:K_2O$ was mixed into samples of the working fluid. NaOH was used to adjust to a pH of 11-12, and the alkali-silicate solution was injected into samples of the working fluid under gentle agitation to produce a 3% (v/v) and 1% (v/v) solution. These low concentrations were chosen to conservatively represent the near-wellbore unspent alkali-silicate drilling fluid. In each case the addition of the silicate solution into the working fluid caused precipitation, and after 24 hours the silicate was solidified. The results demonstrate the working fluid will reinforce and augment the wellbore seal so that it is substantially impermeable to fluids.

To assess the ability of the working fluid to maintain wellbore integrity and stability, a modified shale dispersion test was performed. The test methodology involves 2 shale dispersion runs back-to-back with the same sample. First, the sample is hot rolled in the sealant, as described above, then re-soaked in the working fluid to determine shale mechanical strength and chemical isolation after sealing.

After the initial shale dispersion run with the drilling fluid sealant, the samples are dried, weighed, and immersed in the working fluid chemistry and rolled for 24 hours.

The samples were then poured into a 20 mesh screen after rolling, and the total amount of material recovered on a 20 mesh was dried to a constant mass at 100 C in an oven. Each sample was then re-sieved and the mass of the −5/+10 fraction was recorded and compared to the mass of the sample after sealed and dried. Interestingly, the results from multiple runs showed over 96% recovery of mass, indicating excellent ability of the working fluid to maintain wellbore integrity.

Example 3—Mechanical Method

In one embodiment, the mechanism may be effected by adding solid particles to the drilling fluid which migrate naturally into the pore space/fractures to reduce permeability. This is generally known as loss circulation material (LCM).

The solid particles may be granular materials, fibrous materials and flaked materials and combinations of these and be present (dispersed through drilling fluid) in sizes necessary to reduce permeability. Suitable sizes may be nanometer to millimeter in size.

Abrams' rule and/or Ideal Packing Theory concepts are useful to establish the most suitable materials. Abrams' rule proposes particle size of the bridging agent should be equal to or slightly greater than ⅓ the medium pore throat size of the targeted formation.

The ideal packing theory proposes a full range of particle size distribution to effectively seal all voids, including those created by bridging agents.

Particles may also be sized to penetrate into the pore space before bridging.

Additionally, drill cuttings can augment the LCM and serve as plugging material.

Any of these LCM products could be utilized for remediating wellbore leaks after the drilling process is completed. Further viscous sweeps with LCM may be pumped at a reduced rate through the open hole section to allow invasion of the LCM and seal any leaks.

Finally, solid silicates (possibly encapsulated) may also provide an effective chemical/mechanical combination mechanism for sealing the reservoir.

Example 4—Biological Method

Microbial Enhanced Oil Recovery (MEOR) is an engineering field which manages the design, growth, and stimulation of microorganisms to increase oil recovery. Most deep geological formations contain anaerobic bacteria within the pore space. These bacteria have a very low supply of energy and nutrients compared to near-surface microbes, and thus have low population densities.

One MEOR technique is to treat the indigenous microbes with nutrients to spur their growth and eventual plugging of the rock porosity with biological material. The nutrients may be any chemistry but typically include potassium nitrate and monosodium phosphate. As bacteria growth is exponential, if supplied with sufficient raw materials and suitable conditions, bacteria can be induced to grow and completely plug off the pore space in which they reside, causing the rock to be substantially impermeable to fluids.

Another technique is to introduce new microbes to the rock formation and simultaneously supplying them with nutrients. These microbes may be engineered to grow only at a certain temperature and so can be activated by injecting into a hot formation.

Either technique can be applied to a conventional drilling fluid, causing the rock to be substantially impermeable to fluids, and form a closed-loop geothermal system.

Example 5—Thermal Method

Geological formations have varying chemistry and thus, varying melting points, although most sedimentary formations melt at 1200° C. or below. Several technologies are in the research, development, and testing phase which can penetrate through rock using thermal disintegration rather than mechanical contact.

One method is to create a plasma either through electric current or nuclear power. The plasma melts the rock and enable continuous drilling.

Another method is to fire lasers onto the surface of the rock, increasing the temperature until the rock begins to spall, disintegrate, and eventually melt.

Another method is to fire high velocity projectiles which release enough energy on impact to increase temperature by hundreds of degrees.

Each of these techniques have the ability to melt porous and permeable rock while drilling, which can then be cooled and annealed to form a hard, durable barrier substantially impermeable to fluids.

Having discussed the method details of the technology, reference will now be made to specific implementations with reference to the figures.

Referring now to FIG. 1, shown is a graphical representation of filtrate volume as a function of the square root of time for different formulations.

FIG. 2 is a graphical representation of differential pressure and permeability data as a function of time for the chemical sealing core flood test delineated in Example 1.

Figure 3:
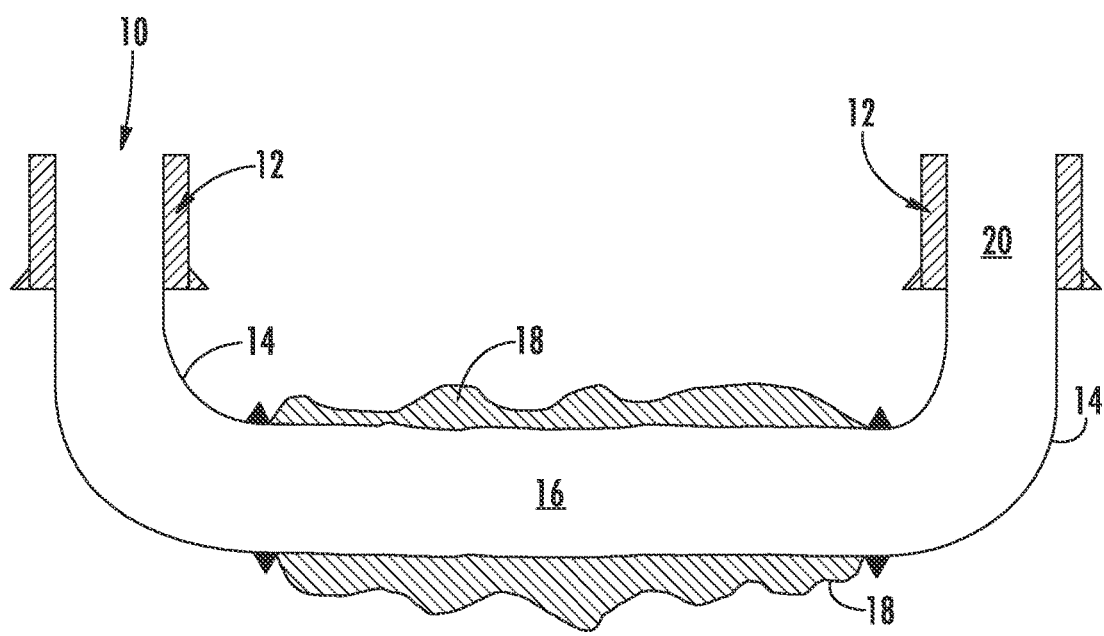
FIG. 3 is a schematic cross section illustration of a well sealed without casing in the lateral section between the inlet well and outlet well.

FIG. 3 is cross section of a well having an inlet well 10 having surface casing 12 for groundwater protection. Intermediate casing 14 is cemented into position as illustrated. All of these components are known in the art. Extending from intermediate casing 14 is the lateral section 16 which does not include casing in this example, but rather is the open sealed wellbore. Pore space surrounding the lateral section 16 is sealed with sealant as described herein previously. The sealed pore space is referenced by numeral 18. the sealed lateral section is continuous to intermediate casing 14. The latter casing then continuously connects with outlet well 20. The outlet well is completed with casing 12.

Figure 4:
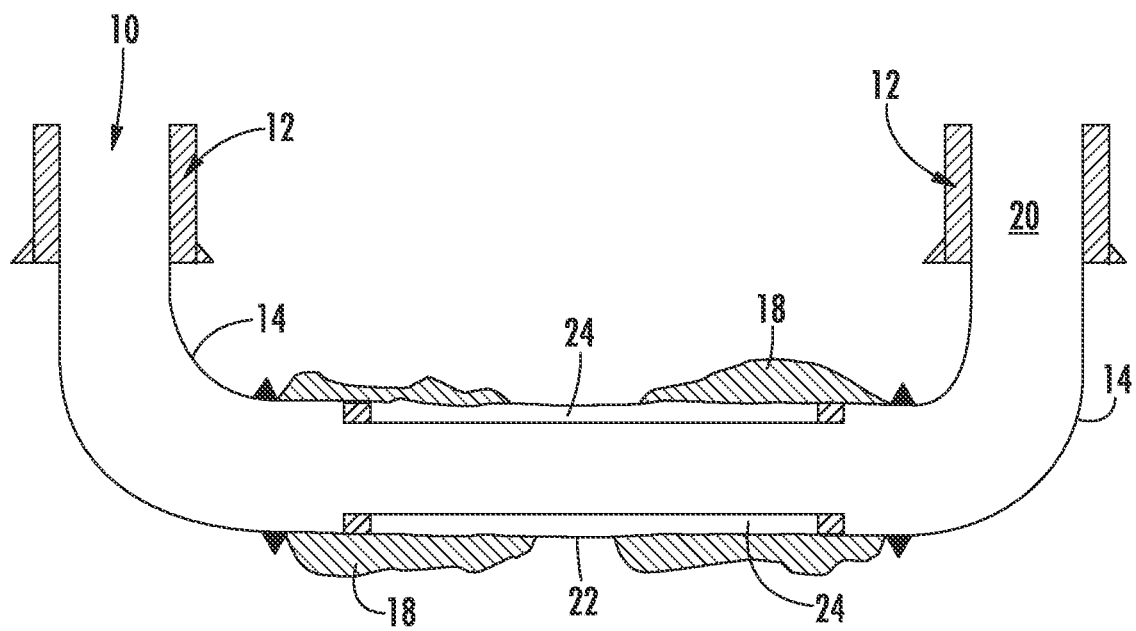
FIG. 4 is a similar view to that of FIG. 3 illustrating a casing string segment in the lateral section and the relationship with the sealant therewith.

FIG. 4 illustrates an alternate scenario. In this example, the lateral section 16 may be intermittently sealed resulting in unsealed rock face 22. In this situation, a casing 24 is shown as a liner, meaning lacking cementing. The liner 22 thus ameliorates the unsealed rock face and maintains a continuous circuit from the inlet 10 to the outlet 20. This may be used in conjunction with continuously sealed sections. This will depend upon the specific geology of the formation.

In respect of the sealed areas in porous or fractured rock, the sealant is not fused with the rock face, but rather is embedded within the rock in the chemical example discussed supra. Generally, FIGS. 2 and 3 depict hard rock.

Figure 5:
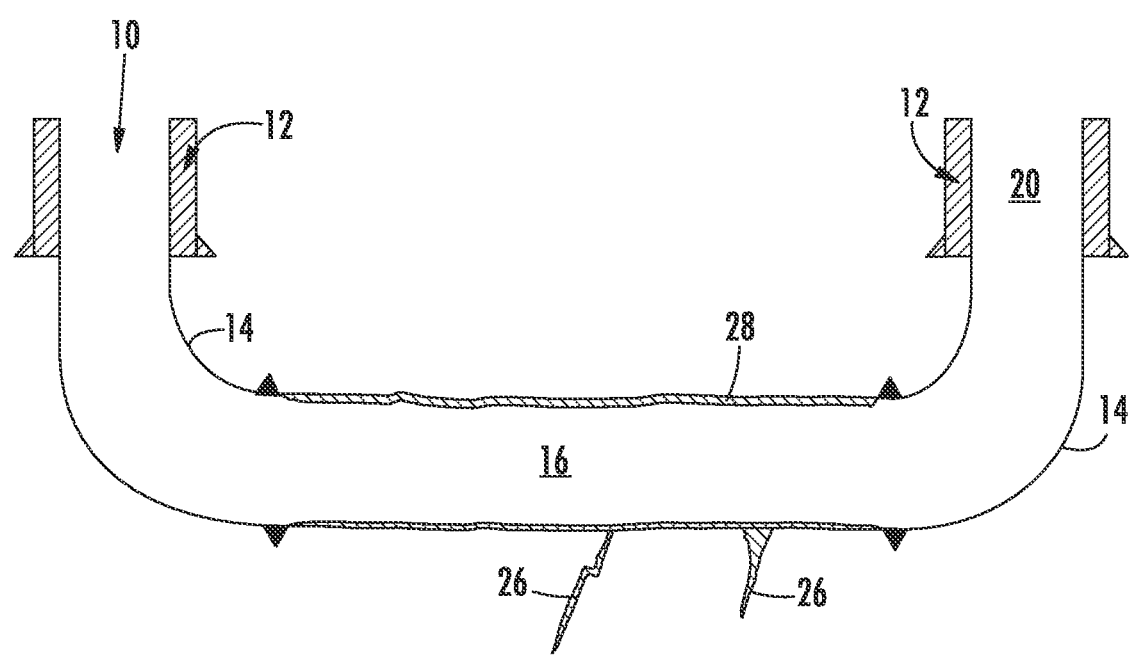
FIG. 5 is a similar view to that of FIG. 4 illustrating a sealed wellbore arrangement in a negligible permeability formation with fissures.

Referring now to FIG. 5, shown is an example where the well is disposed within a less permeable section within a formation, an example of which is a sedimentary shale or mudstone section. In this scenario, the formation may have infrequent fissures, fractures, cleave planes etc. generally denoted by numeral 26. A chemical liner 28 may be employed to complete the continuity between the inlet 10 and the outlet 20 with the chemical liner composition 28 filling the fissures, fractures and cleave planes as shown.

Figure 6:
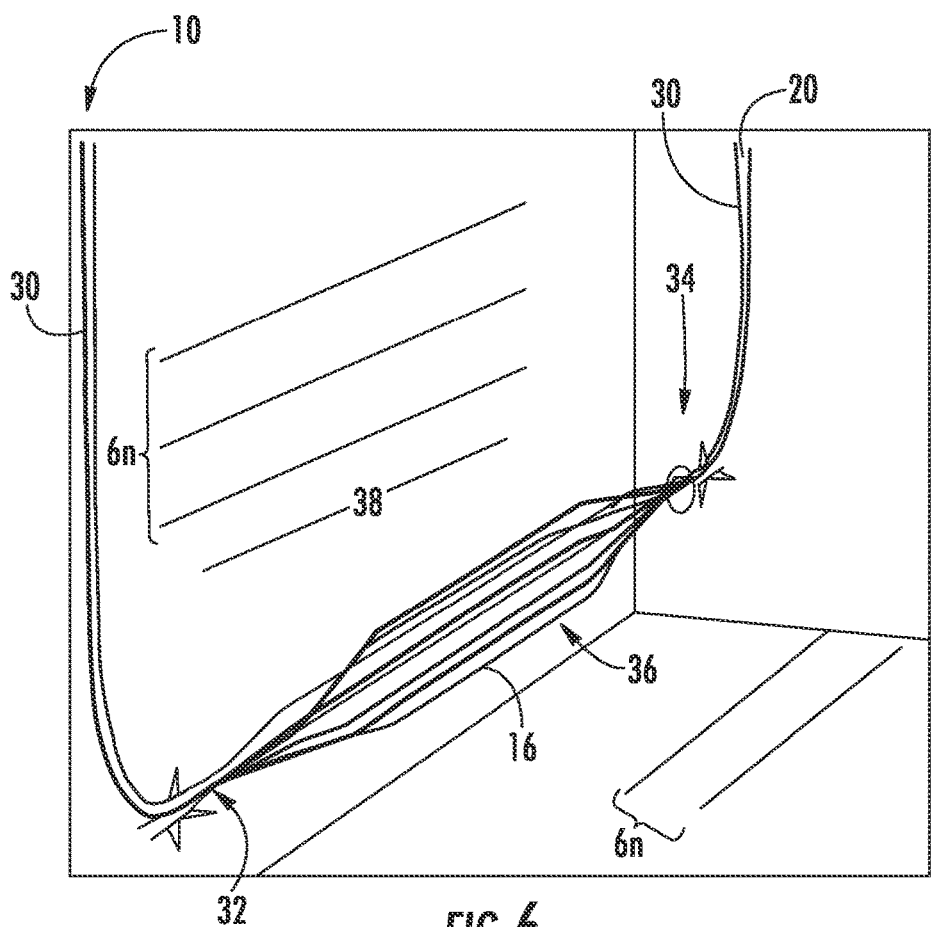
FIG. 6 is a schematic illustration of a multilateral arrangement of lateral interconnecting well segments.

Turning to FIG. 6, a first example of a well configuration is shown. In the example, each of the inlet 10 and outlet 20 include conventional cased sections 30 which communicate with the inlet 32 and outlet 34 of a multiple lateral well system 36. The system is disposed within a geothermal formation 38. The system 36 includes a plurality of lateral wells 16, which may be partially cased depending upon the situation as outlined with respect to FIGS. 3 and 4. Any number of well systems 36 may be employed in the formation 38. This is represented by numeral 6$n$ vertically and horizontally, with the "n" being indicative of any number of further wells in the shape of the system 36 or any other suitable configuration.

The inlet 32 and outlet 34 are integrated with the cased sections 30 in a multilateral junction which will now be referenced in the advancing Figures.

Figure 7:
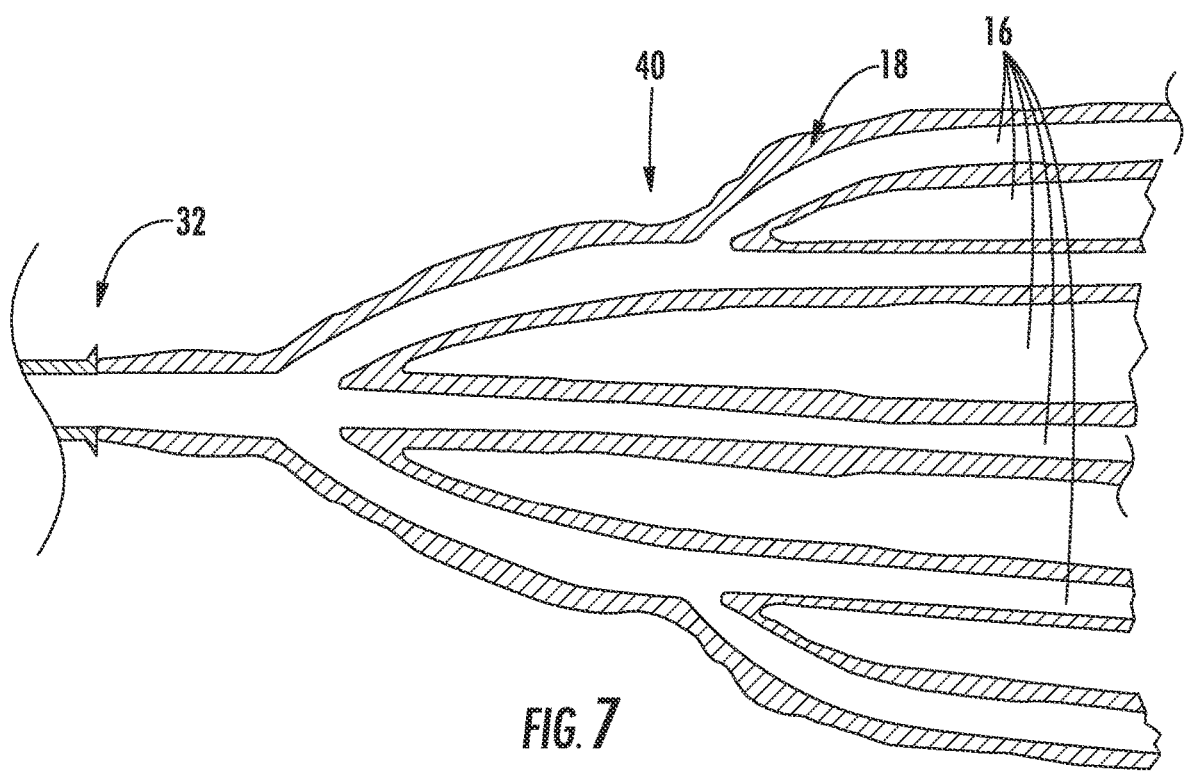
FIG. 7 is an enlarged schematic illustration of a sealed multilateral wellbore section referenced in FIG. 6.

FIG. 7 illustrates one possible multilateral arrangement. Inlet 32 connects with a sealed multilateral wellbore junction 40 from which the lateral sections 16 continuously extend. The lateral sections 16 are spaced apart from one another to maximize thermal recovery from within the formation 38 (FIG. 6). The lateral sections 16 may include casing as discussed with respect to FIGS. 3 through 5. The outlet 34 of the system 36 will include a similar junction 40 (not shown).

Figure 8:
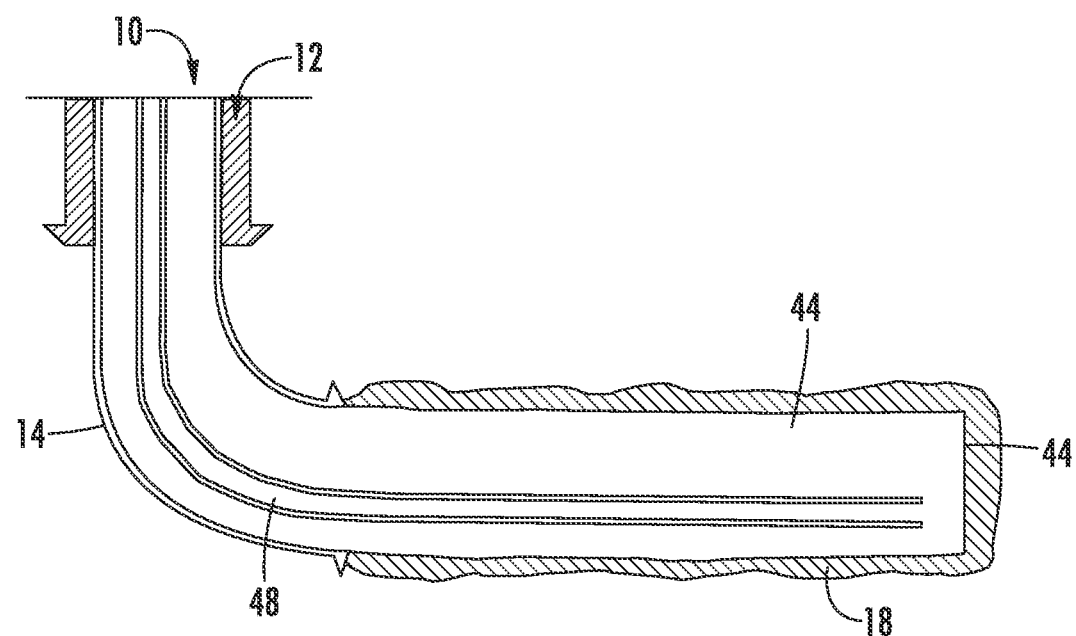
FIG. 8 is a schematic illustration of an alternate geothermal well configuration.

Turning to FIG. 8, an L-shaped well configuration is shown, generally denoted by numeral 42. In this example, the well has an extending section 44 having a terminal end 46 open hole wellbore sealed as with previous examples. An insulated tube 48, extends within the well for fluid delivery. The extending section 44 may be at any selected angle.

Figure 9:
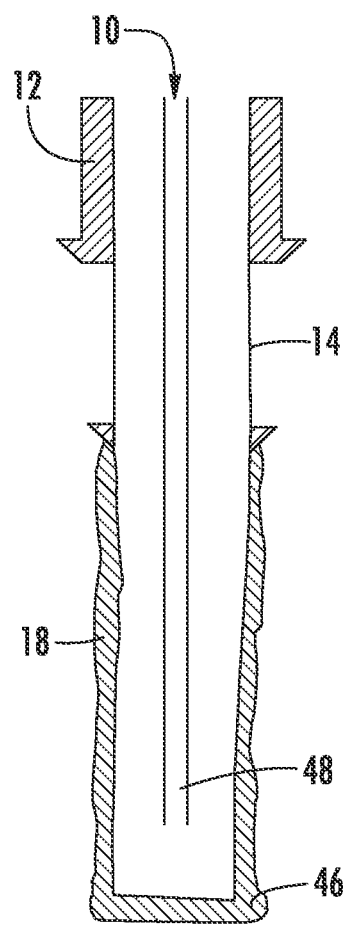
FIG. 9 is a schematic illustration another alternate embodiment of a geothermal well configuration.

FIG. 9 illustrates a vertical orientation example.

Figure 10:
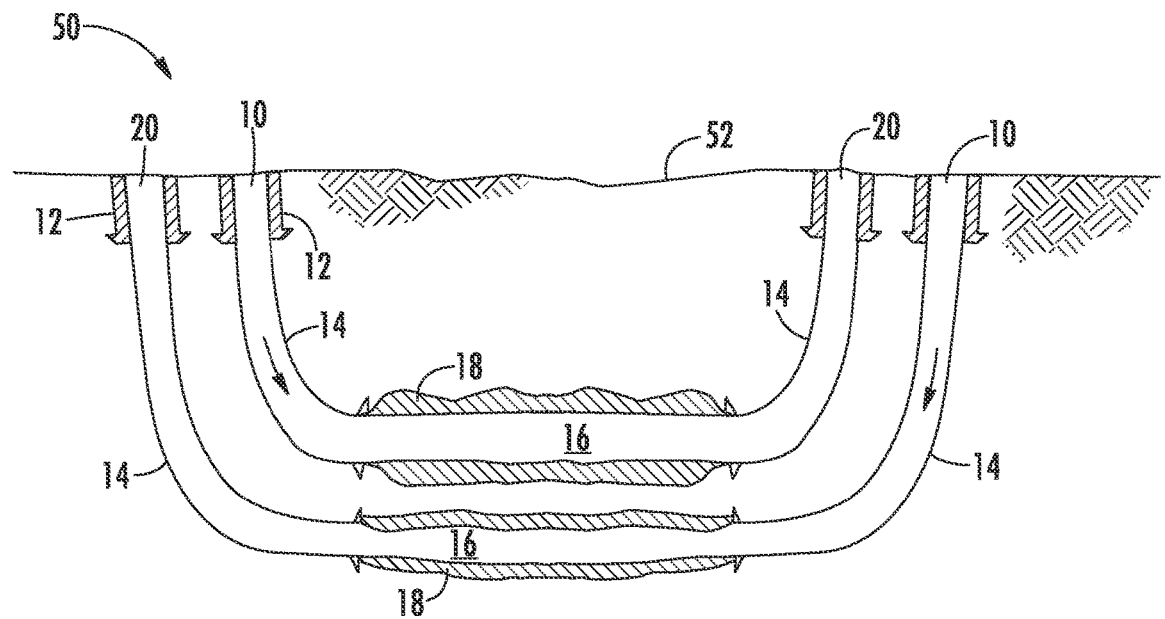
FIG. 10 is a schematic illustration another alternate embodiment of a geothermal well configuration.

In FIG. 10, a W-shaped well is provided represented by numeral 50. The surface is denoted by numeral 52. In this example, output from one well becomes the input of the other well. Flow direction is shown with the arrows. The pattern can be repeated for additional cycles. In this example, the open hole wellbores 16 are sealed as discussed with the previous figures and may incorporate alternating patterns of cased sections with simply sealed wellbore sections. This will depend on the formation geology.

Figure 11:
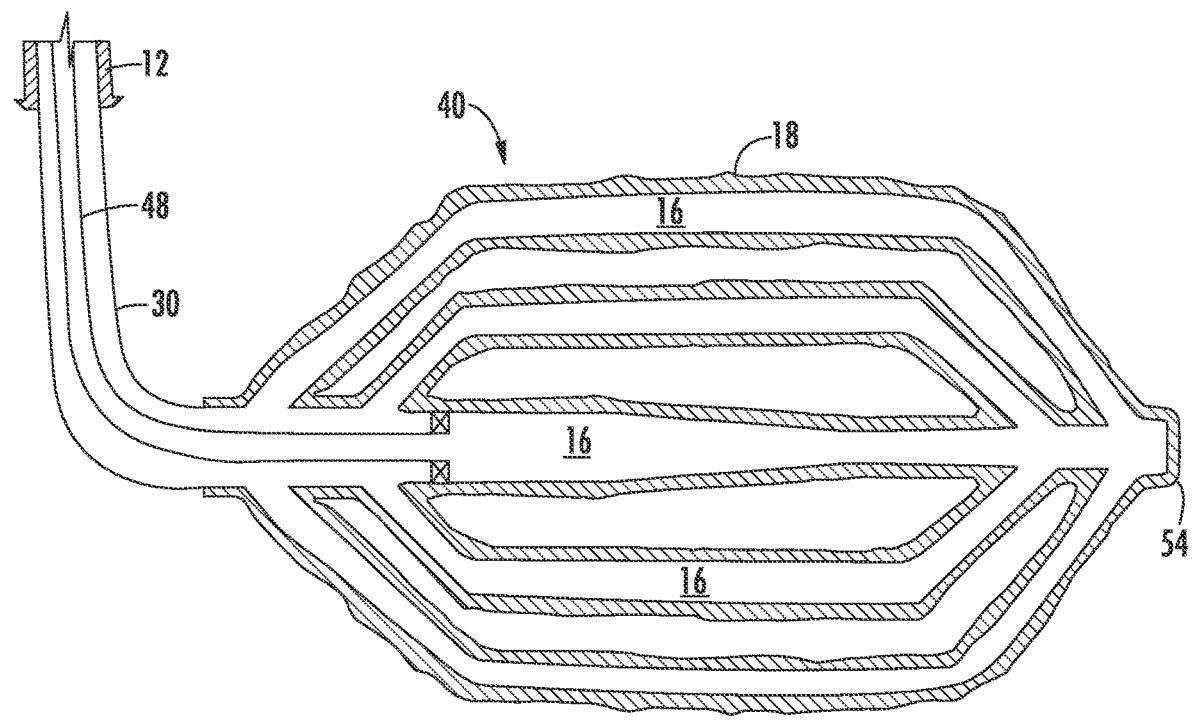
FIG. 11 is a schematic illustration another alternate embodiment of a geothermal well configuration.

FIG. 11 illustrates a further variation of a multilateral system similar to that initially referenced in FIG. 3, which combines the inlet and outlet conduits into a single wellbore, the disposition of the multilateral section may be at any angle within a formation. In this example, the lateral sections 16 converge at terminal end 54.

Figure 12:
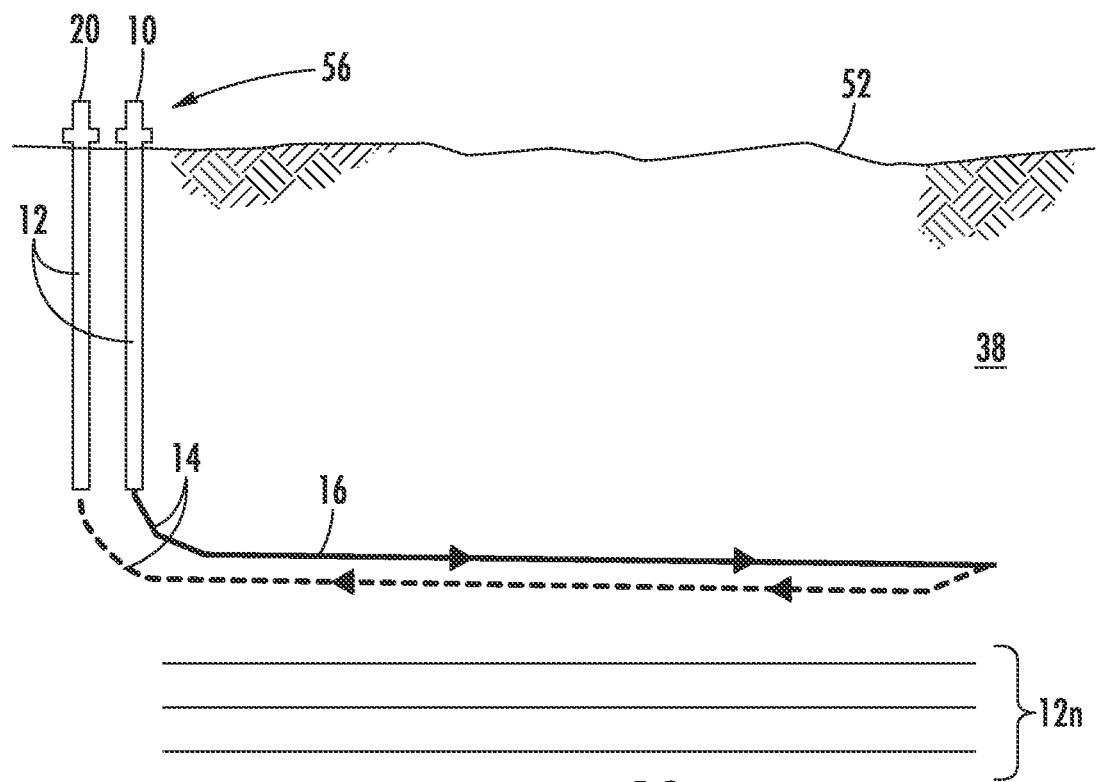
FIG. 12 is a schematic illustration another alternate embodiment of a geothermal well configuration.

FIG. 12 is a side view of a single site arrangement 56 where the inlet well 10 and outlet well 20 are generally proximate. The fluid circuit is shown for the lateral sections 16. As with the previous examples, the open hole well bores are sealed while drilling is conducted with the surrounding pore space sealed during the procedure. The numeral 12n carries the same meaning as that ascribed to 6n referenced in FIG. 6.

Figure 13:
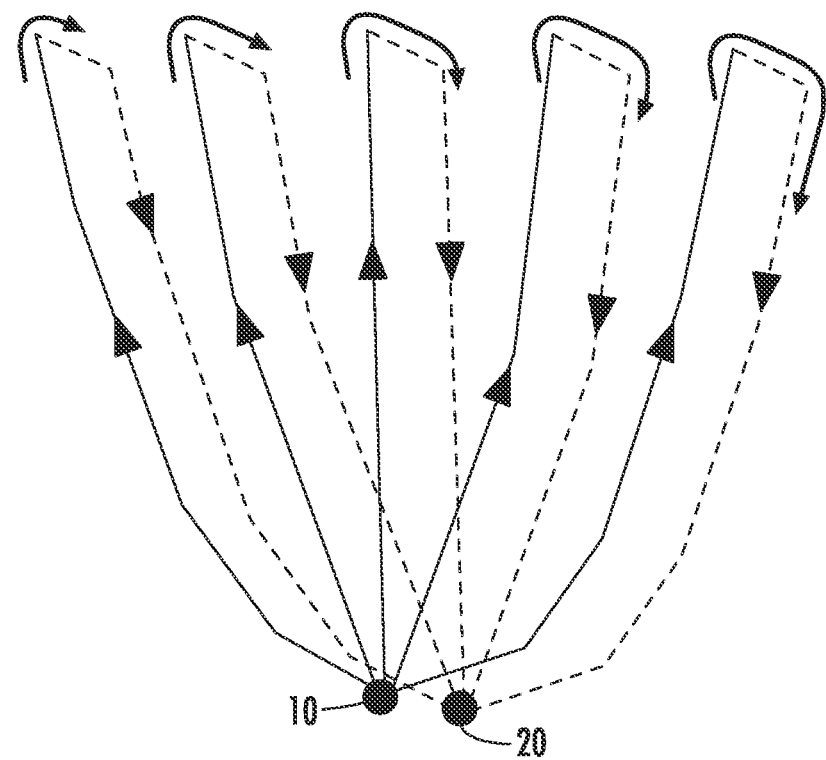
FIG. 13 is a top view of FIG. 12.

A further variation is illustrated in FIG. 13. A top view is shown of a multiple lateral well arrangement. The individual wells 16 of the plurality shown, share a common inlet well 10, extend out within the geothermal zone of the formation (not shown in this Figure) and return in a closed circuit to a common outlet well 20. Flow direction is shown with arrows, and flow can be isolated to each individual loop or daisy chain among the separate loops. This is advantageous for a small footprint while allowing for maximum thermal mining within a geothermal zone.

Figure 14:
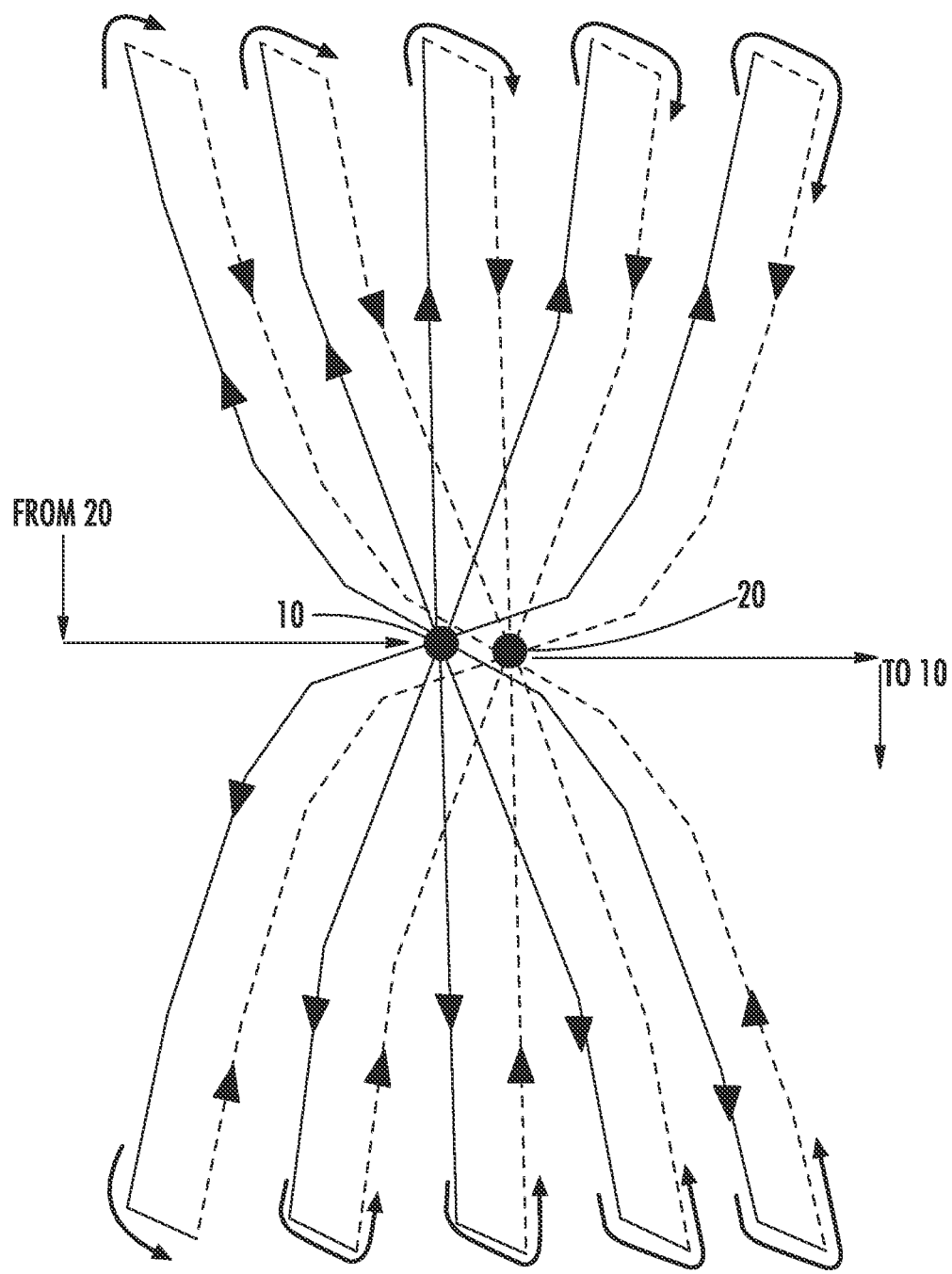
FIG. 14 is a schematic illustration another alternate embodiment of a geothermal well configuration.

FIG. 14 depicts a further variation where there are plural well arrangements provided while maintaining the small footprint attributed to the embodiment of FIG. 13.

Figure 15:
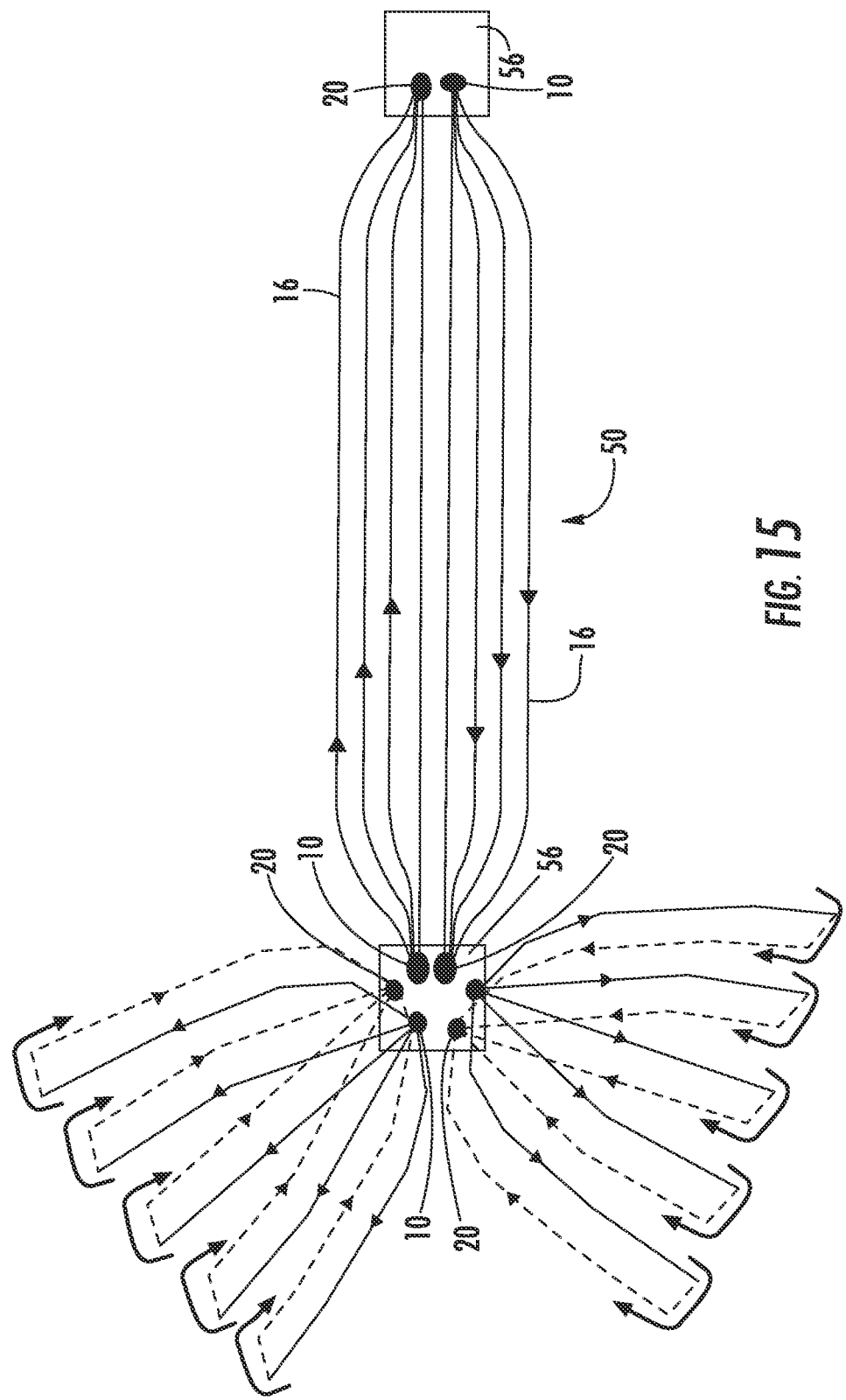
FIG. 15 is a schematic illustration another alternate embodiment of a geothermal well configuration.

FIG. 15 incorporates the multilateral well system 50 in combination with the well configuration initially presented in FIG. 13. In this configuration, two discrete single sites 56 can span a large area with minimal surface invasiveness to mine a large underground geothermal area. Flow direction is shown with arrows, and flow can be isolated to each individual loop or daisy chain among the separate loops. The effectiveness of the sealing technology discussed herein permits the flexibility to provide for such hybrid configurations. This, in turn, allows for thermal mining in a wide variety of geologic situations allowing for yet another degree of freedom in practicing the methods herein.

Figure 16:
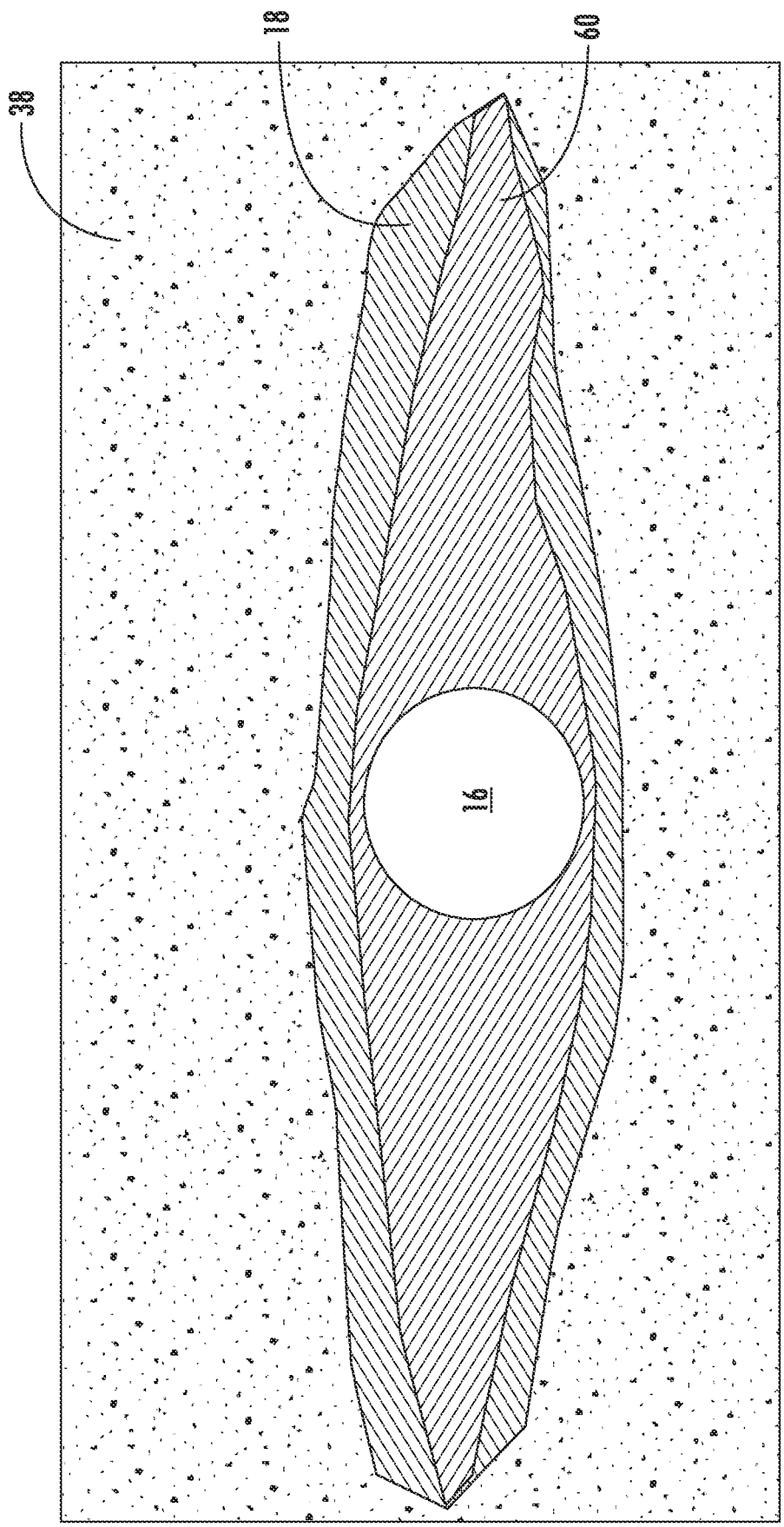
FIG. 16 is a cross section of a drilled wellbore within a high permeability formation illustrating the reserve of unreacted sealant.

In more focused detail, FIG. 16 illustrates a cross section of a drilled wellbore, also referenced herein as a lateral section 16. The geothermal formation 38 in this example is a high permeability formation. Due to the permeability, the sealant spreads out within the pore space in the formation and immediately proximate the wellbore 16 remains unreacted, referenced by numeral 60. Outwardly from the unreacted sealant area is pore space sealed with sealant which, as in the previous examples, is denoted by numeral 18.

Figure 17:
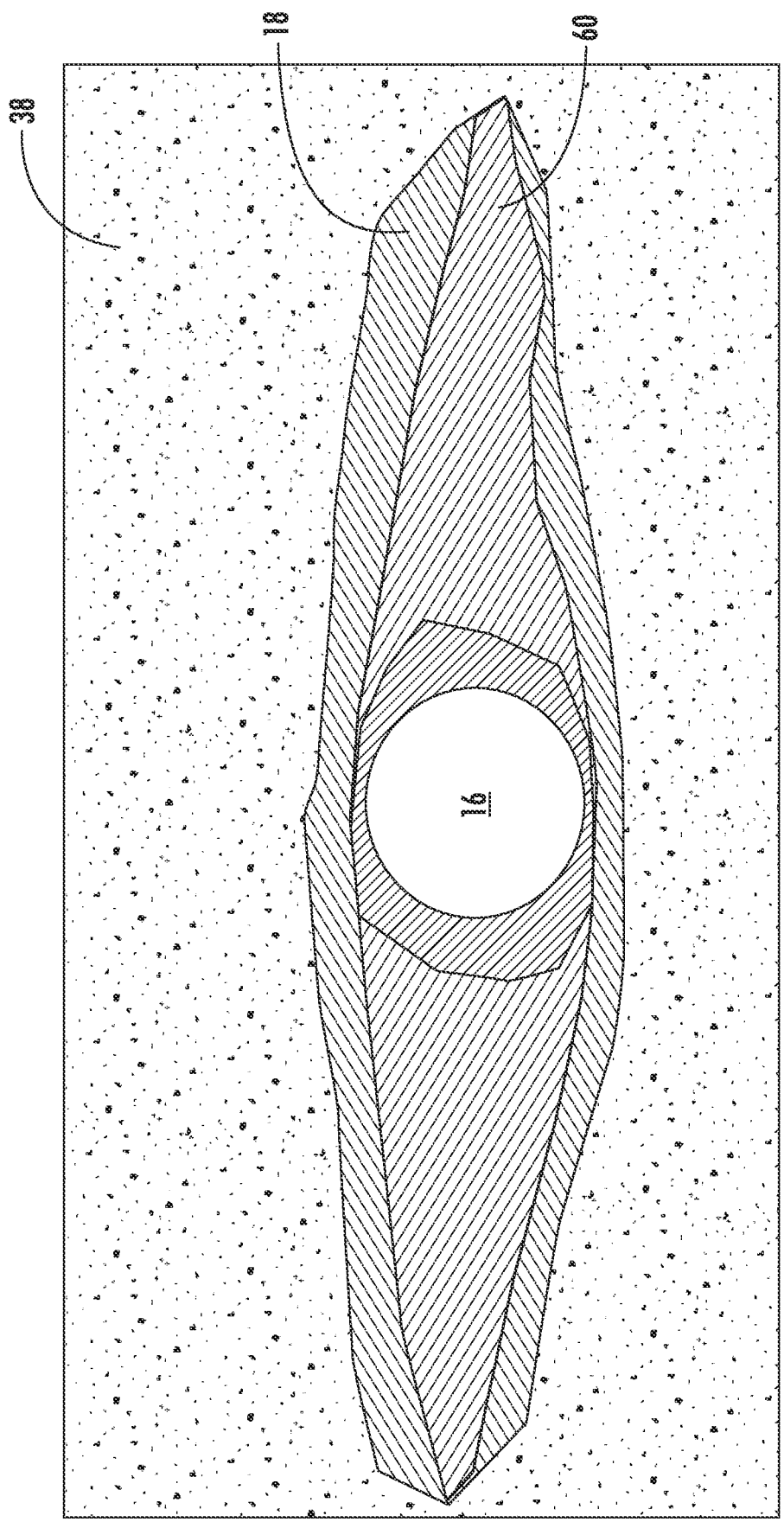
FIG. 17 is a view similar to FIG. 16 illustrating the transformation of the wellbore interface subsequent to circulatory contact with the working fluid.

FIG. 17 illustrates the result of exposing the wellbore from FIG. 16 to working fluid. Subsequent to this treatment, the formation area surrounding the wellbore becomes sealed forming an impervious interface between the interior volume of the wellbore itself and the formation surrounding it. This is particularly advantageous since the sealed wellbore 16 is surrounded by a reserve of unreacted sealant 60. In the event of wellbore seal compromise from seismic activity or other deleterious activity, the wellbore can sustain its integrity and sealing capacity by self healing with the reaction between the reserve of available reactant and the working fluid. This clearly has very significant advantages in terms of reducing operating and maintenance costs over time which, of course, greatly mitigates the initial capital expenditure associated with initially synthesizing the well system.

Figure 18:
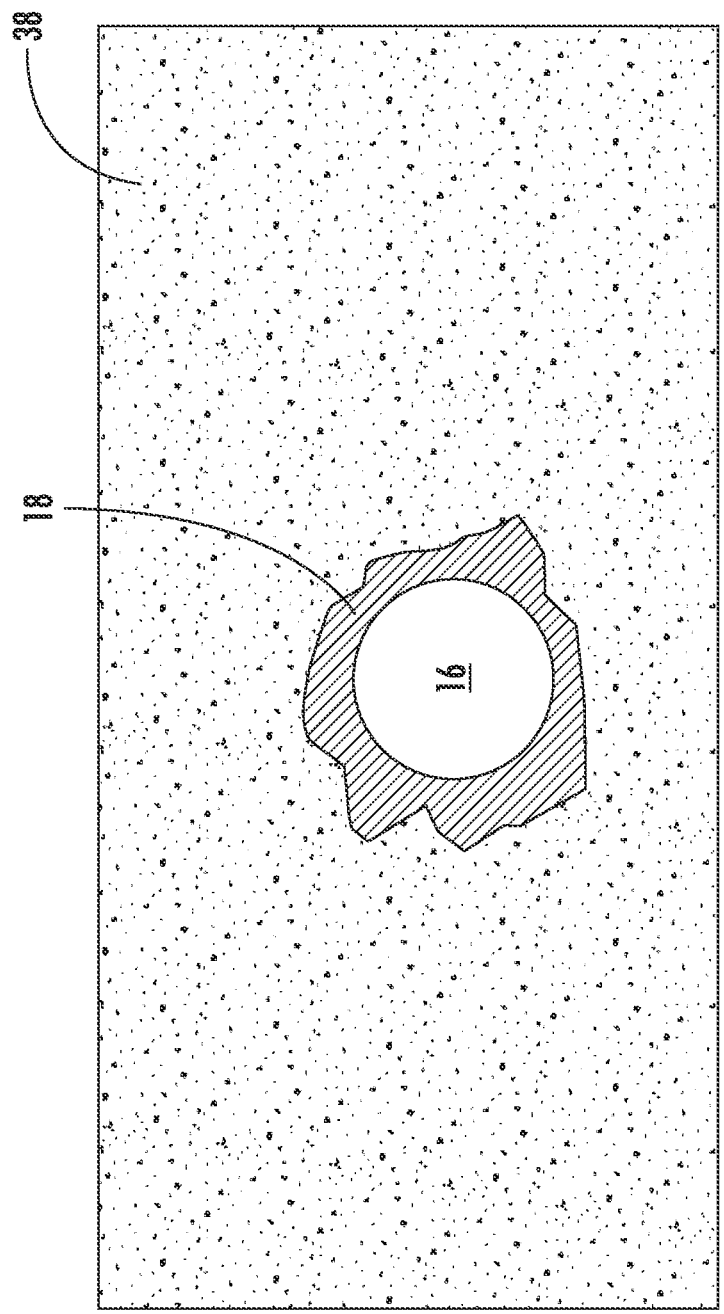
FIG. 18 is a schematic cross section illustration of a drilled wellbore in a low permeability formation and the interface with the surrounding formation.

In respect of rock with low or average permeability, an example of which is granite, mudstone, or shale, the pore space, fractures, fissures, cleave planes etc., may be filled with sealant about the periphery of the wellbore 16 to form an impervious interface in a single step without requiring reactive working fluid or further treatment as depicted in FIG. 18. Accordingly, it will be realized that geological permeability does not present any geothermal heat mining issues considering the scope of the methods discussed herein.

As ancillary benefit, the technology can extend into the remediation and retrofit realms. One of the foundations of the technology herein is an environmentally friendly solution to energy creation in the geothermal field which circumvents fracturing necessitating unappealing fluid handling. A second foundation is that the technology provides a truly closed loop system as opposed to that which has been improperly characterized in the prior art as closed loop.

Since the technology allows for a highly effective sealing protocol with the enumerated geothermal recovery benefits, it has been found that the technology can be applied to remediating ineffective, unused or otherwise inoperable geothermal wells. These wells may be unusable or inoperable due to any number of issues such as low flow rates, ineffective fractures, unconsolidated formations and consequent sand production problems, excessive corrosion from the brine, or due leaching problems, among others. Accordingly, where retrofit to a new non fracking geothermal arrangement as discussed herein is not possible, the inoperable site will be abandoned by removal of unnecessary casing and ancillary components, or where possible remediated with expensive and environmentally contentious operations such as fracking or potentially by redrilling entire wells. In light of the fact that permeability degree is not an issue, the sealing technology presents an attractive remediation benefit.

Regarding conversion or retrofit of existing geothermal wells, the pre-existence of the wells, allows for the technology to be deployed with significant economic advantages, eliminates the need for fracturing fluid management, induced seismicity, and environmental risks, and renders a retrofit site, previously widely recognized as an environmental unfriendly energy source, as a green energy platform from which to further build.

In terms of additional implementations of the technology scope, reference will now be made to the advancing figures.

Figure 19:
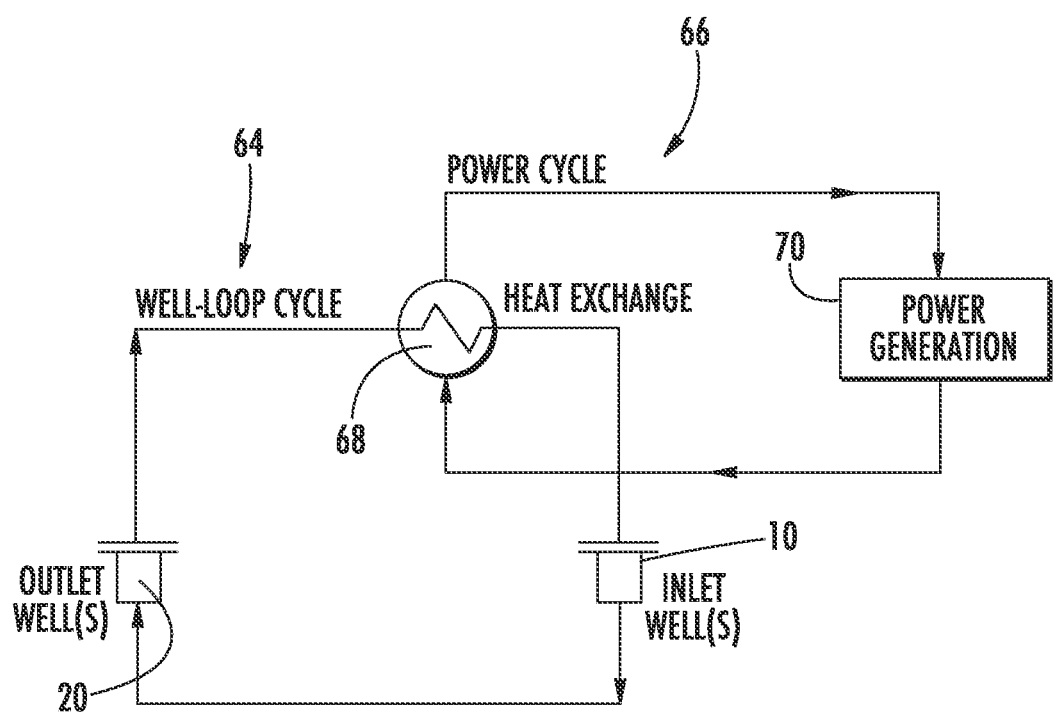
FIG. 19 is a schematic illustration of a power cycle implementation of the geothermal wellbore methodology.

In FIG. 19, the well loop 64 comprises a closed loop system having an inlet well 10 and an outlet well 20, disposed within a geological formation, which may be, for example, a geothermal formation, low permeability formation, sedimentary formation, volcanic formation or "basement' formation which is more appropriately described as crystalline rock occurring beneath the sedimentary basin (none being shown).

The well loop 64 and power cycle 66 are in thermal contact by heat exchanger 68 which recovers heat from the working fluid circulating in the loop 64 in the formation which is subsequently used to generate power with generator 70 in cycle 66. As an example, the temperature of the formation may be in the range of between 80° C. and 150° C.

In the arrangement illustrated, two distinct working fluids are used. Further detail concerning the fluids will be discussed herein after. Modifying the working fluid used within the well loop operation of the system is possible at low temperatures.

As such, currently available power generation modules usually limit the input temperature of the power cycle working fluid to above 0° C. in the primary heat exchanger. A higher turbine pressure ratio is enabled by dropping the working fluid temperature below zero. However, conventional geothermal projects are limited by potential freezing of the geothermal fluid on the other side of the heat exchanger.

These limitations in present technology are traversed by implementing a segregated power cycle system in combination with a closed loop well.

The fluids may be modified with additives to prevent freezing at subzero ° C. temperatures. Suitable additives include, anti-scaling agents, anti-corrosion agents, friction reducers, and anti-freezing chemicals, refrigerants, biocides, hydrocarbons, alcohols, organic fluids and combinations thereof.

A substantial benefit of the tailored well-loop working fluid in combination with the segregated power cycle is that it is unaffected by very cold ambient temperatures and thus facilitates use of any generic power cycle (including ORC, Kalina, carbon carrier cycle, CTPC) to be used to increase higher net power production when used in conjunction with a well loop as set forth in FIG. 19. In this arrangement heat is transferred from the first working fluid to the second working fluid when the temperature of the second working fluid is at zero ° C. or subzero ° C.

Figure 20:
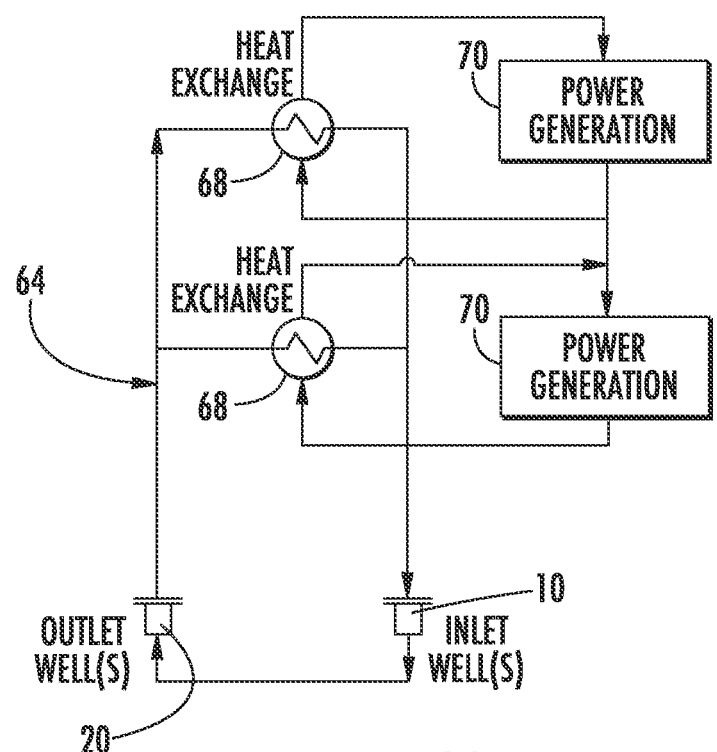
FIG. 20 is a schematic illustration of an alternate embodiment of FIG. 19.
Figure 21:
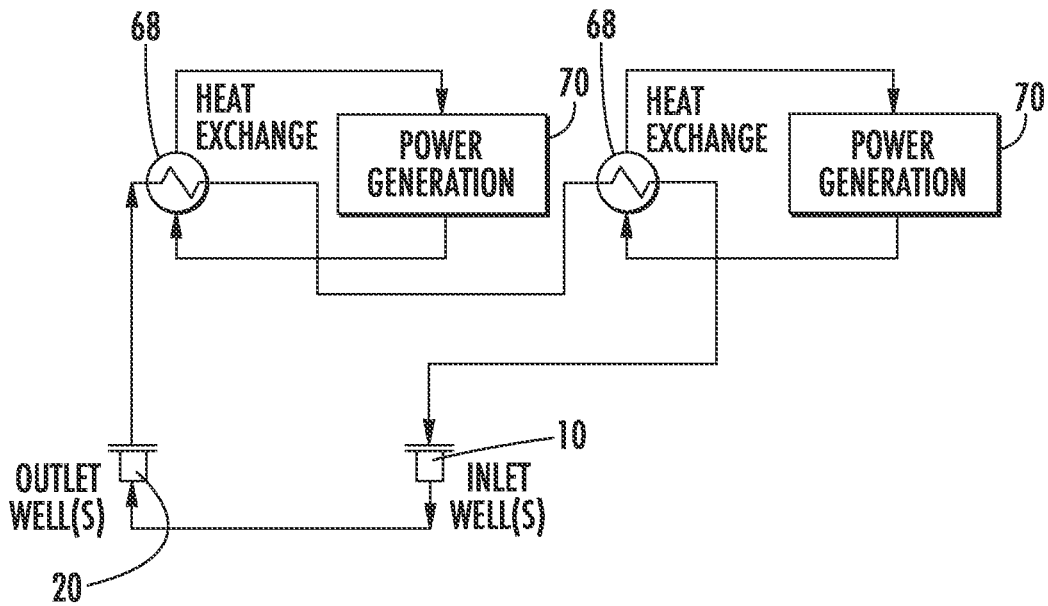
FIG. 21 Is an alternate embodiment of FIG. 20.

Optional arrangements with the segregated circuit are illustrated in FIGS. 20 and 21.

FIG. 20 illustrates a segregated circuit incorporating a well loop 64 in thermal contact with two distinct heat exchangers 68 each with its own power generator 70 forming a parallel arrangement. Similarly, FIG. 21, illustrates a serial arrangement.

Figure 22:
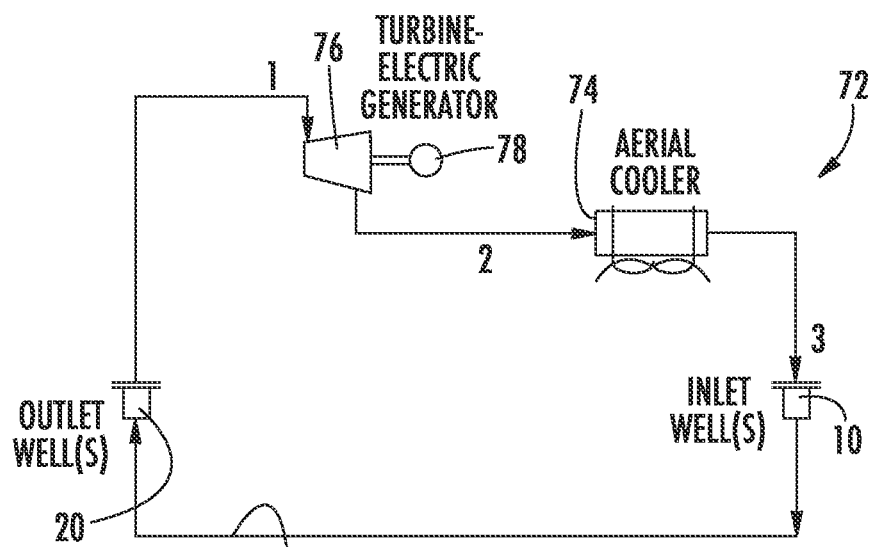
FIG. 22 is a schematic illustration of an integrated geothermal circuit incorporating a turbine and generator directly driven by the geothermal working fluid.
Figure 23:
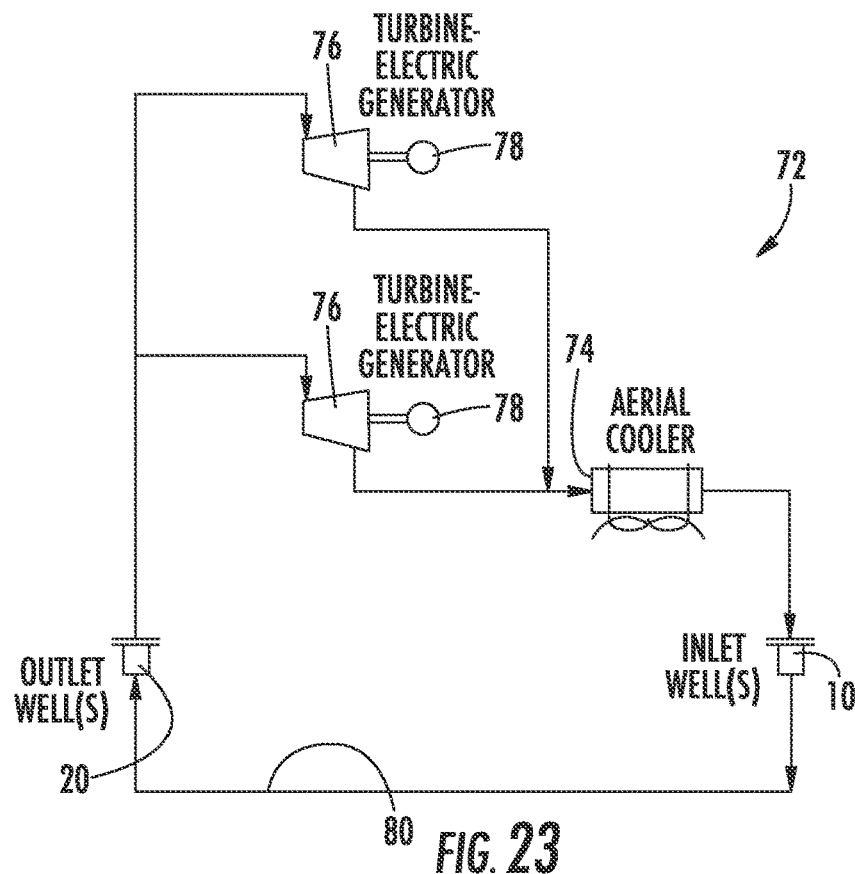
FIG. 23 is a schematic illustration of an alternate embodiment of FIG. 22.

The integrated well loop power cycle is a closed loop system in which the selected working fluid is circulated within the well loop and then flows into a turbine on surface as shown in FIG. 22. Numeral 72 denotes the overall process schematic. In this process, a single-fluid is used rather than having a discrete well loop fluid and a secondary power cycle working fluid. The working fluid in this closed loop cycle can operate either as a transcritical cycle, whereby the fluid is supercritical at the upper working pressure and subcritical at the lower working pressure, or as an entirely supercritical cycle whereby the fluid remains supercritical at the lower working pressure. FIG. 23 illustrates an alternate embodiment.

Figure 24:
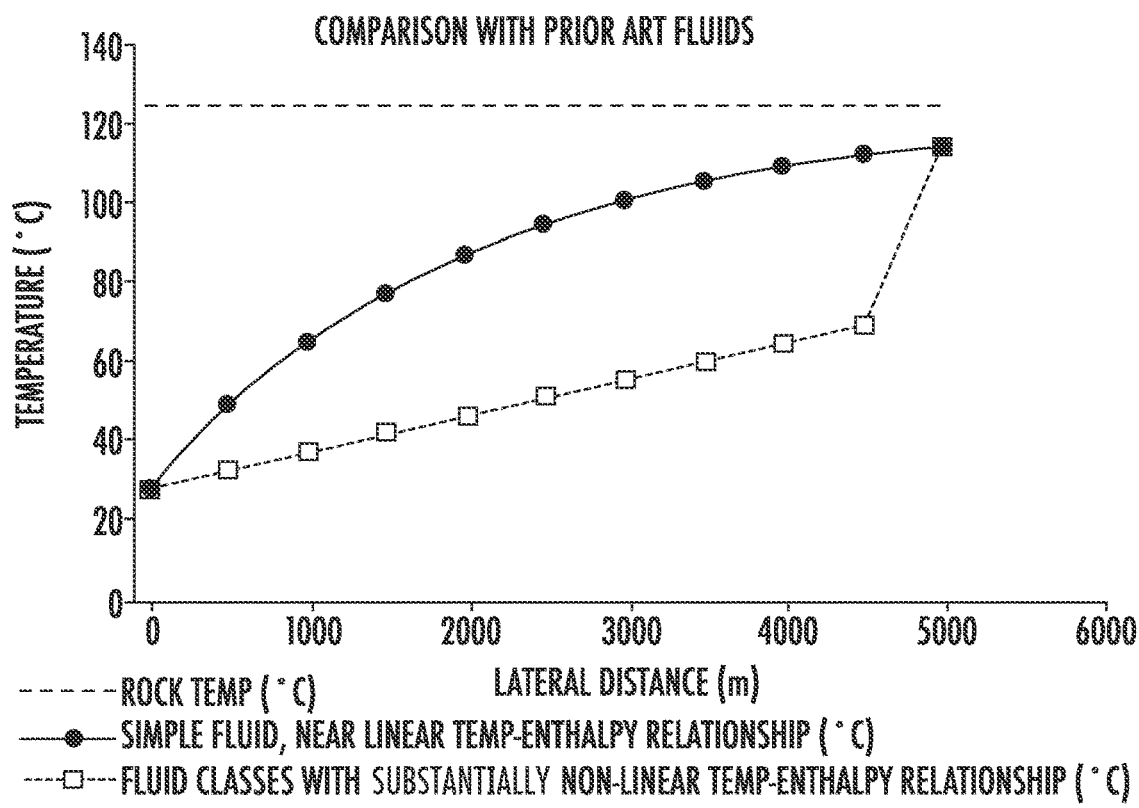
FIG. 24 is a graphical representation of temperature data over distance for different working fluids.

As is known, a transcritical cycle is a thermodynamic cycle where the working fluid goes through both the subcritical and supercritical states. The apparatus further includes a cooling device, shown in the example as an aerial cooler 74 and turbine 76 with generator 78. The aerial cooler 74 is used to cool the working fluid to a temperature between 1° C. and 15° C. above ambient temperature. It is also to be noted that the working fluid can be cooled to a subzero ° C. temperature. Reference to FIG. 24 delineates performance data.

The driving mechanism in this integrated cycle is a very strong thermosiphon which arises due to the density difference between the inlet vertical well 10 and the outlet vertical well 20. The fluid is in a supercritical liquid state in the inlet well 10, heats up as it travels along the lateral interconnecting sections 80 and exits in a supercritical state in the outlet well 20, which creates significant pressure.

The thermosiphon effect can completely eliminate the need for a surface pump under normal operating conditions except during start-up. Advantageously, this eliminates the power required to operate the pump and increase the net electrical power output.

Working in concert with the well loop circuit is the use of customized fluids and mixtures tailored to the wellbore layout, depth, length, and ambient temperature. The prior art only discusses the use of carbon dioxide or pure hydrocarbon fluids. With a closed-loop system such as that discussed herein, the initial cost and complexity of a fluid mixtures is only a minor factor in the overall economics. So other fluids can be used such as a fluid having a nonlinear temperature enthalpy relationship within the interconnecting segment between an inlet well and an outlet well at pressures greater than 10 MPa and temperatures less than 180° C. to maximize the temperature differential and heat transfer between the fluid and the surrounding downhole heat source, i.e. surrounding rock.

It has been found that fluids that exhibit a substantially non-linear temperature-enthalpy relationship within the lateral portion of the well loop and/or that exhibit a pressure-sensitive reversible reaction which is endothermic at elevated pressure and exothermic at pressure lower than the elevated pressure can increase power generation considerably. This develops because the average temperature differential between the far-field rock temperature and the circulating fluid temperature is increased, driving increased heat transfer from the geologic formation.

An example of this type of fluid for use in a segregated configuration is an aqueous precipitate/electrolyte solution with temperature-dependent solubility, wherein the water is super saturated at the top of the inlet well. The solid particles are held in suspension with an anti-scaling agent (anti-flocculation agent) and with turbulent flow (similar to a drilling mud). In the lateral sections, the temperature is increasing, hence the solubility of the solids held in suspension is also increasing. This allows the solution to endothermically absorb heat from the rock (basically increases the effective heat capacity of the fluid) as the solid particles dissolve into the water. In the heat exchanger to the segregated heat-to-power cycle, temperature is decreasing, so the solid substance is precipitating exothermically.

Useful fluids include aqueous solutions with the following solutes as examples: Ammonium acetate, ammonium dihydrogen phosphate, ammonium formate, ammonium nitrate, potassium bromide, potassium chloride, potassium formate, potassium hydrogen carbonate, potassium nitrate, sodium acetate, sodium carbonate and monosodium phosphate.

To use a single turbine and have adequate efficiency over an entire range of ambient conditions is problematic. It has been found that use of two or more turbines in series or parallel which are optimized for different ambient conditions addresses the problem. During periods of colder temperatures, control logic (not shown) automatically shifts the working fluid to the appropriate turbine to maintain high efficiency throughout the year.

Figures 25, 25A:
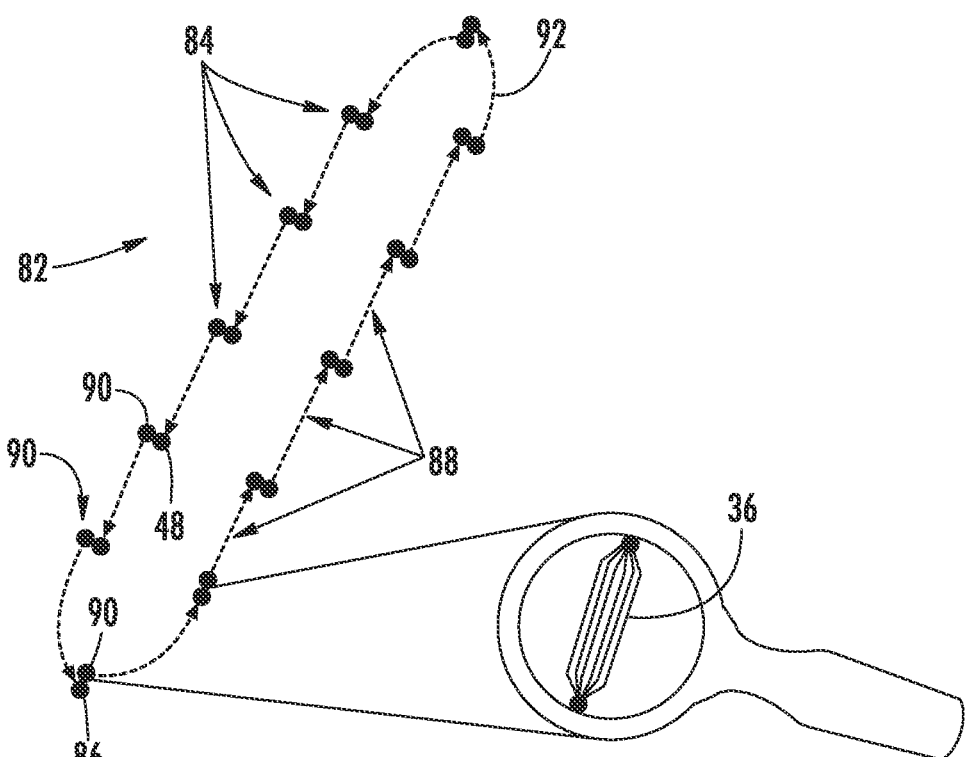
FIG. 25 is a schematic illustration of a W shaped or daisy chain geothermal well configuration.
FIG. 25A is an enlarged view of the interconnecting well formation of FIG. 25.

Referring now to FIGS. 25 and 25 A, shown is a schematic illustration of a daisy chain of wells, globally denoted by numeral 82. In this embodiment, each surface location, generally denoted by numeral 84, includes an injection well 86 connected to a lateral well conduit or interconnecting segment 88 and production well 90. In this manner, the continuous well structure subscribes to a generally U-shaped structure. The lateral well segment may comprise a well system 36, as discussed in FIG. 3 or any of the other configurations discussed previously.

As illustrated, each location 84 is discrete and linked to proximal locations in an elegant and advantageous manner. As an example, the distance between locations may be 3,500 meters to 6000 meters. This will, of course, vary from one situation to another.

In operation, working fluid is circulated in the injection well 86 of one location 84, optionally processed through, for example, a power generation apparatus (not shown) to recover the heat energy and subsequently passed as an output stream to be an inlet feed stream for a injection well 86 of a proximal location 84. The chain line 92 illustrates this relay or daisy chain sequencing. Since not all of the heat is recovered, the inlet feed stream for well 86 of a proximal location is preheated for injection into lateral conduit 88. The process then resets for repetition in the next location 84.

Figure 26:
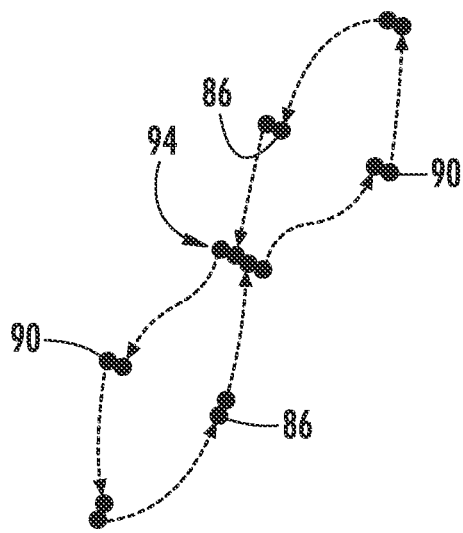
FIG. 26 is a schematic illustration of alternate embodiment of FIG. 25.

Turning now to FIG. 26, shown is a further embodiment of the invention for example, a 8,000 kW to 12,000 kW system. In this example, individual loops may be joined at a centralized location 94 in order to centralize the power generation apparatus (not shown) for increased power and efficiency.

Figure 27:
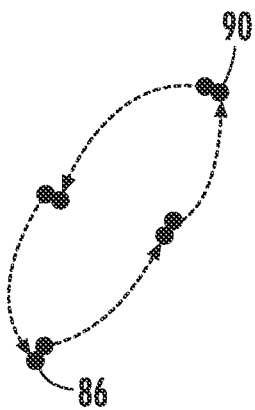
FIG. 27 is a schematic illustration of alternate embodiment of FIG. 25.
Figure 28:
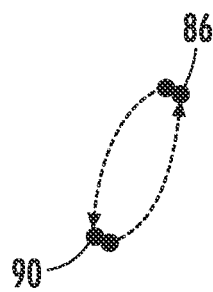
FIG. 28 is a schematic illustration an alternate embodiment of FIG. 25.

FIGS. 27 and 28 illustrate smaller scale operations, 4,000 kW-6,000 kW (FIG. 27) and 2,000 kW-3,000 kW (FIG. 28).

Turning now to the phase change aspect of the invention, reference will now be made to a drilling fluid composition that cools the drill string, bottom hole assembly and rock face (none of which are shown) much more efficiently than prior art. The cooling drilling fluid employs phase change materials (PCM) to mitigate the counter-current heat exchange issue seen with standard drilling fluid. As is known, PCMs undergo fusion (melting and solidifying) at a nearly constant temperature—hence, they absorb and release thermal energy without changing temperature materially. The unification of these properties with the sealing while drilling in sequence with drilling with PCMs with subsequent sealing has a dramatic positive impact on efficient drilling utilizing conventional drilling equipment in high temperature formations otherwise no achievable with standard equipment.

Figure 29:
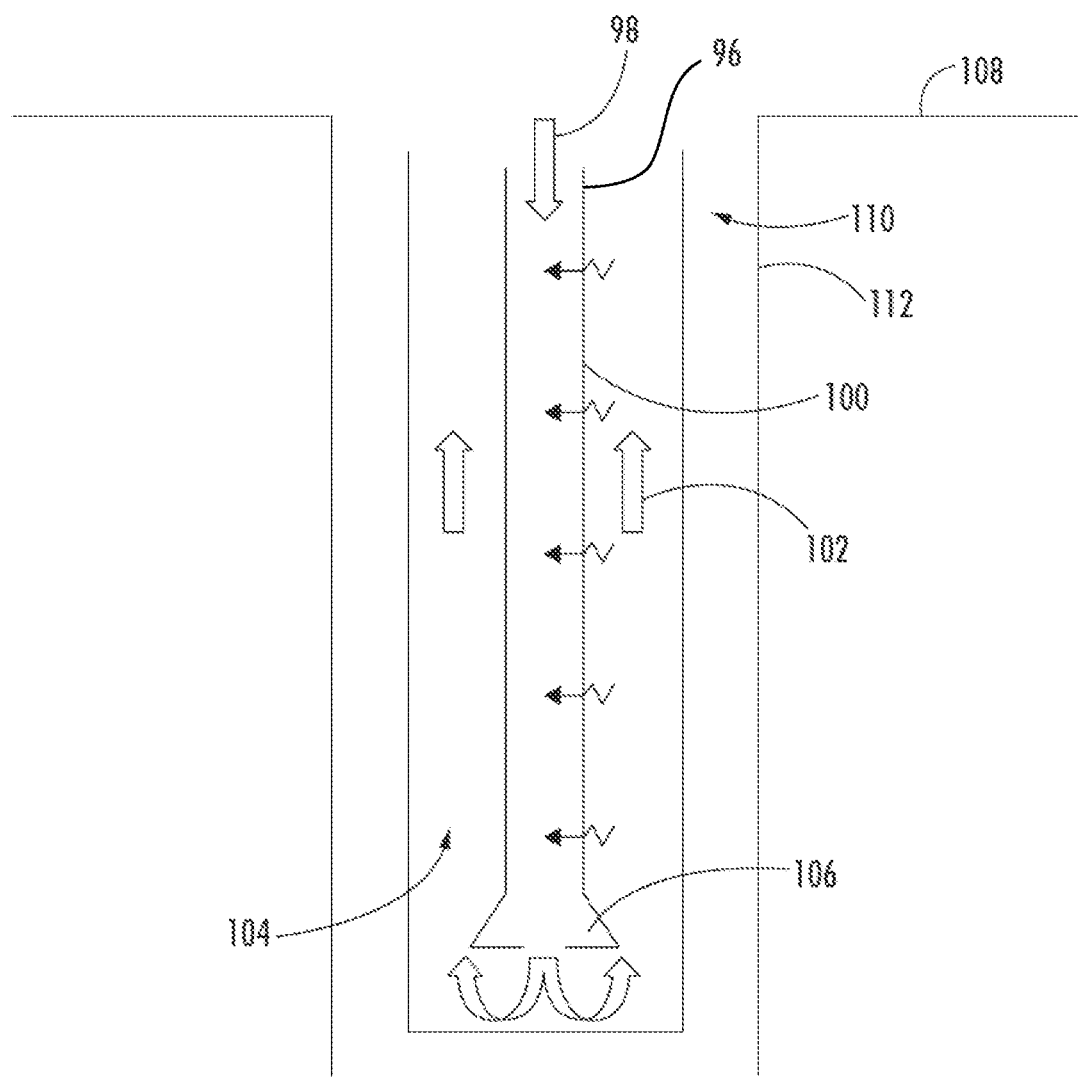
FIG. 29 is a representation showing a typical drilling operation, fluid flow, and heat transfer.

With reference to FIG. 29, the PCMs are added to the drilling fluid, and the fluid is pumped at a sufficient flow rate so that the PCMs undergo a phase change throughout the system (or at minimum proximate the bottom hole assembly (not shown).

At the top of the drill string 96 (inlet to the system), also referred to as the tubing, the PCMs are pumped in solid state (or mostly solid state). As the fluid 98 descends the tubing 100 of the string 96, heat is transferred from the returning fluid 102 in the annulus 104—however, the heat transfer rate is small due to the close temperature match (low delta T) between the annulus 104 and tubing 100. The fluid 98 in tubing 100 absorbs thermal energy while descending and melts without materially changing temperature and exits the bit 106 either in completely solid state or with a higher liquid fraction than at the top of the tubing 100. As the fluid 102 returns in the annulus 104 it continues to absorb heat from the rock 108 until the near-wellbore rock temperature is lower than the fluid temperature. The thermodynamics of the system are designed so that the flowing PCM slurry in the drill string 96 remains at least partially in solid state at, or near, the bottom hole assembly (not shown). This operation may be sequenced with a drill while sealing operation in any sequence as has been referenced herein previously.

Figure 30:
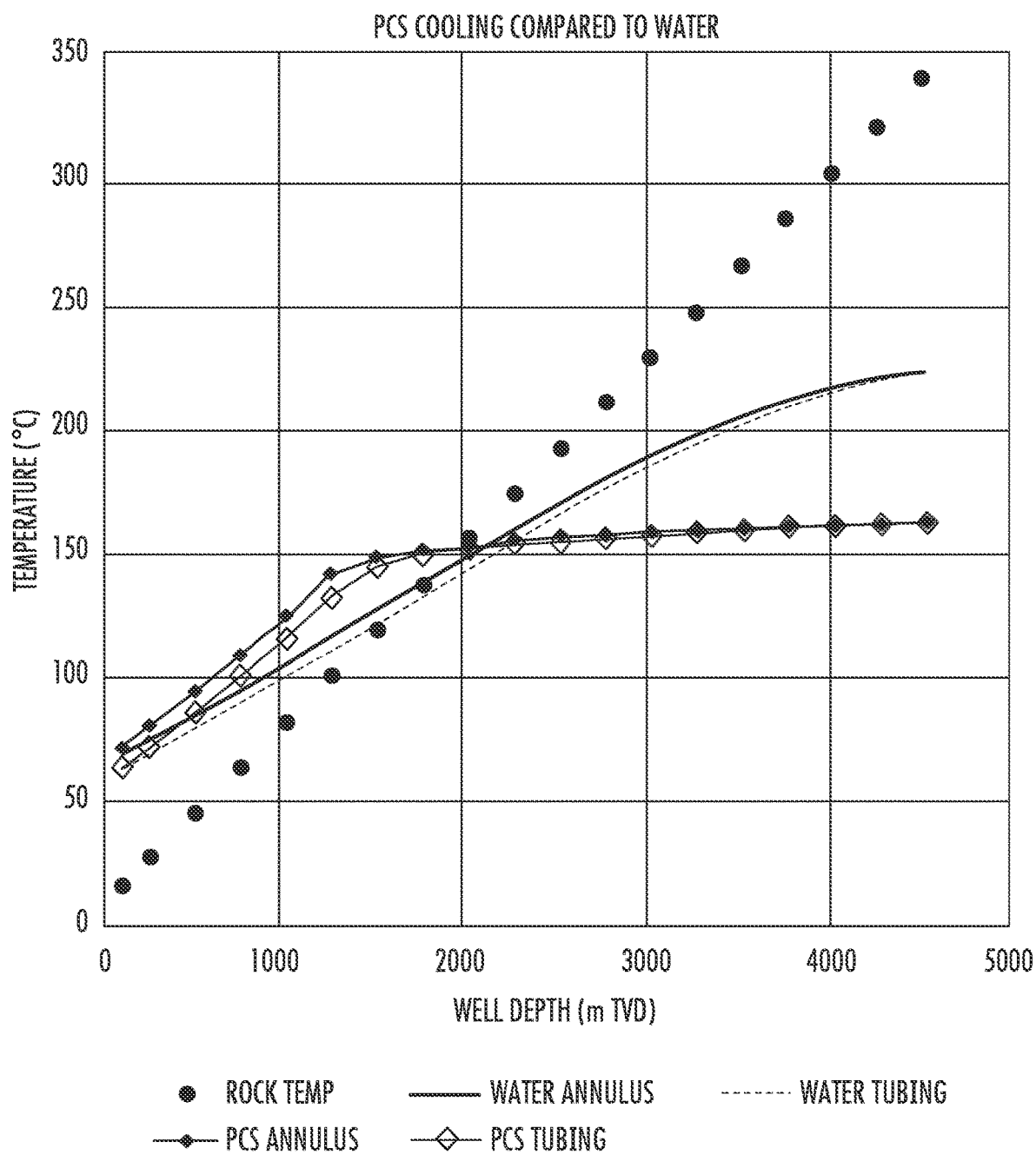
FIG. 30 is a graphical representation of system temperatures for water and the PCM-based drilling fluid disclosed herein along the well length.

Water has diminishing returns. Although effective to a certain point, increasing the flow rate of water has marginal further impact on bottom hole temperature. This is due to the counter-current heat-transfer which heats the descending water before it even reaches the bit (FIG. 29). This is illustrated in FIG. 30 for a case when drilling into 340° C. rock at 4500 m depth. Phase change slurry, (PCS) Casing is the slurry temperature of the returning fluid in the annulus 24 110 between the casing 26 112 and drill string 10 96, when the PCS is flowing at 4 m3/min. With water flowing at 4 m3/min, the temperature at the BHA (not shown) is approximately 222° C. Increasing the water flow rate to 5 m3/min only cools the BHA down to 209° C. The PCS fluid enables cooling down to 160° C. at 4 m3/min, much lower than achievable with water.

As is known in the art, drilling rate of penetration, ROP, is a function of rock strength. It has been found that here can weaken the rock, or "pre-condition" the rock, prior to physical destruction with the bit, by inducing a rapid cooling shock. By maintaining a much lower circulating fluid temperature than the in-situ rock temperature, the cool drilling fluid induces localized thermal contraction in the rock near the bit face (not shown). This contraction causes the rock to weaken and can even cause tensile failure.

In the academic literature, Yan-Jun Shen et al., *Experimental Study on Temperature Change and Crack Expansion of High Temperature Granite under Different Cooling Shock Treatments*, Energies, 2019, discuss the weakening effect is related to the magnitude of cooling. To achieve a material impact on ROP, cooling of greater than 50° C. is required. 90° C. is a preferred cooling temperature that enables enhanced ROP due to embrittlement of the rock but not extreme rock damage. Substantial weakening and tensile failure can occur with 150° C. of cooling, which cannot be achieved with water alone in a standard drilling arrangement. U.S. Pat. No. 9,758,711 discloses a PCS drilling fluid to cool the bit and bottom hole assembly. The disclosure notes that only a marginally better cooling effect could be achieved (approximately 5° C.) compared to water.

Figure 31:
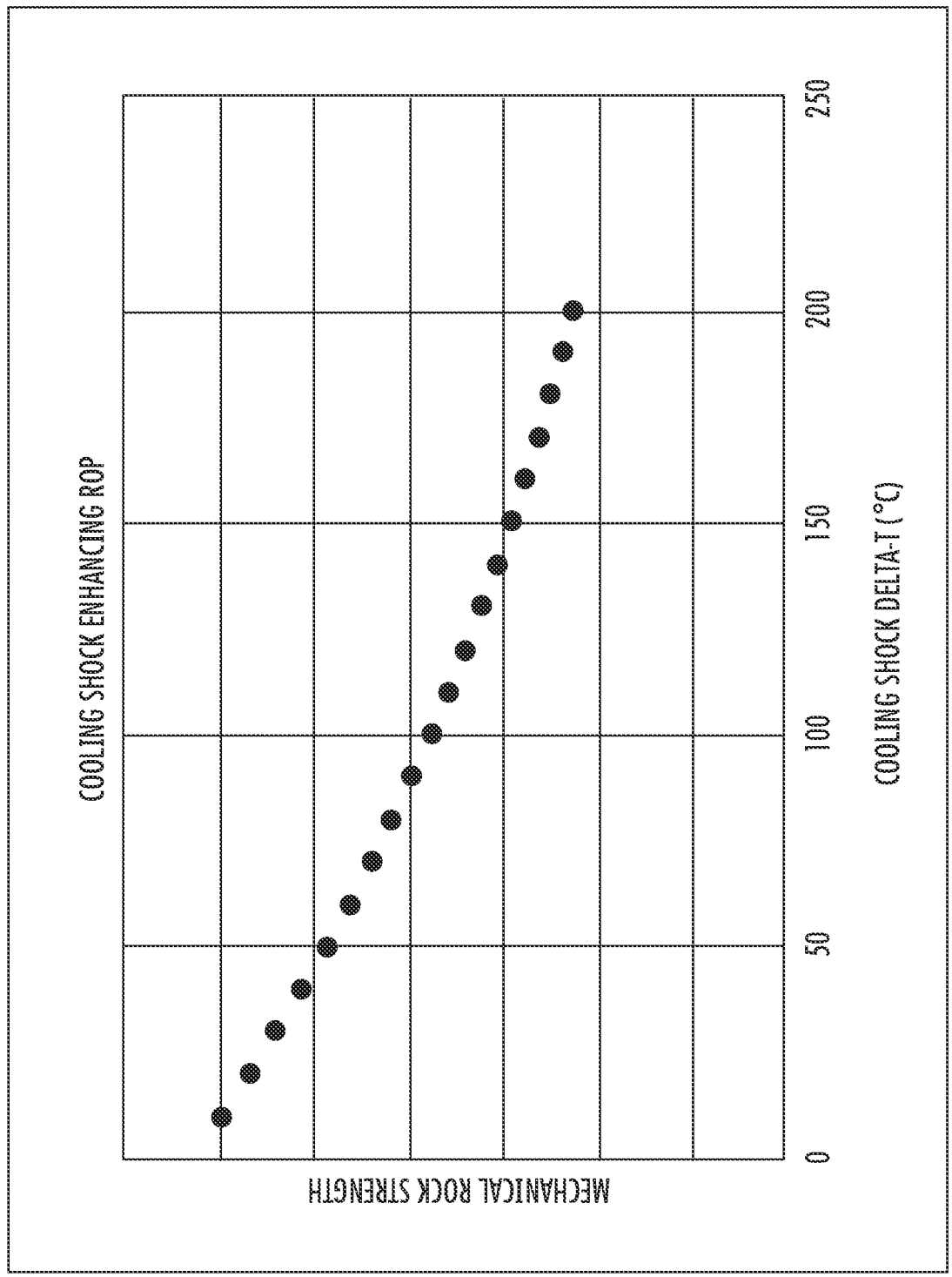
FIG. 31 is a graphical representation of the effect of cooling a rock face for weakening mechanical strength for preconditioning before destruction by a bit.

When the methods described here are applied, the rock can be cooled by greater than 100° C. Reference to FIG. 30 shows cooling of 190° C. FIG. 31 depicts the rock mechanical strength as a function of the shock cooling delta-T, that is, the temperature difference between the PCM drilling fluid and the virgin rock temperature.

A particularly useful application of the invention is for construction of closed-loop, conduction-only geothermal systems as disclosed in Applicant's copending applications.

These systems typically require magnetic ranging tools to enable intersection of the various wellbores to create a closed system. During the ranging phase of operations, it is critical to keep the magnetic ranging receiver (not shown) below its temperature limit. The receiver can be placed on the end of a drill string (tubing) and configured to allow fluid to flow through the tool and out of the end of the tubing. In this manner, the magnetic ranging equipment can be actively cooled by pumping a PCS at high rates through the tool and back up the annulus, using the design and operational methodology described herein.

The PCMs are designed and selected to have a fusion temperature below the maximum temperature limit of the equipment, electronics, and sensors within the drill string and BHA. Therefore, even though the rock temperature can be significantly higher than the equipment maximum temperature limit, the drilling fluid temperature remains at the PCM fusion temperature. Rock temperatures above 200° C. to 400° C. and greater can be drilled with standard directional drilling equipment, electronics, etc. Furthermore, some wells are currently drilled with expensive high temperature tools up to 250° C. In contrast, the technology disclosed herein enables much cheaper, more reliable and effective equipment, saving significant costs.

As mentioned supra, U.S. Pat. No. 9,758,711, discloses a PCS drilling fluid to cool the bit and bottom hole assembly. However, the disclosure does not enable sufficient cooling to weaken rock for faster ROP, or solve the operational challenges necessary to achieve a massive cooling effect.

It is important to maintain dispersion of the PCM within the drill string to prevent agglomeration and potential plugging of the flow path. We have demonstrated a stable emulsion with solid phase PCM particles. However, after several melting/solidifying cycles the PCM particles tend to agglomerate and grow bigger. The important thing is to have the solidification process take place when the fluid is turbulent and under high shear rates, which limits the agglomeration to a certain maximum particle size.

It has been found that a critical flow rate is required to achieve a significant cooling effect that can weaken the rock, increase ROP, and enable magnetic ranging for a geothermal closed-loop system in high temperature rock. The critical flow rate is defined by that where the PCM remains at least partly solid (therefore undergoing fusion) throughout the entire drill string and exits the bit (or bottom hole assembly) in partially solid form. It is not necessary to have the PCM in solid form in the annulus, only the tubing.

Figure 32:
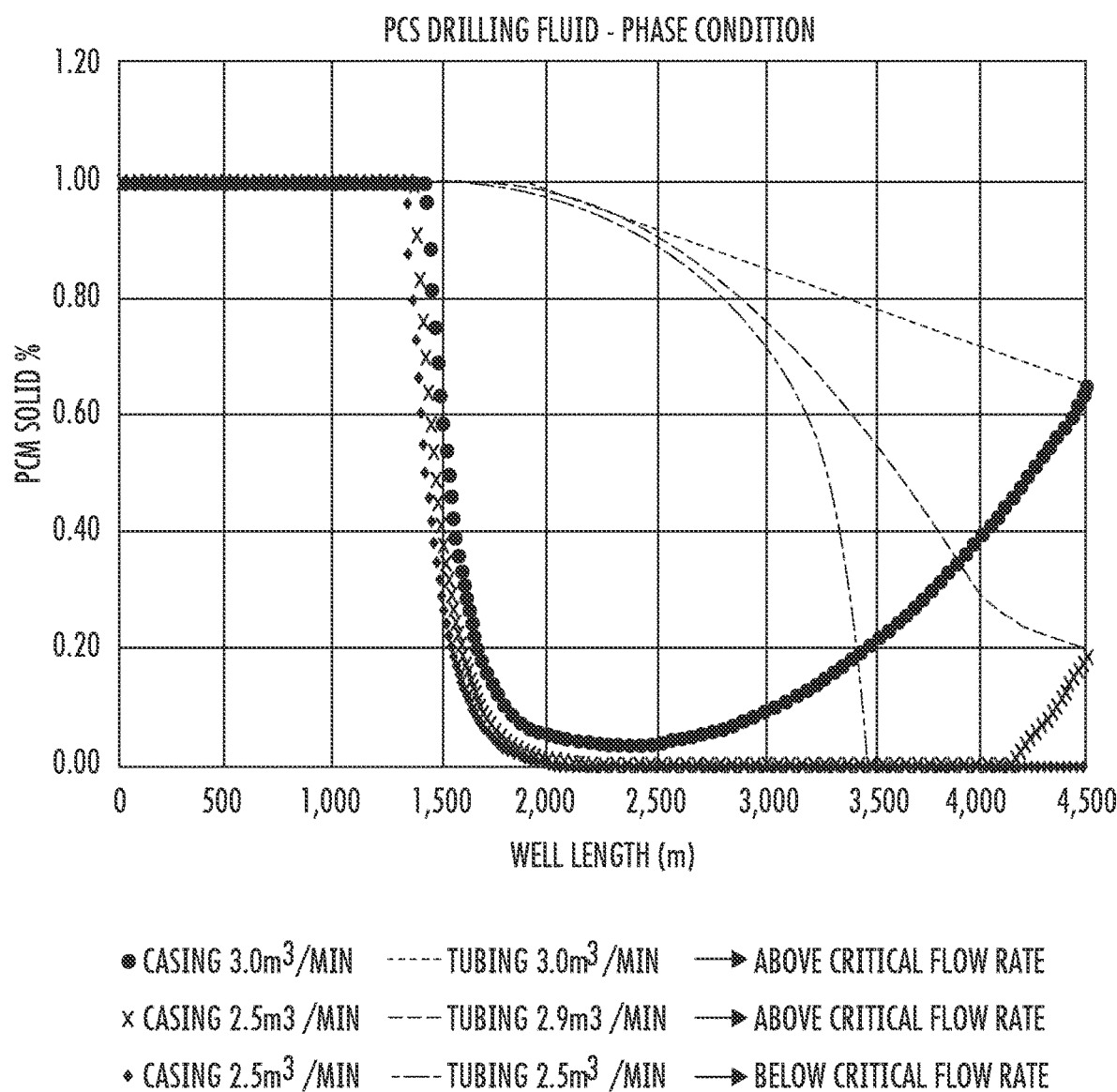
FIG. 32 is graphical representation showing phase state of PCM (Liquid or Solid) along the well length for different flow rates above and below the critical flow rate.

Referring now to FIG. 32 different flow rates for a scenario of drilling 340° C. rock (a linear 75° C./km geothermal gradient) at 4500 m depth, with a fusion temperature of 150° C., are illustrated. The temperature at the bottom hole assembly for each flow rate is 180, 150, 150° C., for 2.5, 2.9, 3.0 m3/min, respectively. Therefore, the critical flow rate is 2.9 m3/min in this scenario, as any lower flow rate results in higher temperatures at the BHA, while any higher flow rate results in no additional cooling.

For depths and temperatures relevant to geothermal projects, typically the critical flow rate is between 2 m3/min and 6 m3/min.

Figure 33:
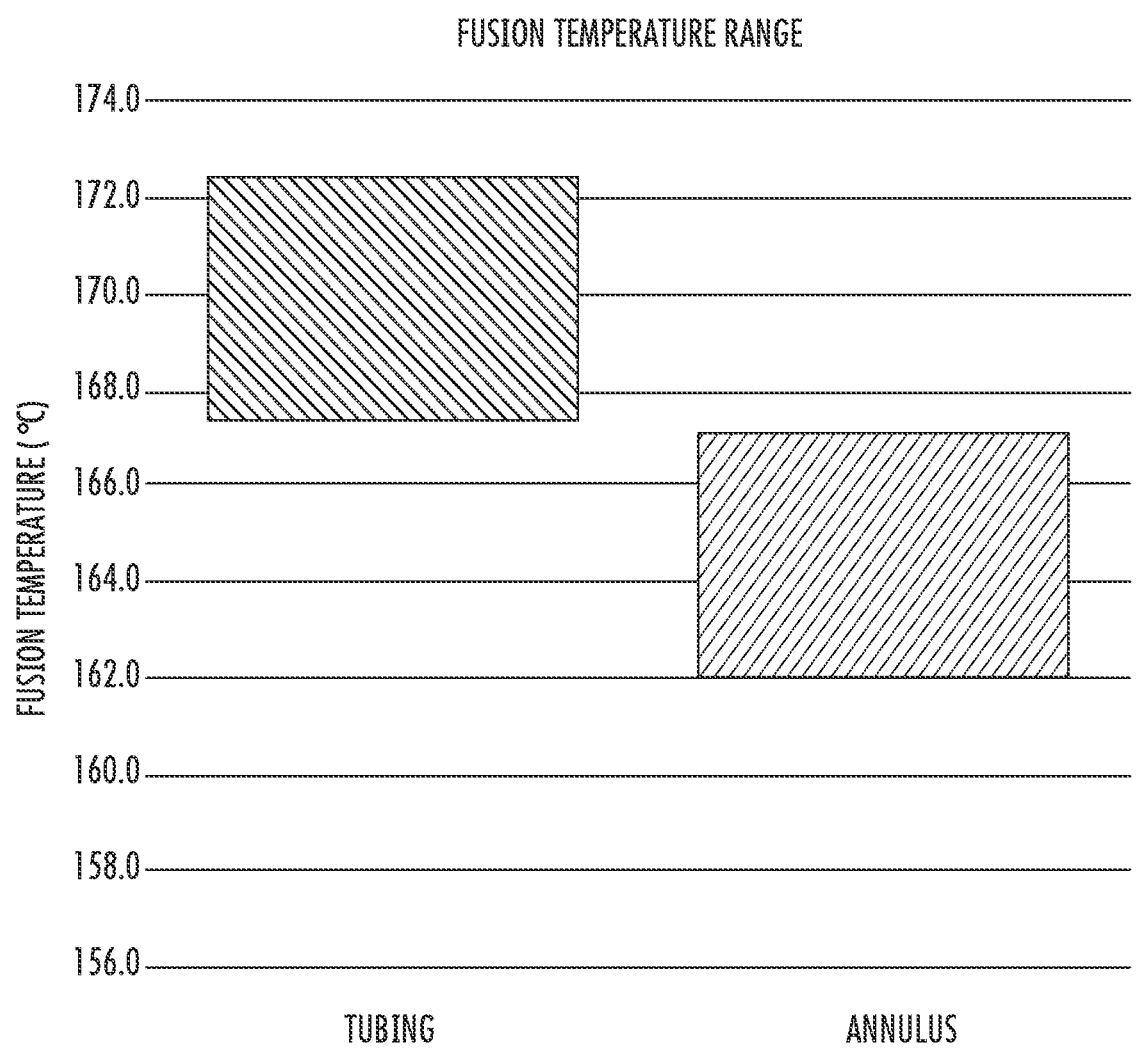
FIG. 33 is a graphical representation of the fusion temperature range in the tubing and annulus which is controlled by pressure.

To achieve the desired cooling effect, it is important that the heat transfer between tubing and annulus is minimized. If the BHA pressure is not controlled properly, the fusion temperature of the melting PCM in the annulus is higher than the fusion temperature in the tubing, causing significant undesired heat transfer from annulus to tubing. Fusion temperature is a function of pressure. The pressure differential, delta-P, between tubing and annulus must be controlled to be sufficiently high to cause the Minimum Fusion Temperature in the tubing to be higher than the Maximum Fusion Temperature in the annulus, depicted in FIG. 33.

Figure 34:
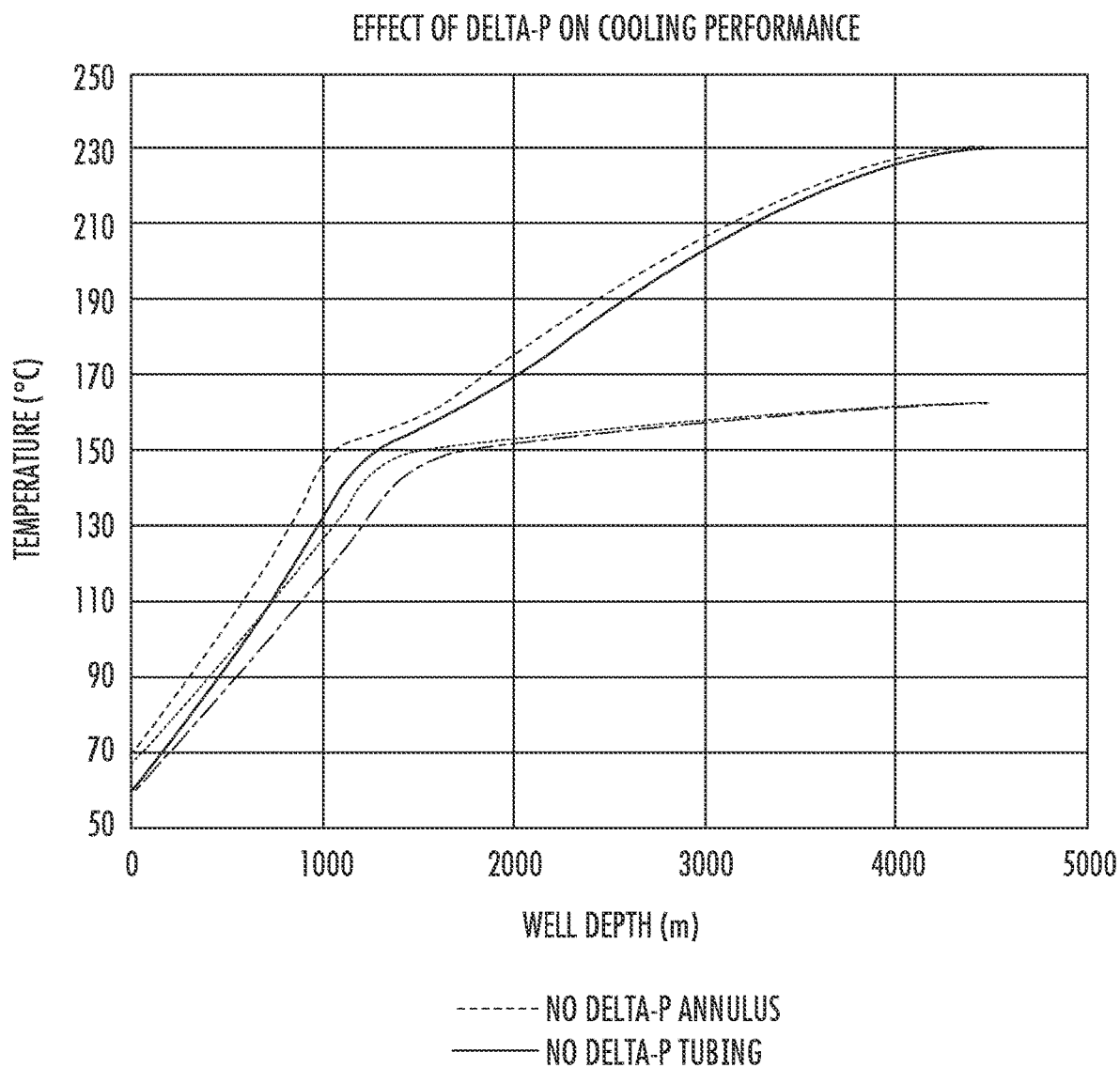
FIG. 34 Is graphical representation showing the effect of BHA delta-P on the cooling performance.

FIG. 34 shows a graphical representation showing the importance of properly designing the delta-P across the BHA. It depicts two cases each with identical flow rate, drilling fluid composition, well dimensions, and rock temperature. Case 1 has no pressure drop, or delta-P, across the equipment and components at the bottom of the string (Bottom Hole Assembly). Case 2 has a pressure drop of 10 MPa. The fluid temperature at the bit is 230° C. and 160° C. respectively.

Rock cuttings which are transported to surface need to be removed to maintain the required solids content/density of the drilling fluid. In many geothermal applications and particularly in the application disclosed in Applicant's copending applications a clear fluid is ideal—meaning a fluid with immaterial solids content. While larger cuttings are removed via screens/shakers, smaller solids are removed with a centrifuge which separates the higher density material. Therefore, the PCM should be chosen to have a density similar to that of the base carrier fluid, and ideally slightly below the carrier fluid, to enable removal of cuttings in a centrifuge but leave the PCM particles within the fluid.

Adding solid PCM to a base carrier fluid such as water increases the effective bulk viscosity significantly. As viscosity increases, so does the hydraulic frictional pressure drop through the wellbore. The high pressure losses would usually dictate massive surface pumping power and high pressure equipment. However, the PCM can be chosen to have a significant density difference between the liquid and solid states. By combining this PCM property with an optimized fluid composition and flow rate, the system is designed/operated so that the PCM has a significantly higher % solid phase in the drill string than in the annulus, thus creating a large density difference between the drill string and annulus, enabling a significant siphoning effect. The siphoning effect adds a large pressure drive to the system which partially overcomes the impact of the increased viscosity from the PCM.

The density difference is not a thermosiphon as the temperature in the tubing/annulus is essentially the same. Instead the siphon is caused by the relative phase state of the PCM between the annulus and tubing.

One of the significant features of employing the daisy chain implementation is the lack of a requirement for a near surface return conduit. When required, as in conventional well loop arrangements, capital costs exceed 10% of the total project capital, there may be a need to negotiate rights of way and a ~3° C. heat loss and a pressure loss results causing lower efficiency.

By contrast, the daisy chaining, since well loops are linked front to back, eliminates the need for a near surface return conduit. Further, the paired loops act as the return conduit for each other with the pair using waste heat as an input to create the preheated stream supra.

Other advantages include increased power production with no surface disruption (footprint) since everything is subsurface and reduced distance between locations 84. This commensurately reduces cost if shorter conduit 88 can be used owing to the increased temperature of the preheated feed stream design.

The wells in the examples are formed by employing the sealing while drilling methodology described. It will be understood that any combination of well configurations can be incorporated in the daisy type arrangement. Further, any combination of destructive techniques may be used to form the wellbores in the daisy example as well as any of the other configurations shown in all of the Figures. In some Figures, reference to an "n" designation is included together with the Figure number. An example is FIG. 6 having an area denoted 6n. This is to represent that any number, thus n, of additional wells may be stacked vertically or positioned in a parallel relationship or both with the one shown. The well type may be different or the same for the additional wells.

As enumerated by the examples, the technology set forth herein is predicated on the ability to form a geothermal formation, regardless of permeability, into an energy efficient wellbore for maximum conductivity. This capability, when coupled with highly effective working fluids, results in remarkable methodology.

Fluid circulation within the wells can occur in any pattern and direction that facilitates efficiency. This will be partly dictated by the nature of the formation and will determined and appreciated by those skilled in the art.

We claim:

1. A method, comprising:
    while drilling a geothermal wellbore into a geological formation with an insulated drill string, sealing, by flowing a sealant downhole through the insulated drill string, a pore space along a length absent casing of at least a portion of the wellbore; and
    maintaining, while drilling the geothermal wellbore and while sealing the pore space along the length, a temperature differential of at least 90° Celsius (C) between a rock face being drilled and a drilling fluid contacting the rock face being drilled, wherein maintaining the temperature differential comprises selecting at least one of:
        a chemical operation for controlling thermal transfer between the drilling fluid introduced to said rock face being drilled and the drilling fluid returning to a terranean surface of said wellbore; or
        a mechanical operation for controlling thermal transfer between the drilling fluid introduced to said rock face being drilled and the drilling fluid returning to a terranean surface of said wellbore; and
    increasing the rate of penetration of said drill string into said geological formation through maintenance of said differential relative to a rate of penetration absent maintenance of said differential.

2. The method as set forth in claim 1, wherein said method utilizes the chemical operation and the mechanical operation.

3. The method as set forth in claim 1, wherein said operations are conducted in a predetermined sequence.

4. The method as set forth in claim 1, wherein said operations are conducted simultaneously.

5. The method as set forth in claim 1, wherein the rock face is part of a high temperature geologic formation having a temperature that is above a maximum rated operating temperature of the drill string, and wherein maintaining the temperature differential comprises maintaining a temperature of the drilling fluid between 90° C. and 190° C. below the temperature of the geologic formation when the drilling fluid exits the drill string to contact the rock face.

6. The method as set forth in claim 1, wherein the drilling fluid comprises a phase change material, and said chemical operation comprises utilizing the phase change material for controlling counter-current thermal transfer between said introduced drilling fluid and said returning drilling fluid.

7. The method as set forth in claim 6, wherein the mechanical operation comprises controlling a pressure differential between the drill string and an annulus defined between the drill string and a wall of the geothermal wellbore, and wherein a maximum fusion temperature of said phase change material in said annulus is lower or equal to a minimum fusion temperature of said phase change material in said drill string.

8. The method as set forth in claim 7, further comprising the step of maintaining flow rate of said phase change material to retain at least partial solid state adjacent the bottom of said drill string to maintain said drilling fluid at a lower temperature than that of the rock face being drilled.

9. The method as set forth in claim 1, further comprising the step of including reagents within said drilling fluid that react endothermically.

10. The method as set forth in claim 9 wherein the reaction is pressure activated.

11. The method as set forth in claim 1, wherein said chemical operation further comprises positioning an insulating blanket proximate said thermal transmitting surfaces associated with the drilling fluid introduced to said rock face and the drilling fluid returning.

12. The method as set forth in claim 11, further comprising the step of utilizing at least one of a liquid, gas, solid, foam, gel, phase change material, oil, composite materials and combinations thereof in the composition of said blanket.

13. The method as set forth in claim 1, wherein said mechanical operation comprises utilizing components in said drill string having low thermal conductivity to reduce thermal transfer into said introduced drilling fluid.

14. A drilling method for drilling a wellbore in a geologic formation, the method comprising:
    sequencing i) sealing pore space in the geologic formation while drilling with a drill string; with
    ii) drilling with a cooling operation with subsequent sealing of said pore space; and
    cooling a rock face being drilled in said formation with a drilling fluid at a temperature of between 90° Celsius (C) and 190° C. below the temperature of the geologic formation when the drilling fluid contacts a rock face of the formation to increase a rate of penetration during drilling of said formation relative to a rate of penetration absent the use of said drilling fluid.

15. The method as set forth in claim 14, further comprising the step of controlling thermal transfer from the drilling fluid introduced to said rock face and the drilling fluid returning; and
    controlling thermal transfer between the drill string and introduced drilling fluid to provide the temperature differential of between 90° C. and 190° C. between said rock face and said introduced drilling fluid.

16. The method as set forth in claim 14, further comprising alternating between drilling with said drilling fluid and circulating a sealant to seal said pore space in said formation.

17. The method as set forth in claim 14, wherein said drilling fluid comprises a phase change material, fluid containing a phase change material, thermal oil, fluid containing gas undergoing expansion and a Joule-Thomson effect, liquid nitrogen, refrigerant and combinations thereof.

18. The method as set forth in claim 14, further comprising the step of sealing fissures, cracks and voids pre-existing in said formation or resultant from drilling.

19. The method as set forth in claim 14, wherein the sequencing sealing pore space comprises utilizing an alkali silicate composition in the drilling fluid.

20. The method as set forth in claim 14, wherein sequencing is conducted in an alternating sequence.

21. The method as set forth in claim 14, wherein sealing of said pore space forms an interface between the drilled formation and a periphery of the drilled wellbore.

22. The method as set forth in claim 21, further comprising the step of circulating a chemical composition within said wellbore capable of inducing precipitate formation with said interface to augment a sealing capacity and mechanical integrity of said interface.

23. The method as set forth in claim 22, further comprising the step of circulating a working fluid within the sealed wellbore containing an interface maintenance additive for maintaining impermeability during circulation of said working fluid within said wellbore.

24. The method as set forth in claim 14, wherein drilling into said formation comprises drilling an inlet well and an outlet well to form a closed loop with an auxiliary device, at least a portion of said closed loop disposed within a thermally productive area of said formation.

25. The method as set forth in claim 24, wherein said closed loop comprises an L shaped well with a closed terminal end, tube-in-tube well arrangement, grouped closed loop U shaped wells in spaced relation with an output well member in said group connected to an input well of another group member, a closed loop U shaped well having a plurality of lateral wells commonly connected to a respective inlet well and outlet well, a plurality of closed loop U shaped wells having a plurality of lateral wells commonly connected to a respective inlet well and outlet well arranged with lateral wells of said plurality arranged with said laterals at least partially interdigitated for thermal contact and combinations thereof.

26. The method as set forth in claim 25, wherein said thermally productive area is a geothermal zone, and wherein sealing the pore space in the formation comprises sealing the pore space absent casing in at least a portion of the wellbore for geothermal heat production.

27. The method as set forth in claim 24, wherein said auxiliary device comprises at least one of a heat collecting device, a power conversion device and combinations thereof.

28. The method as set forth in claim 14, wherein the rock face is part of a high temperature formation having a temperature that is above a maximum rated operating temperature of the drill string, and cooling the rock face comprises maintaining the temperature of the drilling fluid between 90° C. and 190° C. below the temperature of the geologic formation when the drilling fluid exits the drill string to contact the rock face.

29. The method as set forth in claim 14, wherein said drilling method is conducted in the formation selected from a group consisting of a high permeability formation, low permeability formation, and variable permeability formation, and wherein sealing the pore space in the formation comprises sealing the pore space absent casing in at least a portion of the wellbore for geothermal heat production.

30. A method for drilling a wellbore into a formation for thermal recovery, the method comprising:
forming, while drilling the wellbore with a drill string, a thermally conductive interface between said wellbore and said formation substantially impermeable to fluids, said interface formed by inducing irreversible permeability damage to said wellbore using at least one of a thermal mechanism, mechanical mechanism, chemical mechanism and biological mechanism absent the presence of casing between at least a portion of the formed interface and said wellbore, wherein the drilling comprises at least one of i) simultaneous drilling while sealing, or ii) drilling with subsequent sealing; and
cooling a rock face of the wellbore with a drilling fluid comprising a phase change material by at least one of i) controlling a pressure differential between the drill string and an annulus defined between the drill string and a wall of the wellbore such that a maximum fusion temperature of the phase change material in the annulus is lower or equal to a minimum fusion temperature of said phase change material in the drill string, or ii) controlling a flow rate of the drilling fluid to maintain at least a portion of the phase change material at a bottom of the drill string in solid state.

31. The method as set forth in claim 30, wherein said cooling comprises dynamically cooling to cool the rock face being drilled during drilling and cool the drill string, followed by sealing with an added sealant material introduced into an unsealed section of the drilled wellbore.

32. The method as set forth in claim 31, further comprising the step of controlling thermal transfer from the drilling fluid introduced to said rock face and the drilling fluid returning during cooling.

33. The method as set forth in claim 32, wherein said step of controlling thermal transfer comprises circulating said phase change material for controlling counter-current thermal transfer between said introduced drilling fluid and said returning drilling fluid.

34. The method as set forth in claim 31, further comprising positioning an insulating blanket proximate thermal transmitting surfaces associated with the drilling fluid introduced to said rock face and the drilling fluid returning.

35. The method as set forth in claim 34, further comprising the step of utilizing at least one of a liquid, gas, solid, foam, gel, phase change material, oil, composite materials and combinations thereof in the composition of said blanket.

36. The method as set forth in claim 31, further comprising treating the drill string for drilling in said formation with an insulating material to reduce thermal transfer into the drilling fluid introduced to said rock face.

37. The method as set forth in claim 36, wherein said treating comprises treating predetermined points on the drill string with low conductivity material.

38. The method as set forth in claim 31, wherein said method comprises utilizing components in said drill string having low thermal conductivity to reduce thermal transfer into said drilling fluid introduced to said rock face.

39. The method as set forth in claim 31, further comprising increasing a rate of penetration of the drill string into said formation through maintenance of a temperature differential of between 90° C. and 190° C. between said rock face of said formation and the drilling fluid introduced to said rock face.

40. The method as set forth in claim 30, wherein said cooling comprises maintaining the drilling fluid contacting a rock face of the formation at a temperature of between 90° Celsius (C) and 190° C. below a temperature of the rock face.

41. The method as set forth in claim 30, wherein a fusion temperature of said phase change material is below a maximum rated operating temperature of a bottom hole assembly of the drill string, and wherein cooling the rock face comprises cooling the drill string.

42. The method as set forth in claim 30, wherein controlling the flow rate of said drilling fluid comprises maintaining the flow rate of the drilling fluid at between 2 cubic meters per minute and 6 cubic meters per minute.

43. The method as set forth in claim 42, further comprising the step of including reagents within said drilling fluid that react endothermically.

44. The method as set forth in claim 43, wherein the reaction is pressure activated.

45. The method as set forth in claim 30, further comprising the step of conducting, in a predetermined sequence, said simultaneous drilling while sealing and said drilling with subsequent sealing.

46. The method as set forth in claim 30, wherein said wellbore is a closed loop, continuous circuit with said interface extending at least between an inlet well and an outlet well of said loop.

47. The method as set forth in claim 30, wherein said chemical mechanism comprises utilizing an alkali silicate based drilling fluid.

48. The method as set forth in claim 47, wherein said alkali silicate based drilling fluid comprises at least one of potassium, sodium and sodium aluminosilicate.

49. The method as set forth in claim 30, further comprising the step of augmenting a sealing capacity and mechanical integrity of a formed interface in a further chemical unit operation.

50. The method as set forth in claim 49, wherein said further chemical unit operation comprises treating said interface with at least one of calcium chloride brine, brine containing multivalent cations, acids, CO2, surfactants and esters.

51. The method as set forth in claim 49, wherein said chemical unit operation comprises treating said formed interface with a compound capable of chemically bonding to said formed interface.

52. The method as set forth in claim 30, further comprising circulating a working fluid within said wellbore containing an interface maintenance additive for maintaining impermeability in use.

53. A drilling method utilizing a drill string defining, with a wall of a wellbore, a surrounding annulus, the method comprising:
providing a drilling fluid containing a phase change material;
sequencing sealing pore space while drilling in a formation with drilling with said phase change material with subsequent sealing of said pore space;
controlling a pressure differential between said drill string and said annulus where a maximum fusion temperature of said phase change material in said annulus is lower or equal to a minimum fusion temperature of said phase change material in said drill string;
maintaining a flow rate of said phase change material to retain at least partial solid state adjacent to a bottom of said drill string whereby said drilling fluid is at a lower temperature than that of a rock face being drilled; and
cooling the rock face being drilled in said formation with said phase change material to increase a rate of penetration during drilling of said formation relative to a rate of penetration absent said phase change material.

54. The method as set forth in claim 53, wherein the phase change material is flowed with a drilling fluid comprising a temperature that is maintained through active phase change of said phase change material during circulation of said drilling fluid.

55. The method as set forth in claim 54, further comprising the step of selecting said flow rate based on formation temperature.

56. A method for remediating a well comprising at least one of fractured sections created by drilling or fracturing techniques, unconsolidated rock and sand within an earth formation, the method comprising:
sequencing i) sealing pore space while drilling in at least one of said fractured sections created by drilling or fracturing techniques, unconsolidated rock and sand in said formation with ii) drilling with a phase change material with subsequent sealing of said pore space; and
cooling a rock face being drilled in said formation by between 90° Celsius (C) and 190° C. with said phase change material to increase a rate of penetration during drilling of said formation relative to a rate of penetration absent said phase change material.

57. The method as set forth in claim 56, further comprising the step of treating said well and pore space of at least one of said fractured sections, unconsolidated rock and sand by an addition of a preliminary chemical composition capable of forming a precipitated impervious interface at said sections; and
treating said interface with a second chemical composition for precipitating any unreacted preliminary chemical composition to further seal said interface.

58. The method as set forth in claim 57, wherein said preliminary chemical composition is an alkali silicate fluid.

59. The method as set forth in claim 58, wherein said alkali silicate fluid comprises at least one of potassium, sodium and sodium aluminosilicate.

60. A method for converting a geothermal well extending through a formation, the geothermal well having at least one of fractured sections created by drilling or fracturing techniques, unconsolidated rock and sand, an inlet well and an outlet well in fluid communication, to form a sealed closed well loop, the method comprising:
sequencing i) sealing pore space while drilling in at least one of said fractured sections created by drilling or fracturing techniques, unconsolidated rock and sand in said formation with ii) drilling with a phase change material with subsequent sealing of said pore space; and
cooling a rock face being drilled in said formation with said phase change material to increase a rate of penetration during drilling of said formation relative to a rate of penetration absent said phase change material; and
circulating a preliminary chemical composition capable of forming a precipitated impervious and thermally conductive interface between said inlet well and said outlet well and in at least one of said fractured sections created by drilling or fracturing techniques, unconsolidated rock and sand whereby the sealed closed well loop is formed with the inlet well, the outlet well, and the area therebetween.

61. The method as set forth in claim 60, further comprising the step of treating said interface with a second chemical composition for precipitating any unreacted preliminary chemical composition to further seal said interface.

62. The method as set forth in claim 61, further comprising the step of circulating a working fluid within said closed loop capable of reacting with said interface to maintain impermeability during circulation of said working fluid.

63. The method as set forth in claim 62, further comprising the step of continuously circulating working fluid within said closed loop.

64. The method as set forth in claim 62, wherein said working fluid is circulated within said loop in a variable manner.

65. The method as set forth in claim 64, wherein said variable manner comprises periods of quiescence.

66. A method, comprising:
dynamically cooling, while drilling a wellbore in a formation using an insulated drill string, a rock face being drilled by at least 90° Celsius (C); and
sealing, while drilling the wellbore and cooling the rock face being drilled, pore space along a length absent casing of at least a portion of the wellbore in said formation by flowing a drilling fluid configured to cool the rock face being drilled and seal the pore space along the length in a single operation, wherein sealing the pore space along the length comprises sealing the pore space for geothermal heat production, and the flowing comprises flowing the drilling fluid downhole through the insulated drill string to cool the rock face being drilled; and
changing a compound content of the drilling fluid during drilling to accommodate variation in rock types and formation temperature encountered during drilling into said formation.

67. The method as set forth in claim 66, wherein said drilling fluid comprises at least one phase change material.

68. The method as set forth in claim 66, wherein said drilling fluid comprises at least one alkali silicate sealant material.

69. The method as set forth in claim 66, further comprising an emulsion stabilizer compound for inclusion in said drilling fluid.

70. The method as set forth in claim 66, further comprising the step of: sequencing i) dynamic cooling and sealing with cooling followed by ii) sealing in a predetermined sequence.

71. The method as set forth in claim 66, further comprising the step of flushing a sealed wellbore within said formation with a secondary composition chemically reactive with a sealed surface of said sealed wellbore to augment the seal.

72. The method as set forth in claim 66, wherein said formation is a geothermally productive formation, and wherein sealing the pore space comprises sealing the pore space of a lateral section of the wellbore absent casing in at least a portion of the lateral section of the wellbore for geothermal heat production.

* * * * *

UNITED STATES PATENT AND TRADEMARK OFFICE
CERTIFICATE OF CORRECTION

Page 1 of 1

PATENT NO. : 12,209,775 B2
APPLICATION NO. : 17/126153
DATED : January 28, 2025
INVENTOR(S) : Matthew Toews et al.

It is certified that error appears in the above-identified patent and that said Letters Patent is hereby corrected as shown below:

On the Title Page

Item [54], please replace "HIGH EFFICIENCY" with -- HIGH-EFFICIENCY --.

In the Specification

In Column 1, Line 1, in the Title, please replace "HIGH EFFICIENCY" with -- HIGH-EFFICIENCY --.

In the Claims

In Column 39, Line 27, Claim 50, please replace "CO2" with -- $CO_2$ --.

Signed and Sealed this
Fifteenth Day of April, 2025

Coke Morgan Stewart
*Acting Director of the United States Patent and Trademark Office*